US012717297B2

(12) United States Patent
Moore et al.

(10) Patent No.: US 12,717,297 B2
(45) Date of Patent: Aug. 25, 2026

(54) POWER TRACKING USING A SOLDIER NETWORK MIDDLEWARE SYSTEM

(71) Applicant: GALVION LTD., Portsmouth, NH (US)

(72) Inventors: Christopher Moore, Dundry (GB); Jonathan Andree, Bedford, NH (US); Harrison Wall, Portsmouth, NH (US); James David Kazmierczak, Berlin, MA (US); Kurt Harrison, Newington, NH (US)

(73) Assignee: GALVION LTD., Portsmouth, NH (US)

( * ) Notice: Subject to any disclaimer, the term of this patent is extended or adjusted under 35 U.S.C. 154(b) by 365 days.

(21) Appl. No.: 18/318,141

(22) Filed: May 16, 2023

(65) Prior Publication Data

US 2023/0367284 A1 Nov. 16, 2023

Related U.S. Application Data

(60) Provisional application No. 63/397,044, filed on Aug. 11, 2022, provisional application No. 63/342,378, filed on May 16, 2022.

(51) Int. Cl.
*G05B 19/042* (2006.01)
*H04L 45/52* (2022.01)
(Continued)

(52) U.S. Cl.
CPC .......... *G05B 19/0428* (2013.01); *H04L 45/52* (2013.01); *H04L 51/56* (2022.05); *H04W 4/12* (2013.01); *G05B 2219/2639* (2013.01)

(58) Field of Classification Search
CPC ........ G05B 19/0428; G05B 2219/2639; H04L 45/52; H04L 51/56; H04L 12/10;
(Continued)

(56) References Cited

U.S. PATENT DOCUMENTS 2,468,697 A 4/1949 Wiley
2,814,043 A 11/1957 Alesi
(Continued)

FOREIGN PATENT DOCUMENTS

CN 1434282 A1 8/2003
CN 101488192 B 6/2012
(Continued)

OTHER PUBLICATIONS

Chen, Bo et al., "Lightweight Service Mashup Middleware With REST Style Architecture for IoT Applications", IEEE Transactions on Network and Service Management, IEEE, USA, vol. 15, No. 3, Sep. 1, 2018, pp. 1063-1075, XP011689796, DOI: 10.1109/TNSM.2018.2827933 [retrieved on Sep. 6, 2018].
(Continued)

*Primary Examiner* — Santosh R Poudel
(74) *Attorney, Agent, or Firm* — DAY PITNEY LLP; George N. Chaclas

(57) ABSTRACT

A power tracking system includes a power application that receives live power data from multiple power devices that are operably connected to a personal area network (PAN) during operation of the PAN. The system stores the live power data and uses historical power data that includes previously collected live power data corresponding to the multiple power devices that was collected during previous operations to generate prediction data, including a predicted runtime of the PAN. The live power data and prediction data are displayed to a user on a user interface and is used by components of the system to model and predict power requirements and power usage of the PAN components.

20 Claims, 28 Drawing Sheets

(51) Int. Cl.
*H04L 51/56* (2022.01)
*H04W 4/12* (2009.01)

(58) Field of Classification Search
CPC ........ H04L 51/066; H04W 4/12; H04W 4/18; G06F 1/163; G06F 1/3212; G06F 3/04847; G06F 1/28
See application file for complete search history.

(56) References Cited

U.S. PATENT DOCUMENTS

| | | | |
|---|---|---|---|
| 3,154,788 | A | 11/1964 | Simpson |
| 3,264,392 | A | 8/1966 | Taplin |
| 3,280,246 | A | 10/1966 | Lawson et al. |
| 3,383,705 | A | 5/1968 | Raschke |
| 3,758,889 | A | 9/1973 | Erb |
| 3,967,050 | A | 6/1976 | Makihara et al. |
| 4,044,268 | A | 8/1977 | Hammel et al. |
| 4,263,679 | A | 4/1981 | Erlendson |
| 4,449,787 | A | 5/1984 | Burbo et al. |
| 4,589,075 | A | 5/1986 | Buennagel |
| 4,810,832 | A | 3/1989 | Spinner et al. |
| 4,888,831 | A | 12/1989 | Oleson |
| 4,910,100 | A | 3/1990 | Nakanishi et al. |
| 4,931,947 | A | 6/1990 | Werth et al. |
| 4,942,628 | A | 7/1990 | Freund |
| 4,943,222 | A | 7/1990 | Nathoo |
| 5,042,093 | A | 8/1991 | Legendre |
| 5,153,496 | A | 10/1992 | Laforge |
| 5,258,244 | A | 11/1993 | Hall et al. |
| 5,315,718 | A | 5/1994 | Barson et al. |
| 5,321,349 | A | 6/1994 | Chang |
| 5,416,922 | A | 5/1995 | Horvat et al. |
| 5,551,094 | A | 9/1996 | Navone |
| 5,570,002 | A | 10/1996 | Castleman |
| 5,572,749 | A | 11/1996 | Ogden |
| 5,581,819 | A | 12/1996 | Garneau |
| 5,601,852 | A | 2/1997 | Seemann |
| 5,650,240 | A | 7/1997 | Rogers |
| 5,675,754 | A | 10/1997 | King et al. |
| 5,683,831 | A | 11/1997 | Baril et al. |
| 5,754,445 | A | 5/1998 | Jouper et al. |
| 5,794,272 | A | 8/1998 | Workman et al. |
| 5,831,198 | A | 11/1998 | Turley et al. |
| 5,898,291 | A | 4/1999 | Hall |
| 5,898,949 | A | 5/1999 | Barthold et al. |
| 5,903,764 | A | 5/1999 | Shyr et al. |
| 5,914,585 | A | 6/1999 | Grabon |
| 5,945,806 | A | 8/1999 | Faulk |
| 5,977,656 | A | 11/1999 | John |
| 5,986,437 | A | 11/1999 | Lee |
| 6,014,013 | A | 1/2000 | Suppanz et al. |
| 6,025,696 | A | 2/2000 | Lenhart et al. |
| 6,032,297 | A | 3/2000 | Barthold et al. |
| 6,046,514 | A | 4/2000 | Rouillard et al. |
| 6,081,931 | A | 7/2000 | Burns et al. |
| 6,087,035 | A | 7/2000 | Rogers et al. |
| 6,136,228 | A | 10/2000 | Hirai et al. |
| 6,137,280 | A | 10/2000 | Ackermann et al. |
| 6,198,642 | B1 | 3/2001 | Kociecki |
| 6,221,522 | B1 | 4/2001 | Zafred et al. |
| 6,223,077 | B1 | 4/2001 | Schweizer et al. |
| 6,246,215 | B1 | 6/2001 | Popescu-Stanesti |
| 6,265,846 | B1 | 7/2001 | Flechsig et al. |
| 6,271,646 | B1 | 8/2001 | Evers et al. |
| 6,292,952 | B1 | 9/2001 | Watters et al. |
| 6,366,061 | B1 | 4/2002 | Carley et al. |
| 6,366,333 | B1 | 4/2002 | Yamamoto et al. |
| 6,370,050 | B1 | 4/2002 | Peng et al. |
| 6,376,938 | B1 | 4/2002 | Williams |
| 6,396,391 | B1 | 5/2002 | Binder |
| 6,459,175 | B1 | 10/2002 | Potega |
| 6,476,581 | B2 | 11/2002 | Lew |
| 6,485,852 | B1 | 11/2002 | Miller et al. |
| 6,492,050 | B1 | 12/2002 | Sammes |
| 6,530,026 | B1 | 3/2003 | Bard |
| 6,539,484 | B1 | 3/2003 | Cruz |
| 6,541,879 | B1 | 4/2003 | Wright |
| 6,608,463 | B1 | 8/2003 | Kelly et al. |
| 6,627,339 | B2 | 9/2003 | Haltiner |
| 6,628,011 | B2 | 9/2003 | Droppo et al. |
| 6,633,823 | B2 | 10/2003 | Bartone et al. |
| 6,690,585 | B2 | 2/2004 | Betts-Lacroix |
| 6,694,270 | B2 | 2/2004 | Hart |
| 6,703,722 | B2 | 3/2004 | Christensen |
| 6,707,284 | B2 | 3/2004 | Lanni |
| 6,828,695 | B1 | 12/2004 | Hansen |
| 6,831,848 | B2 | 12/2004 | Lanni |
| 6,925,361 | B1 | 8/2005 | Sinnock |
| 6,968,575 | B2 | 11/2005 | Durocher |
| 6,977,921 | B1 | 12/2005 | Dolan |
| 6,981,863 | B2 | 1/2006 | Renault et al. |
| 6,985,799 | B2 | 1/2006 | Zalesski et al. |
| 7,001,682 | B2 | 2/2006 | Haltiner |
| 7,002,265 | B2 | 2/2006 | Potega |
| 7,036,028 | B2 | 4/2006 | Zalesski |
| 7,071,660 | B2 | 7/2006 | Xu et al. |
| 7,076,592 | B1 | 7/2006 | Ykema |
| 7,105,946 | B2 | 9/2006 | Akiyama et al. |
| 7,124,449 | B2 | 10/2006 | Sutter et al. |
| 7,166,937 | B2 | 1/2007 | Wilson et al. |
| 7,178,175 | B2 | 2/2007 | Rogers et al. |
| 7,188,003 | B2 | 3/2007 | Ransom et al. |
| 7,203,849 | B2 | 4/2007 | Dove |
| 7,212,407 | B2 | 5/2007 | Beihoff et al. |
| 7,226,681 | B2 | 6/2007 | Florence et al. |
| 7,235,321 | B2 | 6/2007 | Sarkar et al. |
| 7,243,243 | B2 | 7/2007 | Gedeon |
| 7,256,516 | B2 | 8/2007 | Buchanan et al. |
| 7,274,175 | B2 | 9/2007 | Manolescu |
| 7,385,373 | B2 | 6/2008 | Doruk et al. |
| 7,388,349 | B2 | 6/2008 | Elder et al. |
| 7,408,794 | B2 | 8/2008 | Su |
| 7,436,687 | B2 | 10/2008 | Patel |
| 7,444,445 | B2 | 10/2008 | Kubo et al. |
| 7,506,179 | B2 | 3/2009 | Templeton |
| 7,531,915 | B2 | 5/2009 | Wang et al. |
| 7,541,693 | B2 | 6/2009 | Lilly et al. |
| 7,590,684 | B2 | 9/2009 | Herrmann |
| 7,595,815 | B2 | 9/2009 | Donovan et al. |
| 7,618,260 | B2 | 11/2009 | Daniel et al. |
| 7,646,107 | B2 | 1/2010 | Smith |
| 7,674,543 | B2 | 3/2010 | Chiang et al. |
| 7,675,758 | B2 | 3/2010 | Artusi et al. |
| 7,683,575 | B2 | 3/2010 | Berdichevsky et al. |
| 7,701,082 | B2 | 4/2010 | Lazarovich et al. |
| 7,770,239 | B1 | 8/2010 | Goldman et al. |
| 7,778,940 | B2 | 8/2010 | Mazzarella |
| 7,808,122 | B2 | 10/2010 | Menas et al. |
| 7,814,348 | B2 | 10/2010 | Krajcovic et al. |
| 7,834,479 | B2 | 11/2010 | Capp et al. |
| 7,838,142 | B2 | 11/2010 | Scheucher |
| 7,844,370 | B2 | 11/2010 | Pollack et al. |
| 7,847,532 | B2 | 12/2010 | Potter et al. |
| 7,849,341 | B2 | 12/2010 | Sugiyama |
| 7,855,528 | B2 | 12/2010 | Lee |
| 7,873,844 | B2 | 1/2011 | Diab et al. |
| 7,928,720 | B2 | 4/2011 | Wang |
| D640,192 | S | 6/2011 | Robinson et al. |
| 8,020,220 | B2 | 9/2011 | Mcelroy et al. |
| 8,073,554 | B2 | 12/2011 | Vezza et al. |
| 8,086,281 | B2 | 12/2011 | Rabu et al. |
| 8,103,892 | B2 | 1/2012 | Krajcovic |
| 8,106,537 | B2 | 1/2012 | Casey et al. |
| 8,138,631 | B2 | 3/2012 | Allen et al. |
| 8,140,194 | B2 | 3/2012 | Iino et al. |
| 8,164,217 | B1 | 4/2012 | Miller |
| 8,178,999 | B2 | 5/2012 | Burger et al. |
| 8,193,661 | B2 | 6/2012 | Jagota et al. |
| 8,255,090 | B2 | 8/2012 | Frader-Thompson et al. |
| 8,279,642 | B2 | 10/2012 | Chapman et al. |
| 8,294,307 | B2 | 10/2012 | Tsai |
| 8,304,122 | B2 | 11/2012 | Poshusta et al. |
| 8,312,299 | B2 | 11/2012 | Tremel et al. |

(56) References Cited

U.S. PATENT DOCUMENTS 8,315,745 B2 11/2012 Creed
8,333,619 B2 12/2012 Kondo et al.
8,352,758 B2 1/2013 Atkins et al.
8,353,066 B2 1/2013 Rogers et al.
8,363,797 B2 1/2013 Binder
8,375,229 B2 2/2013 Saeki
8,401,709 B2 3/2013 Cherian et al.
8,425,240 B2 4/2013 Lee et al.
8,438,619 B2 5/2013 Olson
8,447,435 B1 5/2013 Miller et al.
8,455,794 B2 6/2013 Vogel
8,462,799 B2 6/2013 Molsberry et al.
8,466,662 B2 6/2013 Nania et al.
8,476,581 B2 7/2013 Babayoff et al.
8,494,479 B2 7/2013 Budampati et al.
8,508,166 B2 8/2013 Marcinkiewicz et al.
8,548,607 B1 10/2013 Belz et al.
8,599,588 B2 12/2013 Adest et al.
8,611,107 B2 12/2013 Chapman et al.
8,614,023 B2 12/2013 Poshusta et al.
8,633,619 B2 1/2014 Robinson et al.
8,636,011 B2 1/2014 Strickland et al.
8,638,011 B2 1/2014 Robinson et al.
8,643,326 B2 2/2014 Campanella et al.
8,648,492 B2 2/2014 Craig et al.
8,649,914 B2 2/2014 Miller et al.
8,682,496 B2 3/2014 Schweitzer et al.
D706,711 S 6/2014 Robinson et al.
8,739,318 B2 6/2014 Durocher
8,763,077 B2 6/2014 Oberheide et al.
8,775,828 B2 7/2014 Coonan et al.
8,775,846 B2 7/2014 Robinson et al.
8,781,640 B1 7/2014 Miller
8,796,888 B2 8/2014 Rice et al.
8,826,463 B2 9/2014 Teetzel et al.
8,829,713 B2 9/2014 Ishigaki et al.
8,849,471 B2 9/2014 Daniel et al.
8,853,891 B2 10/2014 Soar
8,854,389 B2 10/2014 Wong et al.
8,890,474 B2 11/2014 Kim et al.
8,901,774 B2 12/2014 Yan et al.
8,913,406 B2 12/2014 Guthrie et al.
8,970,176 B2 3/2015 Ballatine et al.
8,984,665 B2 3/2015 Celona et al.
9,041,349 B2 5/2015 Bemmel et al.
9,043,617 B2 5/2015 Miki
9,093,862 B2 7/2015 Dennis et al.
9,101,175 B2 8/2015 Redpath et al.
9,142,957 B2 9/2015 Malmberg et al.
9,158,294 B2 10/2015 Carralero et al.
9,190,673 B2 11/2015 Venkataraman et al.
9,203,302 B2 12/2015 Kelly
9,207,735 B2 12/2015 Khaitan et al.
9,216,523 B2 12/2015 Monforte, II et al.
9,247,779 B1 2/2016 Aloumanis et al.
9,307,803 B1 4/2016 Folgar
9,337,943 B2 5/2016 Mosebrook et al.
9,343,758 B2 5/2016 Poshusta et al.
9,356,173 B2 5/2016 Okandan et al.
9,364,975 B2 6/2016 Preisler et al.
9,450,274 B2 9/2016 Vo et al.
9,452,475 B2 9/2016 Armstrong et al.
9,502,894 B2 11/2016 Holmberg et al.
9,560,049 B2 1/2017 Srinivasan
9,634,491 B2 4/2017 Robinson et al.
9,698,596 B2 7/2017 Sauer et al.
9,722,435 B2 8/2017 Park
9,807,319 B2 10/2017 Teich et al.
10,063,594 B2 8/2018 Winn et al.
10,079,488 B2 9/2018 Challancin
10,165,817 B2 1/2019 Redpath et al.
10,250,134 B2 4/2019 Long et al.
10,324,290 B2 6/2019 Weller et al.
10,333,315 B2 6/2019 Robinson et al.
10,343,552 B2 7/2019 Ashcraft et al.
10,448,695 B2 10/2019 Folgar
D900,407 S 10/2020 Hanudel et al.
10,884,475 B1 * 1/2021 Wang .................... G06F 1/3296
10,928,163 B2 2/2021 Zimmer
11,353,159 B2 6/2022 Roth
2002/0135492 A1 9/2002 Reagan et al.
2003/0006905 A1 1/2003 Shieh et al.
2003/0054215 A1 3/2003 Doshi et al.
2003/0085621 A1 5/2003 Potega
2003/0234729 A1 12/2003 Shen
2004/0061380 A1 4/2004 Hann et al.
2004/0125618 A1 7/2004 De Rooij et al.
2004/0239287 A1 12/2004 Batts
2005/0037241 A1 2/2005 Schneider et al.
2005/0062019 A1 3/2005 Yukinobu
2005/0102043 A1 5/2005 Menas et al.
2005/0217006 A1 10/2005 Sutter et al.
2005/0275372 A1 12/2005 Crowell
2006/0101560 A1 5/2006 Ketterer et al.
2006/0127725 A9 6/2006 Sarkar et al.
2007/0007823 A1 1/2007 Huang et al.
2007/0058332 A1 * 3/2007 Canterbury ......... G07F 17/3202
361/679.41
2007/0078230 A1 4/2007 Lai
2007/0141424 A1 6/2007 Armstrong et al.
2007/0184339 A1 8/2007 Scheucher
2007/0222301 A1 9/2007 Fadell et al.
2007/0257654 A1 11/2007 Krajcovic
2008/0024007 A1 1/2008 Budampati et al.
2008/0128287 A1 6/2008 Wu et al.
2008/0130321 A1 6/2008 Artusi et al.
2008/0215694 A1 * 9/2008 Chen ....................... H04L 51/56
709/206
2008/0263752 A1 10/2008 Solinsky et al.
2008/0269953 A1 10/2008 Steels et al.
2008/0289004 A1 * 11/2008 Hauser ................ H04L 63/1458
726/3
2008/0305839 A1 12/2008 Karaoguz et al.
2009/0079263 A1 3/2009 Crumm et al.
2009/0091310 A1 4/2009 Levenson et al.
2009/0178740 A1 7/2009 Lenze et al.
2009/0222978 A1 9/2009 Kenneth
2009/0243390 A1 10/2009 Oto
2009/0271642 A1 10/2009 Cheng et al.
2010/0001689 A1 1/2010 Hultman et al.
2010/0076615 A1 3/2010 Daniel et al.
2010/0083413 A1 4/2010 McGovern
2010/0130162 A1 5/2010 Yang
2010/0134077 A1 6/2010 Krajcovic
2010/0229286 A1 9/2010 Ahlgren et al.
2010/0280676 A1 11/2010 Pabon et al.
2010/0295381 A1 11/2010 Burger et al.
2011/0006603 A1 1/2011 Robinson et al.
2011/0007491 A1 1/2011 Robinson et al.
2011/0026282 A1 2/2011 Chapman et al.
2011/0031911 A1 2/2011 Marcinkiewicz et al.
2011/0031958 A1 2/2011 Wang
2011/0091029 A1 4/2011 Leblanc
2011/0094018 A1 4/2011 Rogers et al.
2011/0154619 A1 6/2011 Ward et al.
2011/0184585 A1 7/2011 Matsuda et al.
2011/0193416 A1 8/2011 Campanella et al.
2011/0198933 A1 8/2011 Ishigaki et al.
2011/0234000 A1 9/2011 Yan et al.
2011/0261601 A1 10/2011 Chapman et al.
2011/0277222 A1 11/2011 Garneau et al.
2011/0278957 A1 11/2011 Eckhoff et al.
2012/0002046 A1 1/2012 Rapoport et al.
2012/0007432 A1 1/2012 Rice et al.
2012/0011233 A1 1/2012 Dixon et al.
2012/0092903 A1 4/2012 Nania et al.
2012/0098334 A1 4/2012 Holmberg et al.
2012/0144565 A1 6/2012 Huh
2012/0144567 A1 6/2012 Huh
2012/0167281 A1 7/2012 Gennrich et al.
2012/0174294 A1 7/2012 Sackett
2012/0205976 A1 8/2012 Shih et al.
2012/0319504 A1 12/2012 Malmberg et al.
2012/0326516 A1 12/2012 Gurunathan et al.

(56) References Cited

U.S. PATENT DOCUMENTS

2013/0000016 A1 1/2013 Hall et al.
2013/0038306 A1 2/2013 Kelly et al.
2013/0163302 A1 6/2013 Li et al.
2013/0191967 A1 8/2013 Harris
2013/0239303 A1 9/2013 Cotterman et al.
2013/0278216 A1 10/2013 Son et al.
2013/0293013 A1 11/2013 Templeton et al.
2014/0091623 A1 4/2014 Shippy et al.
2014/0095915 A1 4/2014 Long et al.
2014/0097685 A1 4/2014 Jun et al.
2014/0103720 A1 4/2014 Robinson et al.
2014/0130241 A1 5/2014 Abdollahi et al.
2014/0209377 A1 7/2014 Wang
2014/0240834 A1 8/2014 Mason
2014/0292081 A1 10/2014 Long et al.
2014/0312828 A1 10/2014 Vo et al.
2015/0137606 A1 5/2015 Adest et al.
2015/0157079 A1 6/2015 Auranen et al.
2015/0172827 A1 6/2015 Sharpe et al.
2015/0237771 A1 8/2015 Natter et al.
2015/0323945 A1 11/2015 Perier
2015/0324696 A1* 11/2015 Hirschbold ............. H02J 3/003 706/46
2016/0075338 A1 3/2016 Henn
2016/0094071 A1 3/2016 Nge et al.
2016/0171864 A1 6/2016 Ciaramelletti et al.
2016/0187949 A1* 6/2016 Sen .................. H04W 52/0277 713/310
2016/0202748 A1* 7/2016 Lin ...................... G06F 1/3212 713/340
2016/0286156 A1 9/2016 Kovac
2016/0295948 A1 10/2016 Dowd et al.
2016/0329811 A1 11/2016 Du et al.
2016/0336745 A1* 11/2016 Pandya .................. H02J 7/342
2016/0342186 A1 11/2016 Ragupathi et al.
2017/0027268 A1 2/2017 Folgar
2017/0077704 A1 3/2017 Faley et al.
2017/0089172 A1 3/2017 Zhao
2017/0192474 A1 7/2017 Robinson et al.
2017/0269460 A1 9/2017 Fagerkvist
2017/0338665 A1 11/2017 Long et al.
2018/0239144 A1 8/2018 Woods et al.
2018/0308397 A1 10/2018 Sugimoto et al.
2019/0101359 A1 4/2019 Zimmer
2019/0157885 A1 5/2019 Rippel et al.
2020/0008508 A1 1/2020 Havola
2020/0019236 A1 1/2020 Parkinson et al.
2020/0197997 A1 6/2020 Zhou et al.
2020/0219036 A1* 7/2020 Decamp ................ H04W 4/021
2020/0408847 A1* 12/2020 Takada ............... G01R 31/3842
2021/0075326 A1 3/2021 Long et al.
2021/0247059 A1 8/2021 Johnson et al.
2021/0247618 A1 8/2021 Moore et al.
2021/0315314 A1 10/2021 Teetzel et al.
2022/0071336 A1 3/2022 Franzino et al.
2022/0091634 A1 3/2022 Martin et al.
2022/0224668 A1 7/2022 Andolina

FOREIGN PATENT DOCUMENTS

CN 109923500 B 1/2022
DE 630473 C 5/1936
DE 8138228 U1 6/1983
EP 0335316 A2 10/1989
EP 1966850 A1 9/2008
EP 2230743 A1 11/2013
GB 1114214 A 5/1968
WO 2006126023 A1 11/2006
WO 2007012785 A1 2/2007
WO 2007048837 A1 5/2007
WO 2007076440 A1 7/2007
WO 2008072014 A1 6/2008
WO 2008072015 A1 6/2008
WO 2008090378 A1 7/2008
WO 2011023678 A1 3/2011
WO 2011046645 A1 4/2011
WO 2011113280 A1 9/2011
WO 2012122315 A1 9/2012
WO 2013083296 A1 6/2013
WO 2014165469 A1 10/2014
WO 2016016445 A2 4/2016
WO 2016105273 A1 6/2016
WO 2017087130 A1 5/2017
WO 2018017908 A1 1/2018
WO 2018173313 A1 9/2018
WO 2020109887 A1 6/2020
WO 2020217089 A1 10/2020
WO 2020/237189 A1 11/2020
WO 2022115531 A1 6/2022

OTHER PUBLICATIONS

EP Extended Search Report corresponding to Application No. 23173563.0, dated Oct. 11, 2023, 9 pages.

EP Extended Search Report corresponding to Application No. 23173566.3, dated Oct. 12, 2023, 11 pages.

International Search Report and Written Opinion corresponding to Application No. PCT/US2023/077642, dated Feb. 28, 2024, 19 pages.

Alibaba.com, 5KW charger controller for wind power supply and solar cell, 2009, 3 pages.

Amazon.com: Morningstar TriStar-45 Solar Charge Controller for solar/wind generator/Wind Turbine-45 amps, 2009, 6 pages.

Bruce, Gregg, et al.,www.rfdesign.com, Defense Electronics, Military takes aim at high battery costs, Apr. 2005, pp. 20-25.

CA Office Action in Corresponding European Patent Application No. 2020033207, mailed Jan. 23, 2023; 5 pgs.

EP Search Report in Corresponding European Patent Application No. 20808866.6, dated May 3, 2022, 25 pages.

EP Search Report in Corresponding European Patent Application No. 16866830.9 dated Mar. 1, 2019, 9 pages.

Khan, F.H., et al., "Bi-directional power manager management and fault tolerant feature in a -5KW multivlevel dc-dc converter with modular architecture" www.ietdl.org, IET Power Electronics, (2009) vol. 2, No. 5, pp. 595-604.

Hoffart, Fran, New charger topology maximizes battery charging speed (1998) 2 pages.

Green Plug, www.greenplug.us, One plug one planet (2009) 7 pages.

Green plug partners with wipower for advanced wireless power systems (2009) greentmcnet.com/topic,s/green/articles/57729-green-plug-partners-with-wipower-advanced-wireless-power.htm, 3 pages.

Cipriano, Greg, et al., Protonex, Joint Service Power Expo (2009) 38 pages.

BA 5590 Lithium Battery, Jul. 26, 2006, http://defense-update.com/products/b/ba5590.htm, 1 page.

SFC smart fuel cell launches joint power manager (Jun. 2009) http://fuelcellsworks.com/news/2009/06/04/sfc-smart-fuel-cell-launches-joint-power-manager, 4 pages.

Evans, Ian C., et al., "High power clean dc bus generation using ac-link ac to dc power voltage conversion, dc regulation, and galvanic isolation" IEEE electric ship technologies symposium (2009), 12 pages.

Hong, Inki, et al., "Power Optimization Df variable-voltage core-based systems" IEEE Transactions on computer-aided design of integrated circuits and systems, Dec. 1999, vol. 18, No. 12, 13 pages.

International Search Report and Written Opinion for International Application No. PCT/US2016/058922, dated Feb. 9, 2017, 6 pages.

International Search Report and Written Opinion for International Application No. PCT/US2020/033207, dated Jul. 30, 2020, 18 pages.

International Search Report and Written Opinion for International Application PCT/US2016/062863 dated Mar. 30, 2017, 6 pages.

Abu-Qahouq, Jaber A., et al., "Control Scheme for high-efficiency high-performance two-stage power converters" (2009)Twenty-Fourth Annual IEEE Applied Power Electronics Conference and Exposition, 7 pages.

(56) References Cited

OTHER PUBLICATIONS

Duarte, Jorge L., et al., "Three-Port Bidirectional converter for hybrid fuel cell systems" IEEE Transactions on Power Electronics, 2007, vol. 22, No. 2, 8 pages.
Garcia, Julio, "Efficiency improvements in autonomous electric vehicles using dynamic commutation of energy resources" Barcelona Forum on Ph.D. Research in Electronic Engineering (2009), 2 pages.
Karlsson, Per, et al., "DC bus voltage control for a distributed power system" IEEE Transactions on power electronics, Nov. 2003, v: 18, n:6, pp. 1405-1412.
Fursin, Leonid, et al., "Development of compact variable-voltage, bi-directional 100kw dc-dc converter" (2007), 9 pages.
Becherif, M., et al., "Advantages of variable DC bus voltage for hybrid electrical vehicle" Vehicle power and propulsion conference (VPPC), (2010) IEEE, IEEE Power and Propulsion conference (VPPC), 201, pp. 1-6.
Conti, M., SystemC modeling of a dynamic power management architecture (2006) 6 pages.
Dirjish, Mat, "Enginer seeks cure for common wall warts" Aug. 2008, http://electronicdesign.com/Articles/Index.cfm?AD=1&ArticlesID-19515; 3 pages.
Merkle, Matthew Alan, "Variable bus voltage modeling for series hybrid electric vehicle simulation" Thesis submitted to the faculty of Virginia Polytechnic Institute and State University Dec. 1997, 33 pages.
Rothman, Wilson, "New Honeywell HDMI cables Heals Self, But At What Cost?" Aug. 2007, gizmodo.com/295076/new-Honeywell-hdmi-cable-heals-self-but-at-what-cost, 3 pages.
Paneltronics, "What is Power Sign?" Multiplex Distribution Systems (2006) www.paneltronics.comlip.asp?op=Multiplex%20Distributions%20Systems, 2 pages.
Reuters, Protonex to Launch Soldier-Worn Portable Power Management Systems, Feb. 2009, www.reuters.com/article/pressRelease/idUS159777+17-Feb. 2009+BW20090217, 3 pages.
Ocean Server Technology, Inc., Intelligent Battery and Power System, May 2008, 4 pages.
Ocean Server Technology, Inc., Smart Li-ion packs, integrated chargers, ultra high efficiency dc-dc converters, Integrate battery power or backup, fully engineered (plug and run) and 95 to 25,000+ watt-hour clusters, 2007, 4 pages.
CA Office Action issued in corresponding Canadian patent application No. 3,138,704, mailed Jan. 10, 2022, 5 pages.
Podesser, Peter, "Portable power management for soldiers; Fuel cell hybrid system is lighter, safer" Military Embedded Systems, OpenSystemsMedia (May 2009) www.mil-embedded.com/articles/id/?3966, 7 pages.
About SFC Smarl Fuel Cell (2009) replay.waybackmachine.org/20090122152343/http://ww.sfc.com/en/about-sfc.html, 1 page.
The SFC Power Manager—The Technology (2009) replay.waybackmachine.org/20090312005238/http://ww.sfc.com/en/man-portable-technology-power-manager.html, 2 pages.
Reyneri, Leonardo M., et al., IAC-09.C3.2.8, A redundant power bus for distributed power management for a modular satellite (2009), 3 pages.
Wolfgang, Richter, Chip for saving power, Aug. 2007, 2 pages.
Button, Robert M., Nasa/TM-2002-211370, Intelligent Systems for Power Management and Distribution, Feb. 2002, 12 pages.
SFC Energy Press Release, SFC receives Commercial order for portable fuel cells, (Feb. 11, 2008) Retrieved from Internet: www.sfc.com/index2.php option=com_pressreleasees&Itemid=467&id=1050&lang=en&pop-1&page=0; 1 page.
Singh, Pritpal, et al., Conference Record of the Twenty-Eighth IEEE Photovoltaic Specialists Conference, Fuzzy Logic-based Solar Charge Controller for Microbatteries (2000) pp. 172-1729.
Energy Harvesting Journal: Soldier-worn portable power management system, (2009) www.energyharvestingjournal. corniarticlesisoldier-worn-portable-power -management-system-00001375 .asp? sessionid=1, 2 pages.
Battery Management Systems (BMS) (2009) www.mpoweruk.com/bms.htm, 12 pages.
Nihon Kohden: Products-Monitoring, Smart Cable Technology, www.nkusa.com/prod-monitor-smart-cable.htm, 1 page.
EP Extended Search Report in Application No. 22209825.3, dated Apr. 13, 2023, 4 pages.
Dangora, Lisa M., et al., "Deep-Drawing Forming Trials on a Cross-Ply Thermoplastic Lamina for Helmet Preform Manufacture", Journal of Manufacturing Science and Engineering, vol. 139, No. 3, Mar. 2017, 8 pages.
International Search Report and Written Opinion corresponding to Application No. PCT/US2020/033207, dated Jul. 30, 2020.
International Search Report and Written Opinion corresponding to Application No. PCT/IB2013/003041, dated on Feb. 9, 2015, 12 pages.
International Search Report and Written Opinion corresponding to Application No. PCT/US2021/016807, dated on Dec. 28, 2021, 11 pages.
EP Extended Search Report corresponding to U.S. Appl. No. 22/189,026, dated Jan. 23, 2023, 7 pages.
International Search Report and Written Opinion corresponding to Application No. PCT/US2010/41335, dated Mar. 24, 2011,11 pages.
Lu et al., A Novel Surface Texture Shape for Directional Friction Control, Tribology Letters, 2018, vol. 66, No. 51, 13 pages.
AU Examination Report corresponding to Application No. 2010307261, dated Jul. 23, 2013.
International Search Report and Written Opinion corresponding to Application No. PCTUS2014/032455, dated Sep. 8, 2014, 12 pages.
EP Search Report corresponding to Application No. 14780196.3, dated Dec. 9, 2016, 11 pages.
International Search Report and Written Opinion corresponding to Application No. PCT/US2022/28754, dated Aug. 29, 2022, 12 pages.
Kriechenbauer et al., "Deep Drawing with Superimposed Low-Frequency Vibrations on Servo-Screw Presses", Procedia Engineering, vol. 81, 2014, pp. 905-913.
AU Examination Report corresponding to Application No. 2014248342, dated Sep. 7, 2017, 3 pages.
Patel et al., "Parametric Analysis of Deep Drawing Process for Hemisphere Dome Shape of Steel AISI 1023", Journal of Basic and Applied Engineering Research, vol. 1, No. 2, Oct. 2014, pp. 9-16.
International Preliminary Report on Patentability corresponding to Application No. PCT/US2021/016807, dated on Jul. 28, 2022, 8 pages.
International Search Report and Written Opinion corresponding to Application No. PCT/JP2008/066605, dated Dec. 16, 2008, 11 pages.
CA Office Action corresponding to Application No. 3,138,704, dated Jan. 22, 2022, 5 pages.

* cited by examiner

POWER TRACKING USING A SOLDIER NETWORK MIDDLEWARE SYSTEM

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2022-2023, Galvion, LTD.

CROSS-REFERENCE TO RELATED APPLICATIONS

This application claims the benefit of priority of U.S. Provisional Application No. 63/342,378 filed on May 16, 2022, and U.S. Provisional Application 63/397,044 filed on Aug. 11, 2022, the disclosures of which are both incorporated herein by reference in its entirety.

FIELD OF THE INVENTION

The inventive technology described herein includes a power tracking system for tracking power usage and availability for power devices included in a soldier ported personal area network (PAN) and for generating alerts, power plans, and runtime estimates corresponding to the PAN.

BACKGROUND

Known soldier-ported power tracking systems that utilize Android OS-based processors have fairly slow information update speeds due to limitations of known technologies. For example, an Android-OS end user device (EUD) typically gathers information from each of multiple power devices individually, which can lead to latency in information flow. Known systems generate predictions of power provision needed to complete a mission and generate estimate of remaining power based on designed performance characteristics of power loads and power supplies.

SUMMARY

The inventive technology described herein includes a middleware messaging system useful for communicating messages between components of a soldier-ported (or intra-solider) personal area network (PAN).

In general, according to one aspect, the subject technology include a power application operating on an end user device (EUD), for example on a tactical smart phone, or on a smart watch. The power application tracks power being used by power loads of the PAN and power available from power sources of the PAN. The power application receives live power data, i.e. data that include instantaneous power draw of each power load and instantaneous power remaining on or provided by each power source. The power application generates power information products including, for example, aggregated instantaneous power draw and power supply, remaining run time of the power network, and one or more alerts. The one or more alerts may inform a user of the PAN that the available power from the one or more power sources has fallen below a threshold level or that a remaining runtime of the power network has dropped below a threshold value. This is advantageous in that a user may be informed that power is running low before the remaining power level corresponds to an imminent failure of the power network, thereby providing the user with sufficient time to acquire and/or connect one or more additional power sources to maintain operation of the PAN.

In some embodiments, the power application, and similar power applications of other soldier PANs, save a log of live power information acquired over the course of a mission, and over the course of multiple missions. The log of live power data may be used to populate a historical power data store, which the power application uses when performing one or more analysis tasks and when generating predictions, such as predicted values of remaining run time. This enables the power application to generate predictions of remaining run time based on historical power data that includes power performance of actual power devices used during real missions. The log of live power information may include metadata corresponding to the live power data, for example time of day (e.g. night vs. day), temperature, humidity, location, type of mission, and any other information that may be relevant to performance characteristics of one or more of the power devices. The historical power data used for a particular mission may be filtered or selected based on metadata corresponding to the historical power data matching conditions expected during the particular mission. For example, the historical data used to generate predictions corresponding to a mission in a desert location may be filtered to include only data corresponding to past desert mission or that include metadata with values that match expected desert conditions, for example with temperature metadata corresponding to expected desert temperatures. In this manner, a system including a power application according to the disclosed technology is enabled to make more accurate predictions by using more relevant historical data as inputs.

In at least one aspect, the subject technology relates to a system for providing information corresponding to one or more devices that are each part of a power network. The system can include at least one network, one or more power devices connected to the at least one network, a user device connected to the at least one network, and a hub for routing messages and power between the one or more power devices and the user device. The user device includes a display device, a user device processor, and a user device memory. A user device power application is stored on the user device memory. The user device power application includes a plurality of machine executable instructions that, when executed by the user device processor, cause the user device processor to receive, from the hub, one or more live power messages. Each of the one or more live power messages includes live power data. The live power data includes one or more of a value of instantaneous power drawn from the hub by one or more power loads comprising the one or more power devices and an amount of power available from one or more power sources comprising the one or more power devices. The plurality of machine executable instructions, when executed by the user device processor, cause the user device processor to retrieve, from a historical power data store, historical power data corresponding to each of the one or more power devices. The plurality of machine executable instructions, when executed by the user device processor, cause the user device processor to generate a prediction of a remaining run time of the one or more power loads, based at least upon the value of instantaneous power used by the one or more power loads, the amount of power available from the one or more power sources, and the historical power data. The plurality of machine executable instructions, when executed by the user device processor, cause the user device processor to display, on the display device of the user device, a user interface (UI) layout comprising the prediction of the remaining run time.

In some embodiments, the hub includes a uniform messaging service comprising a device interface that is communicatively coupled to the hub and the at least one network, a hub processor, a hub memory having stored thereon a hub uniform messaging application including a plurality of machine executable instructions. The plurality of machine executable instructions, when executed by the hub processor, cause the hub processor to receive two or more live power messages from two or more of the one or more power devices, the live power messages including the live power data, to generate, based upon the two or more live power messages, a uniform bridge format message comprising the live power data, and to output the uniform bridge format message to the at least one network for transmission to the user device.

In some embodiments, the user device includes a user device uniform messaging application stored in the user device memory. The user device uniform messaging application includes one or more machine executable instructions that when executed by the user device processor, cause the user device processor to receive the uniform bridge format message, generate, based on the uniform bridge format message, the two or more live power messages, and provide the two or more live power messages to the power application.

In some embodiments, the user device power application further includes machine executable instructions that, when executed by the user device processor, further cause the user device processor to generate, based on the live power data, at least one statistical power information product, and the UI layout further includes the at least one statistical power information product. In some embodiments, the at least one statistical power information product includes a value of a sum of the instantaneous power used by each of the of the one or more power loads. In some embodiments the at least one statistical power information product includes a value of an amount of total power available from the one or more power sources.

In some embodiments, the user device power application further includes machine executable instructions that, when executed by the user device processor, further cause the user device processor to compare a value of the prediction of the remaining run time of the one or more power loads to a threshold value and, based on the comparison, to generate an alert and include the alert on the UI layout.

In some embodiments, the user device power application further includes machine executable instructions that, when executed by the user device processor, further cause the user device processor to determine an identity of each of the one or more power devices, and retrieve, from the historical power database, historical power data corresponding to the identity of each of the one or more power devices.

In some embodiments, the user device memory includes a user device live power data store stored thereon and the user device power application further includes machine executable instructions that, when executed by the user device processor, further cause the user device processor to store the live power data in the user device live power data store.

In some embodiments, the hub memory includes a hub power data store having stored thereon the live power data. In some embodiments, user device power application further includes machine executable instructions that, when executed by the user device processor, further cause the user device processor to request live power data from the hub power data store.

In some embodiments, the historical power data store includes a selected portion of the live power data stored in the user device live data power store. In some embodiments, the live power data stored in the user device live power data power store includes associated mission metadata, and the selected portion of the live power data is selected for inclusion in the historical power database based on a comparison of the mission metadata with one or more characteristics of a planned mission.

In some embodiments, the user device power application further includes machine executable instructions that, when executed by the user device processor, further cause the user device processor to communicate the statistical power information product to an endpoint device that is connected to a second network, the second network being separate from the power network.

In some embodiments, the user device power application further includes machine executable instructions that, when executed by the user device processor, further cause the user device processor to communicate the alert to an endpoint device that is connected to a second network, the second network being different from the power network.

In some embodiments, the power loads include the user device and the user device includes an end user device (EUD) or a smart watch.

The above and other features of the disclosed technology including various novel details of construction and combinations of parts, and other advantages, will now be more particularly described with reference to the accompanying drawings and pointed out in the claims. It will be understood that the particular method and device embodying the disclosed technology are shown by way of illustration and not as a limitation of the subject technology. The principles and features of the disclosed technology may be employed in various and numerous embodiments without departing from the scope of the disclosed technology.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the subject technology. The features of the present technology will best be understood from a detailed description of the subject technology and example embodiments thereof selected for the purposes of illustration and shown in the accompanying drawings.

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted.

Throughout the drawings, reference numbers can be reused to indicate correspondence between reference elements.

Figure 1:
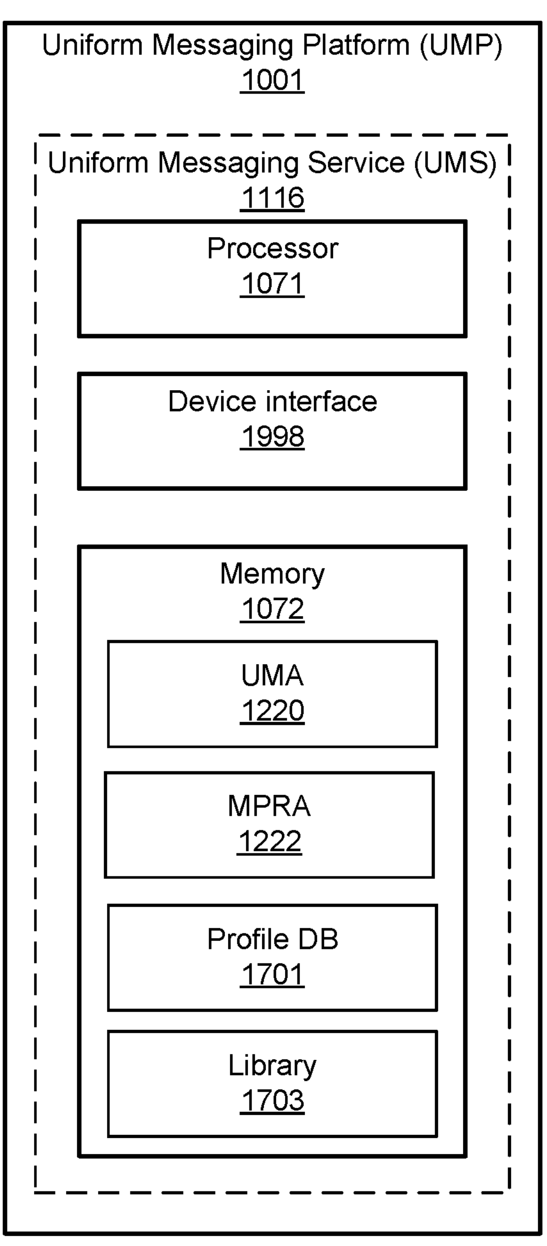

FIG. 1 depicts a photographic rendering of an embodiment of a uniform messaging platform (UMP) according to the technology disclosed herein.

Figure 2A:
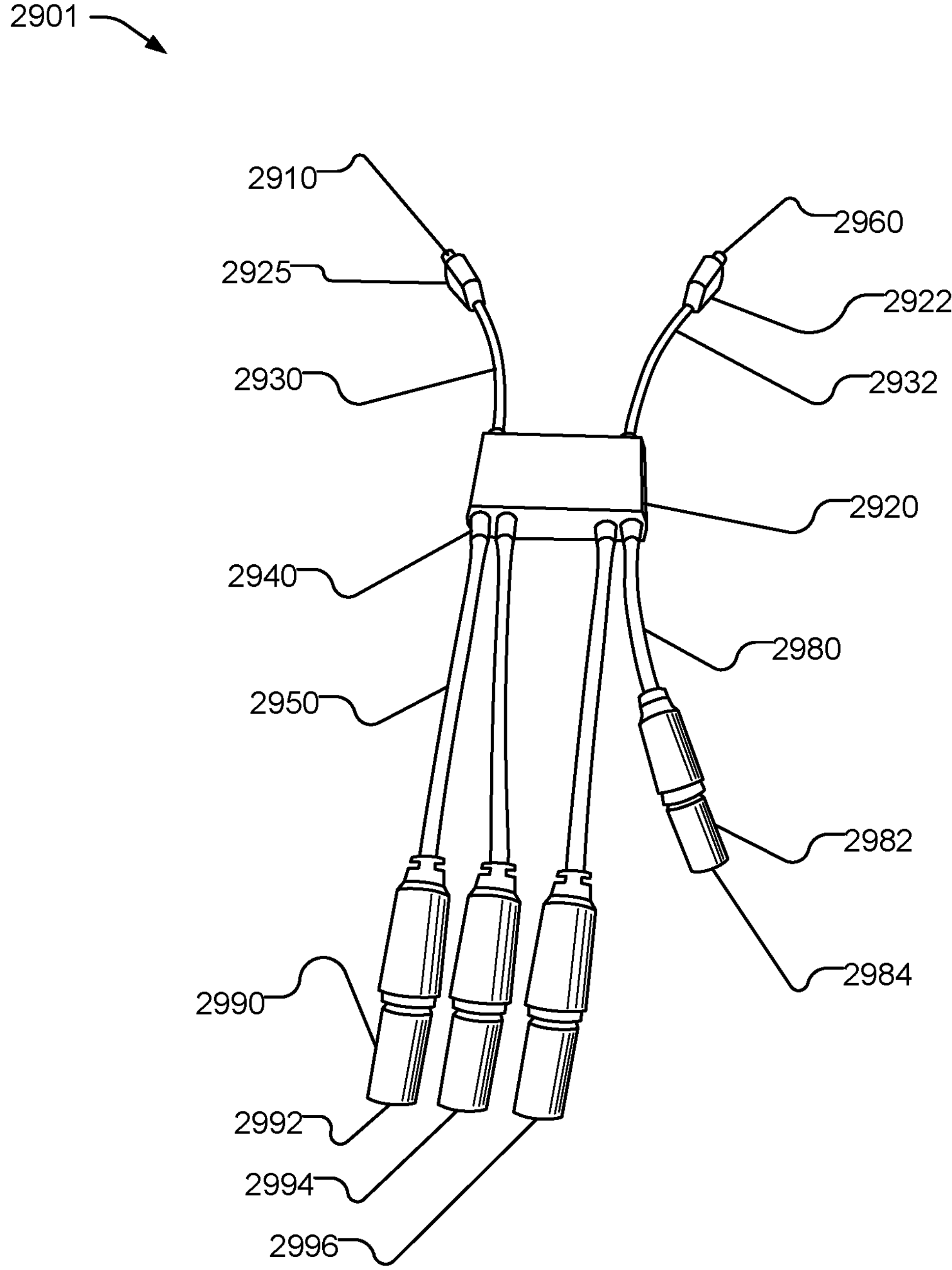

FIG. 2A depicts a perspective view of a first embodiment of exemplary power hub according to the technology disclosed herein.

Figure 2B:
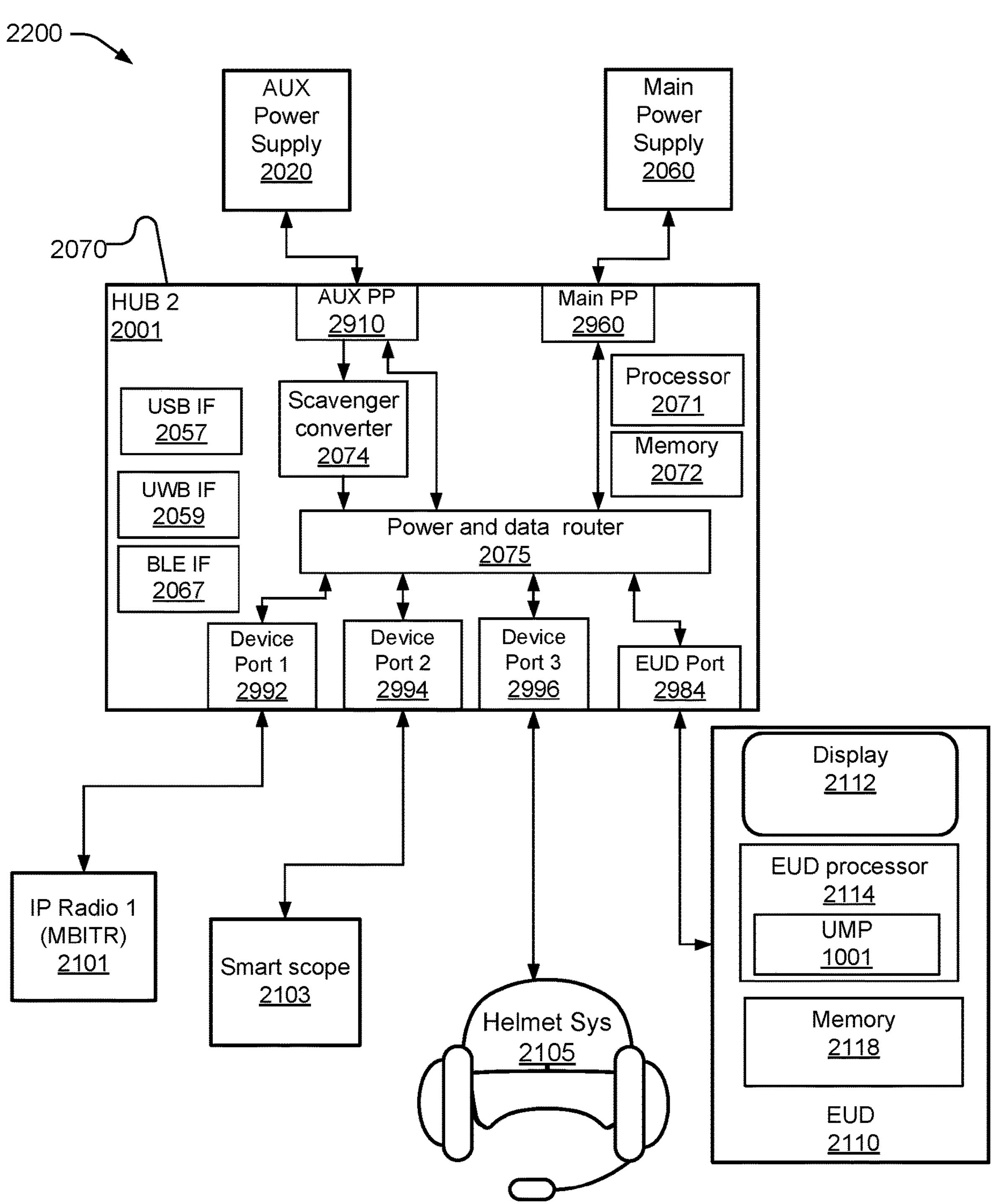

FIG. 2B exemplary schematic diagram of a first embodiment of a system according to the technology disclosed herein.

Figure 3:
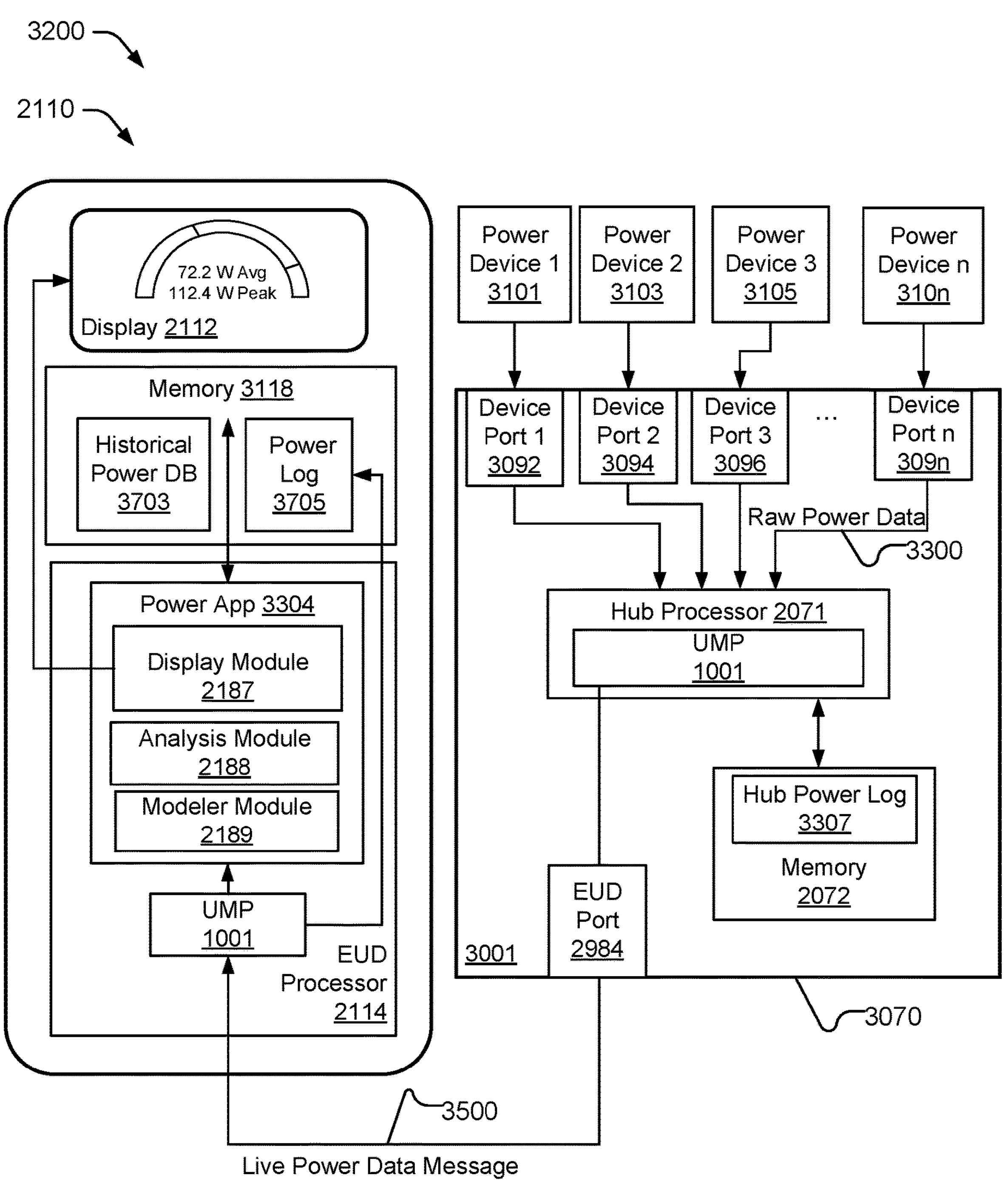

FIG. 3 depicts an exemplary schematic diagram of a second embodiment of a system according to the technology disclosed herein.

Figure 4:
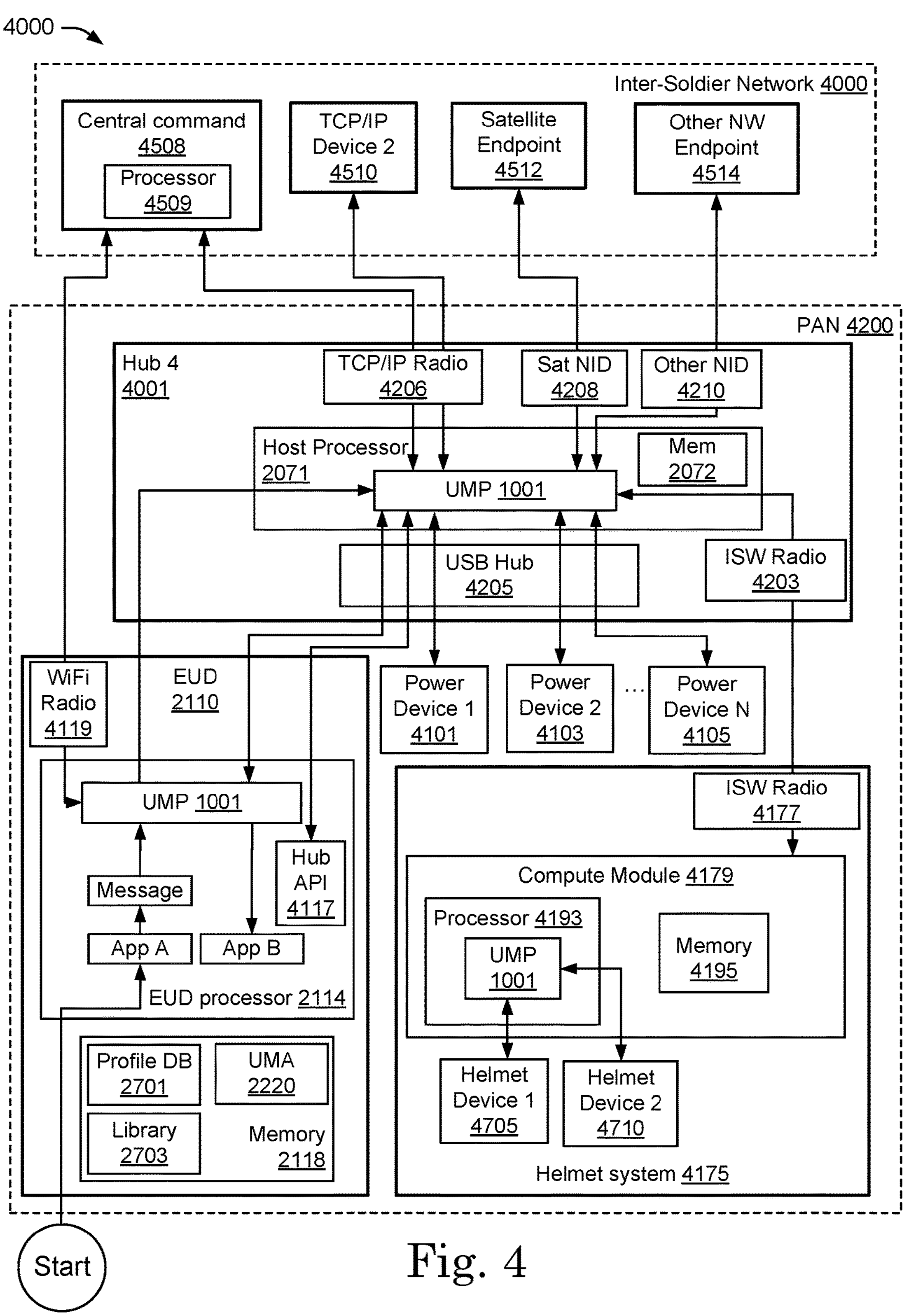

FIG. 4 depicts an exemplary schematic diagram of a third embodiment of a system according to the technology disclosed herein.

Figure 5:
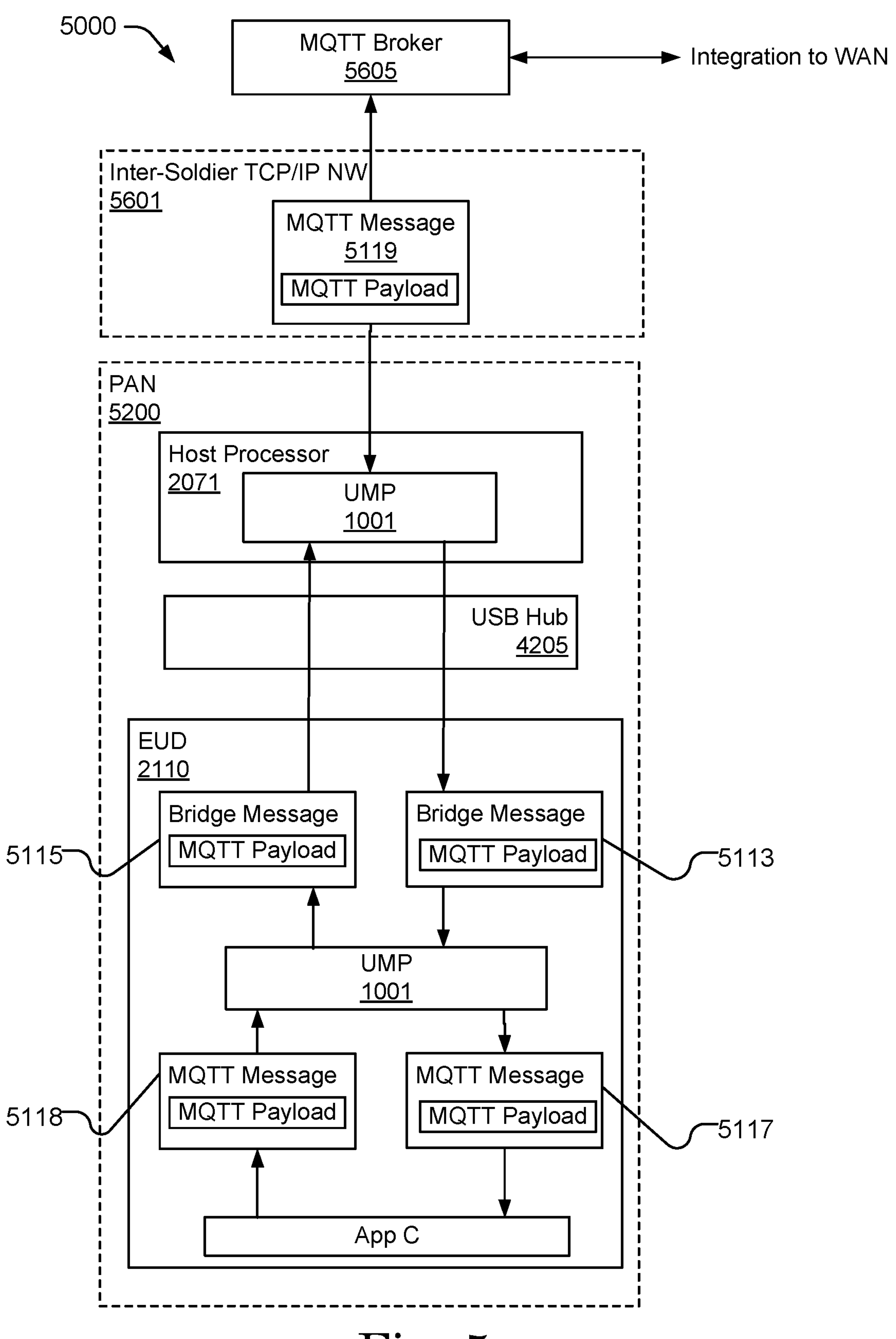

FIG. 5 depicts an exemplary schematic diagram of a fourth embodiment of a system according to the technology disclosed herein.

Figure 6:
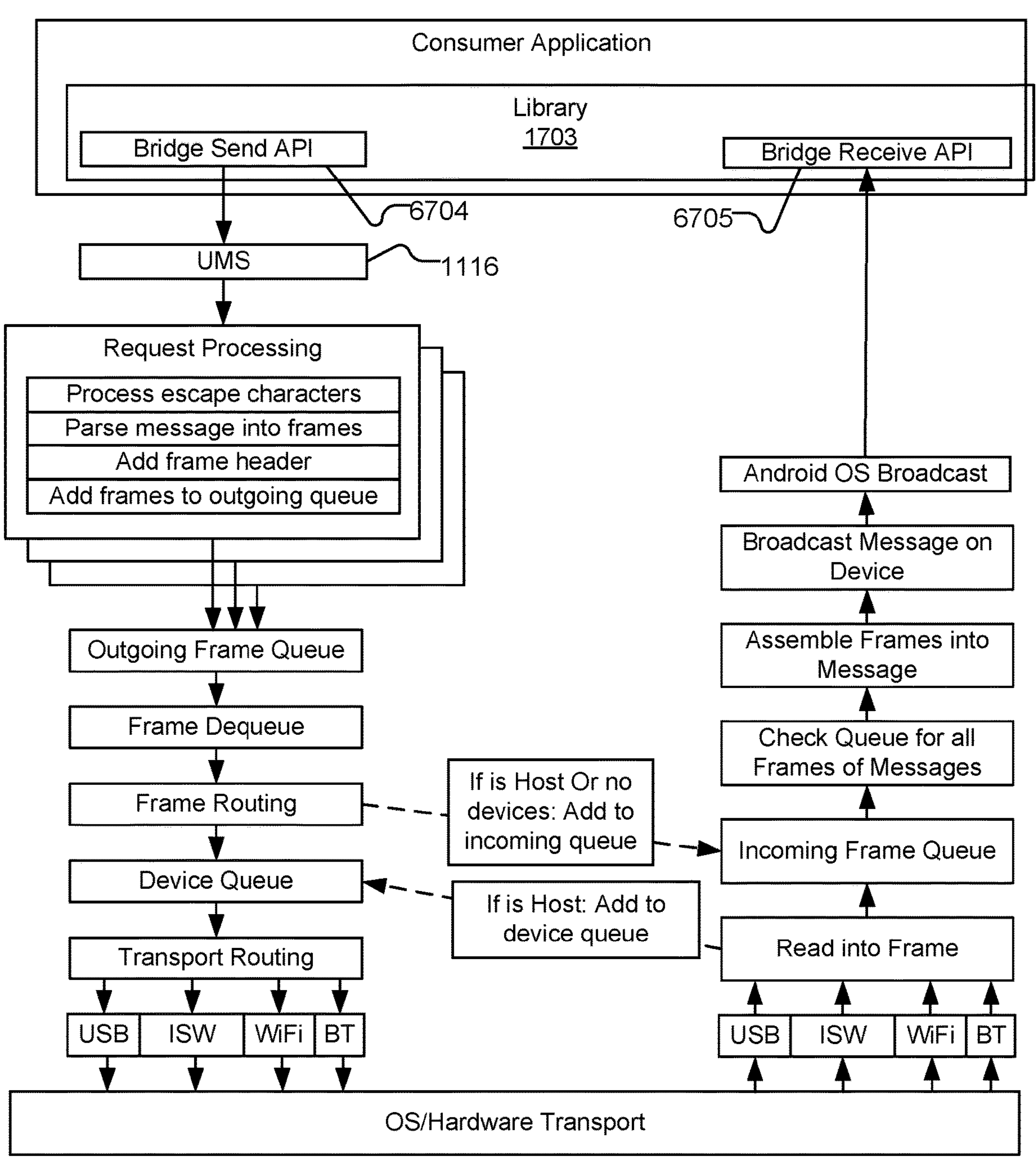

FIG. 6 depicts an exemplary schematic diagram illustrating message flow according to the technology disclosed herein.

Figure 7:
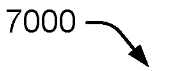
Figure 7:
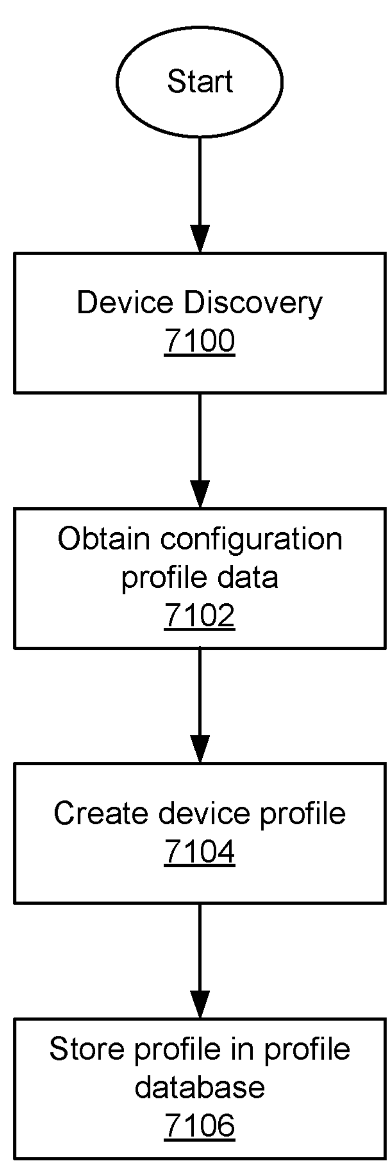

FIG. 7 is a process flow describing a first method of operation of one or more systems according to the technology described herein.

Figure 8:
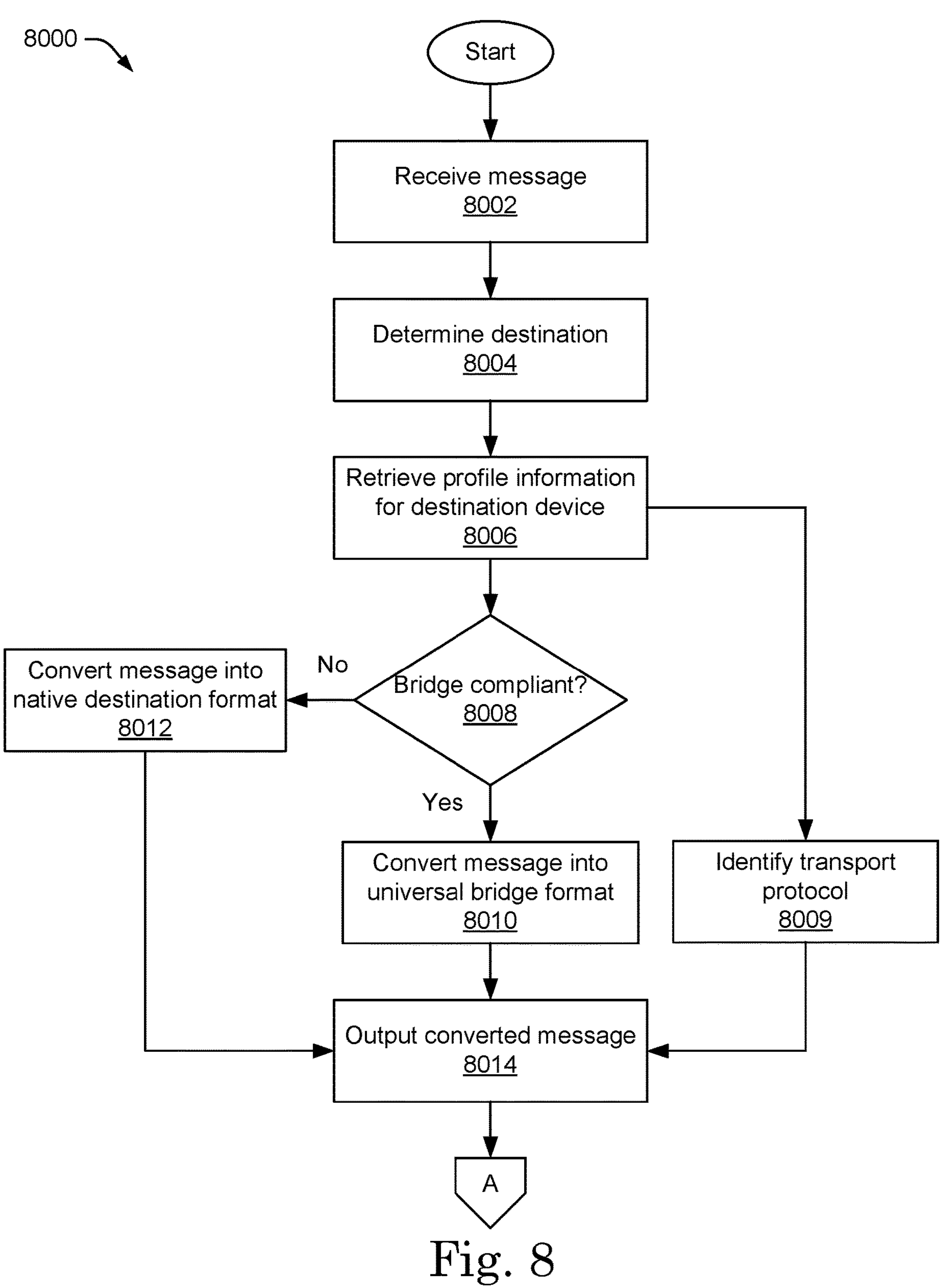

FIG. 8 is a process flow describing a second method of operation of one or more systems according to the technology described herein.

Figure 9:
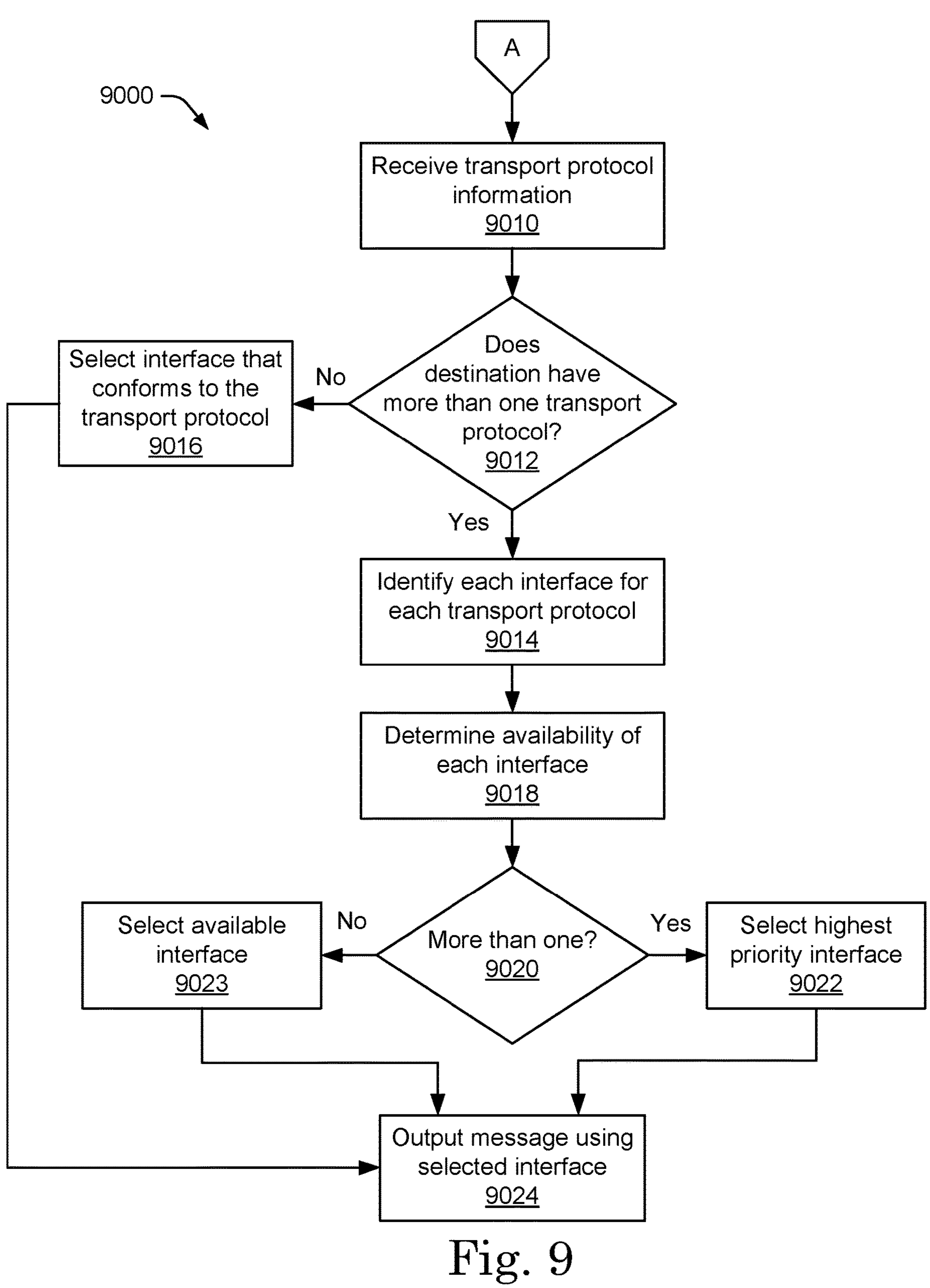

FIG. 9 is a process flow describing a third method of operation of one or more systems according to the technology described herein.

Figure 10A:
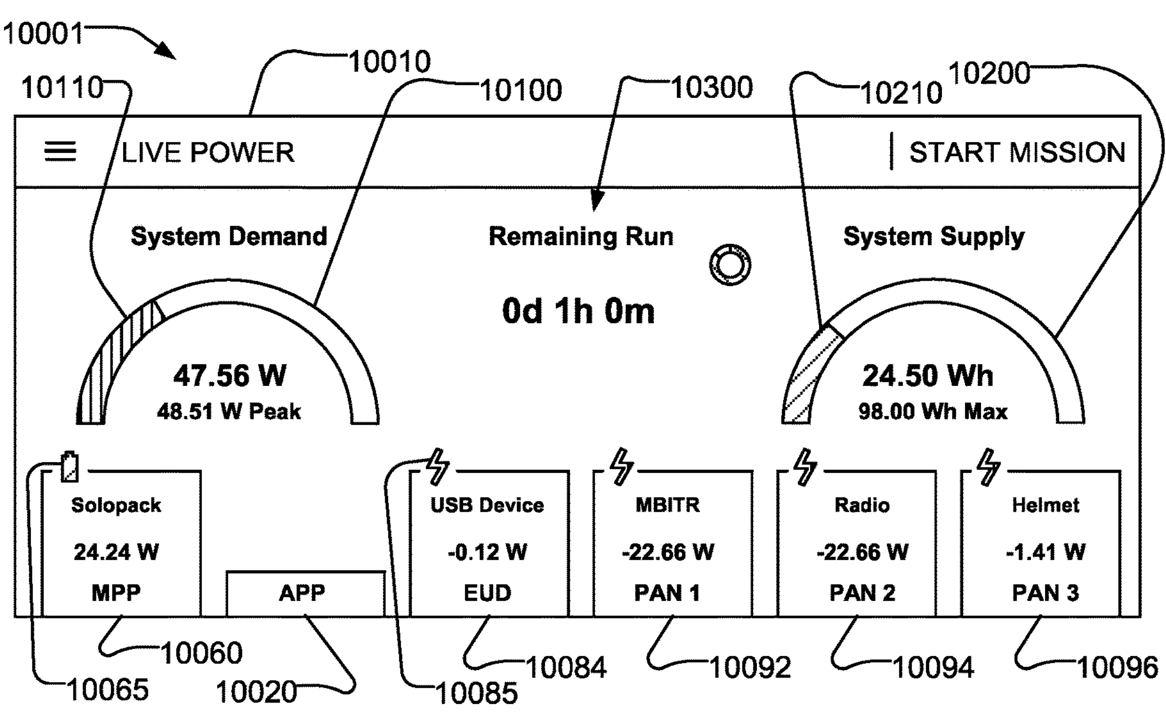
Figure 10B:
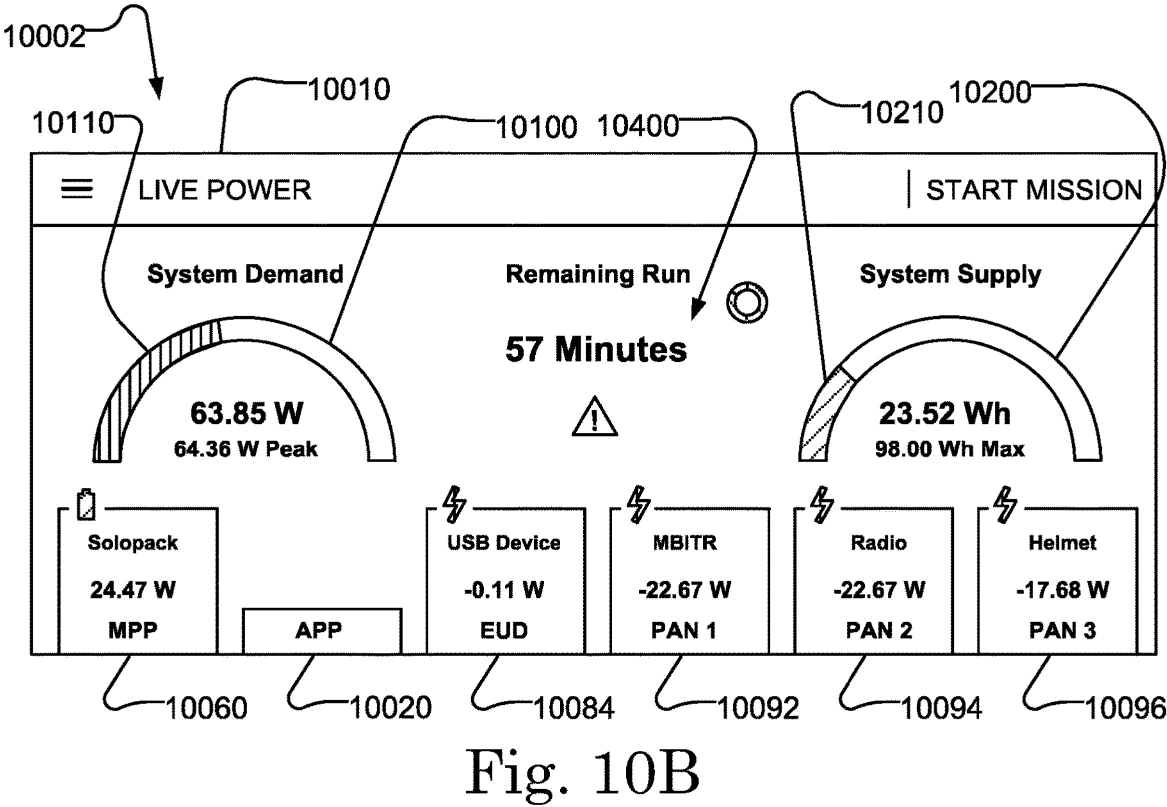

FIG. 10A depicts a first configuration of a first exemplary user interface (UI) layout for displaying power data according to the technology disclosed herein;

FIG. 10B depicts a second configuration of the first exemplary user interface (UI) layout of FIG. 10A.

Figure 10C:
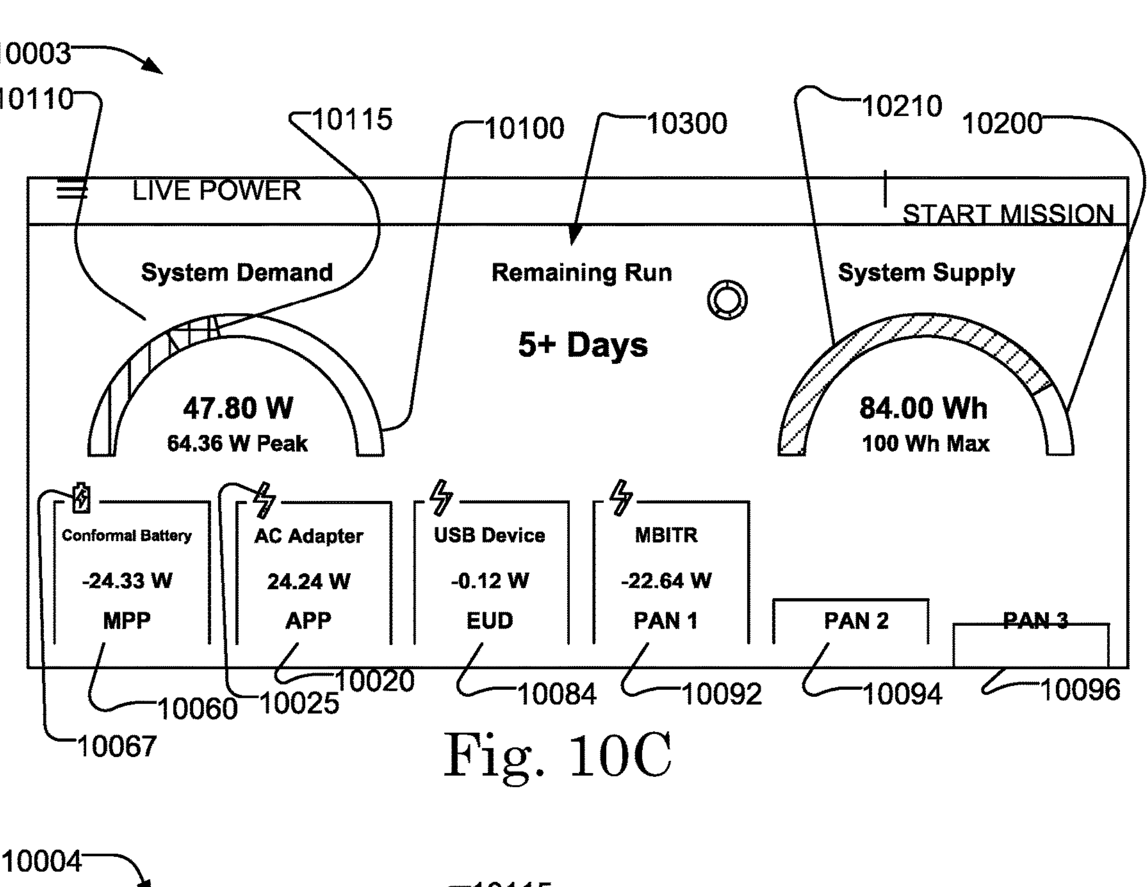

FIG. 10C depicts a third configuration of the first exemplary user interface (UI) layout of FIG. 10A.

Figure 10D:
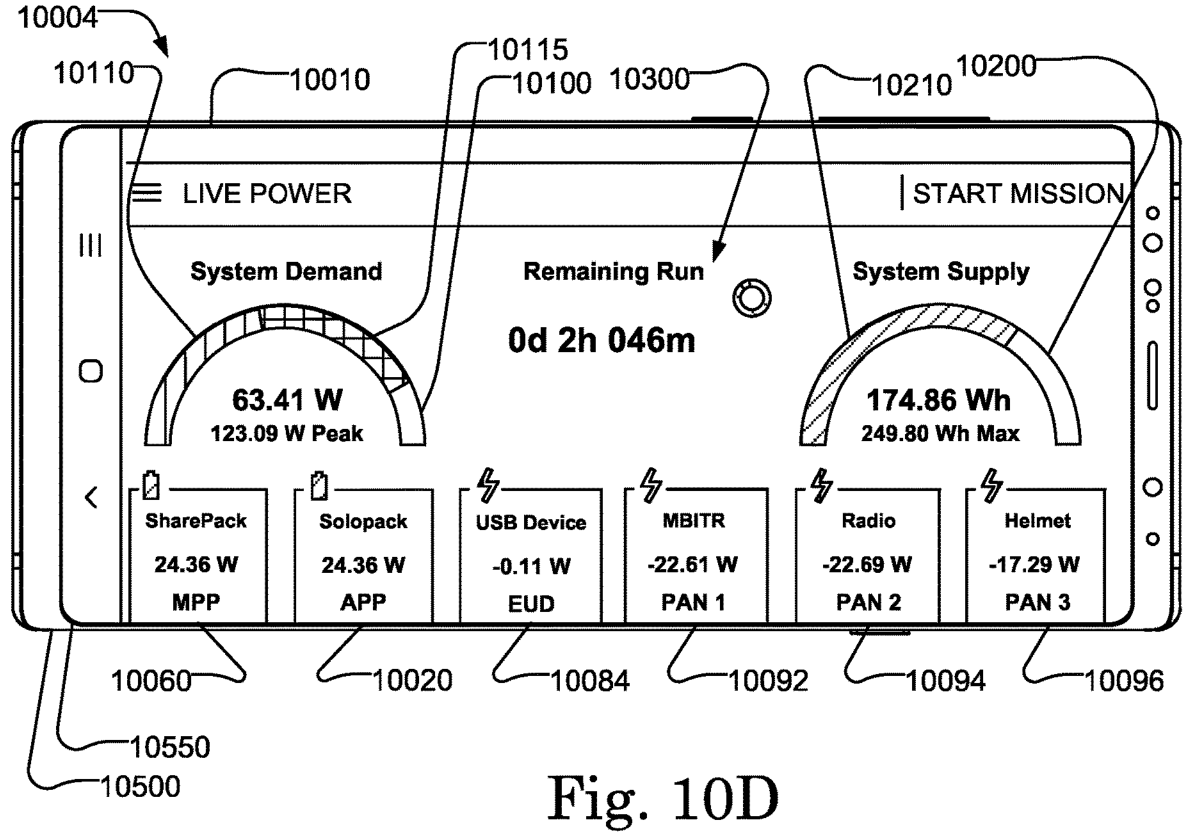

FIG. 10D depicts a fourth configuration of the first exemplary user interface (UI) layout of FIG. 10A shown on a display screen of an exemplary end user device (EUD) according to the subject technology.

Figure 10E:
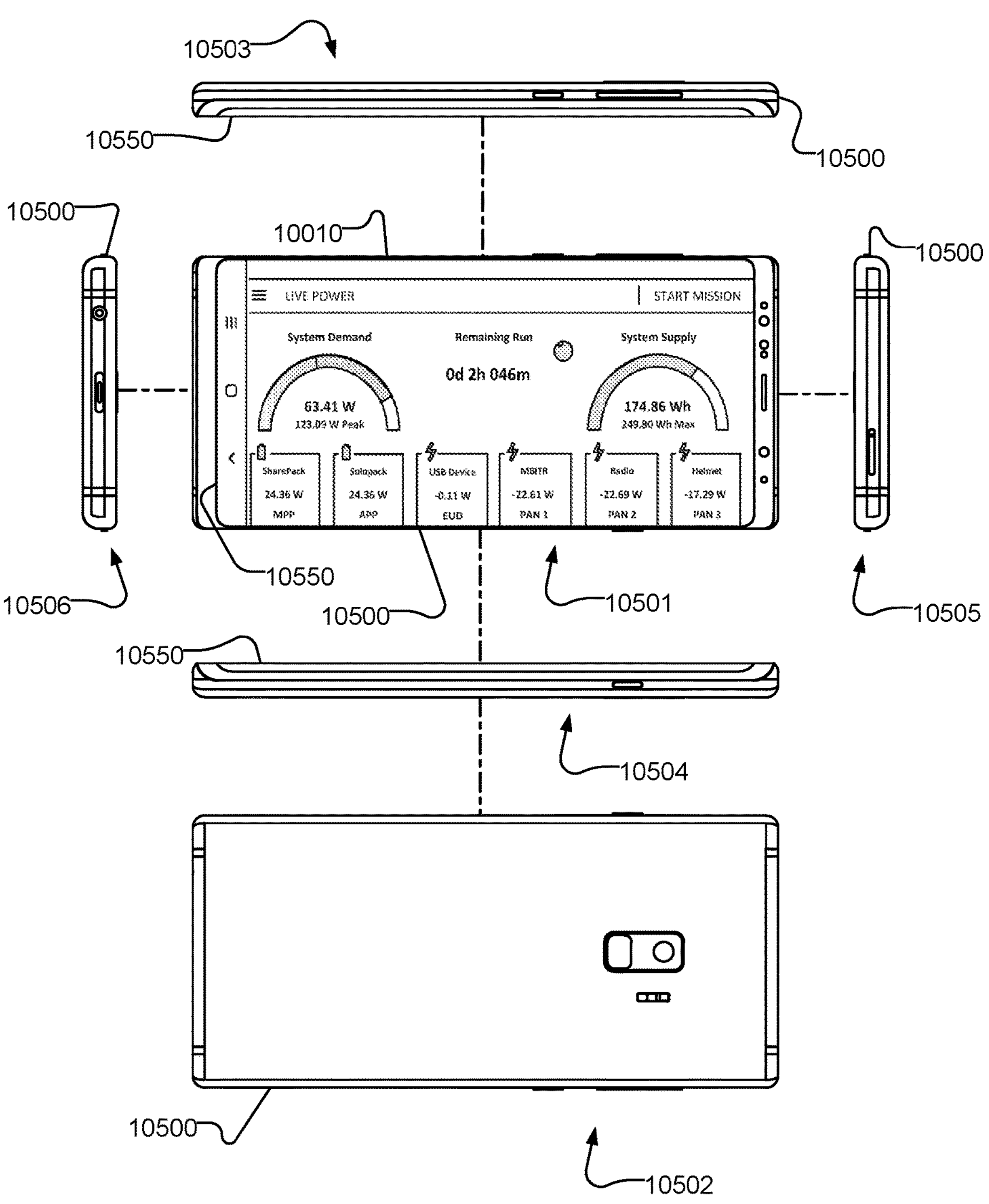

FIG. 10E depicts multiple views of the EUD of FIG. 10D.

Figure 11:
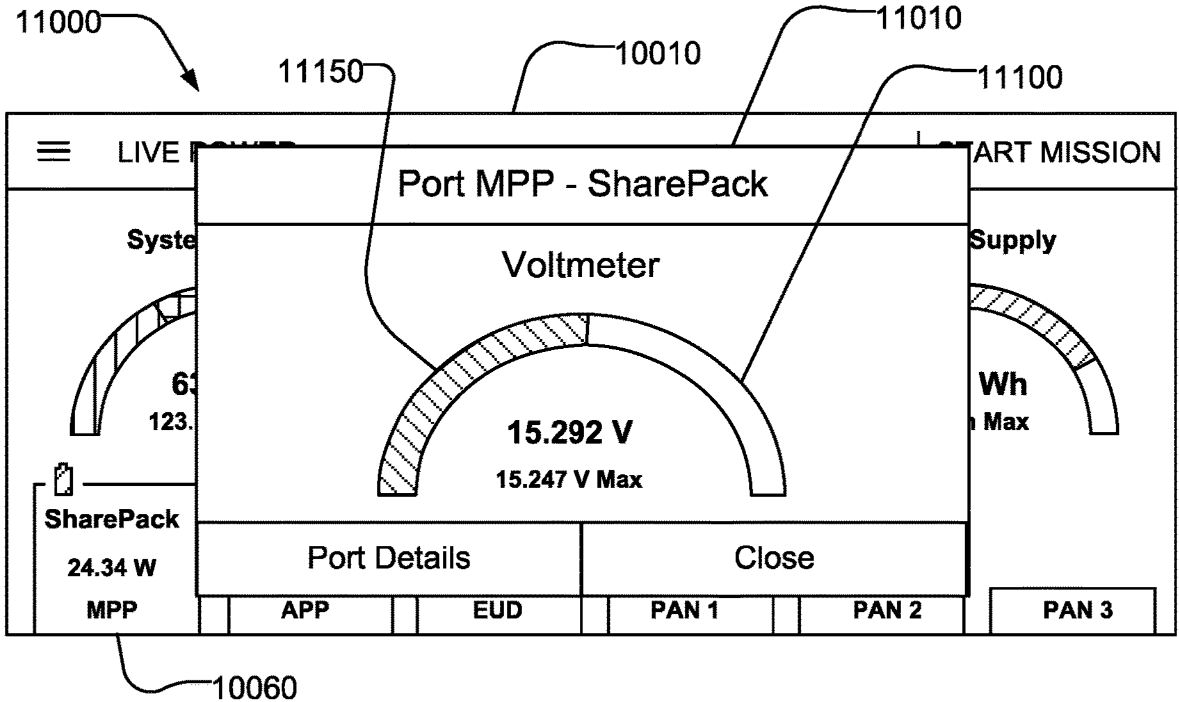

FIG. 11 depicts an exemplary user interface (UI) layout for displaying power data corresponding to a power port according to the technology disclosed herein.

Figure 12A:
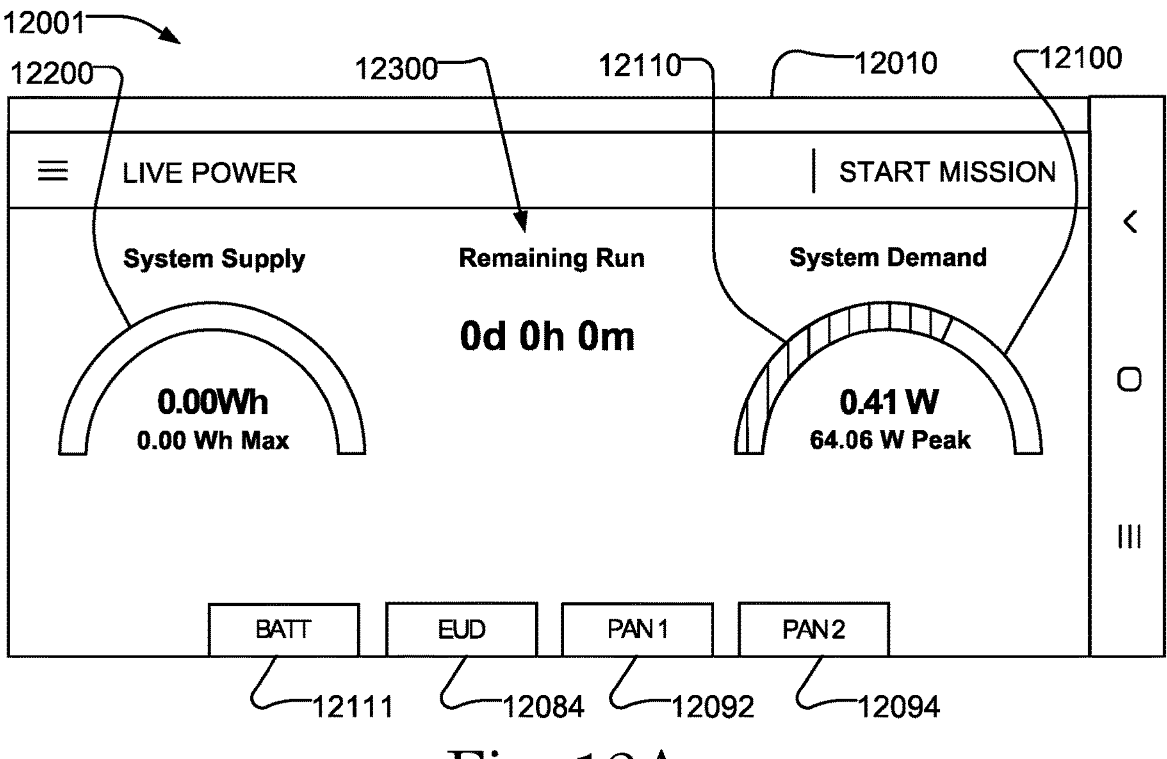
Figure 12B:
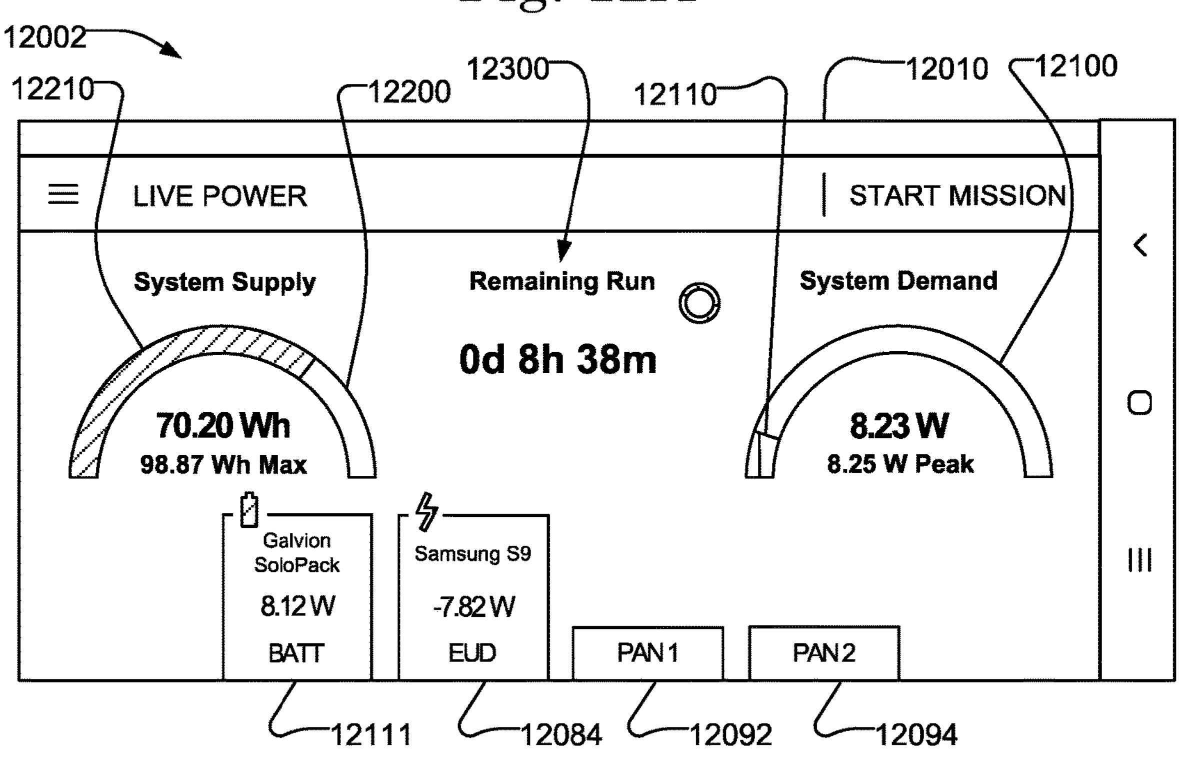

FIG. 12A depicts a first configuration of a second exemplary user interface (UI) layout for displaying power data according to the technology disclosed herein;

FIG. 12B depicts a second configuration of the second exemplary user interface (UI) layout of FIG. 12A.

Figure 12C:
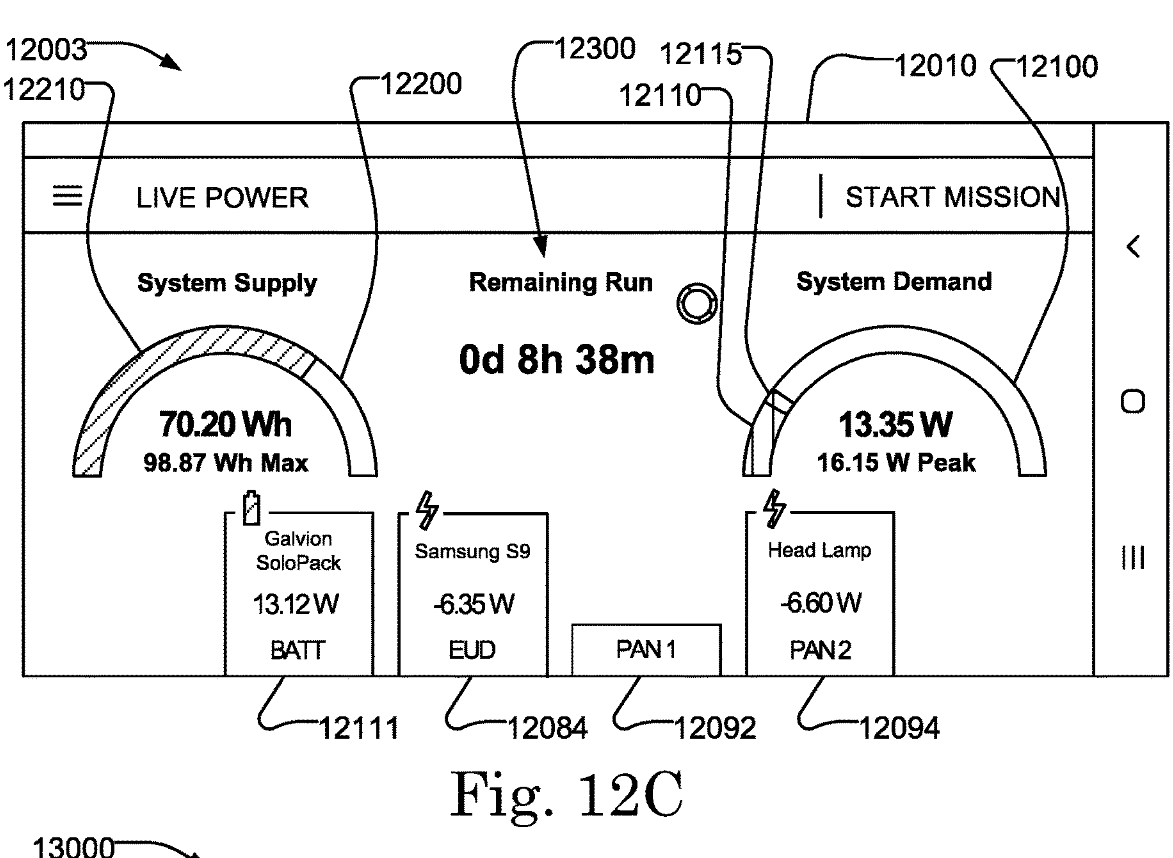

FIG. 12C depicts a third configuration of the second exemplary user interface (UI) layout of FIG. 12A.

Figure 13:
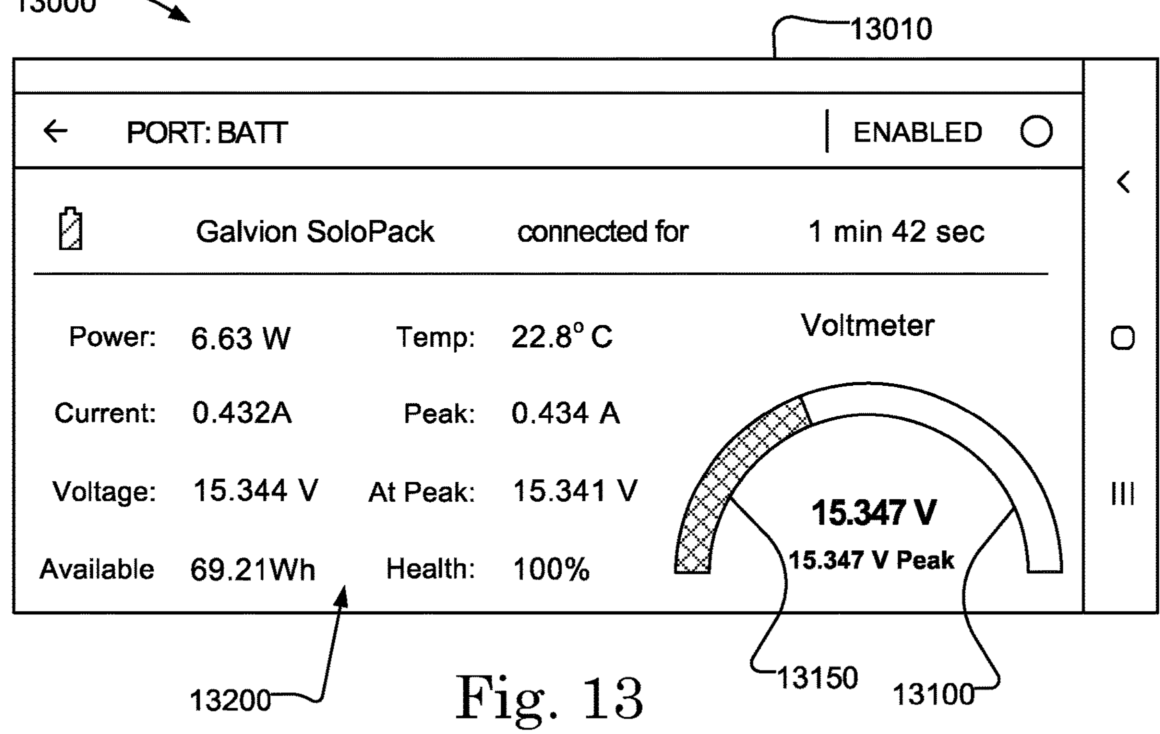

FIG. 13 depicts an exemplary user interface (UI) layout for displaying power data corresponding to a battery device port according to the technology disclosed herein.

Figure 14:
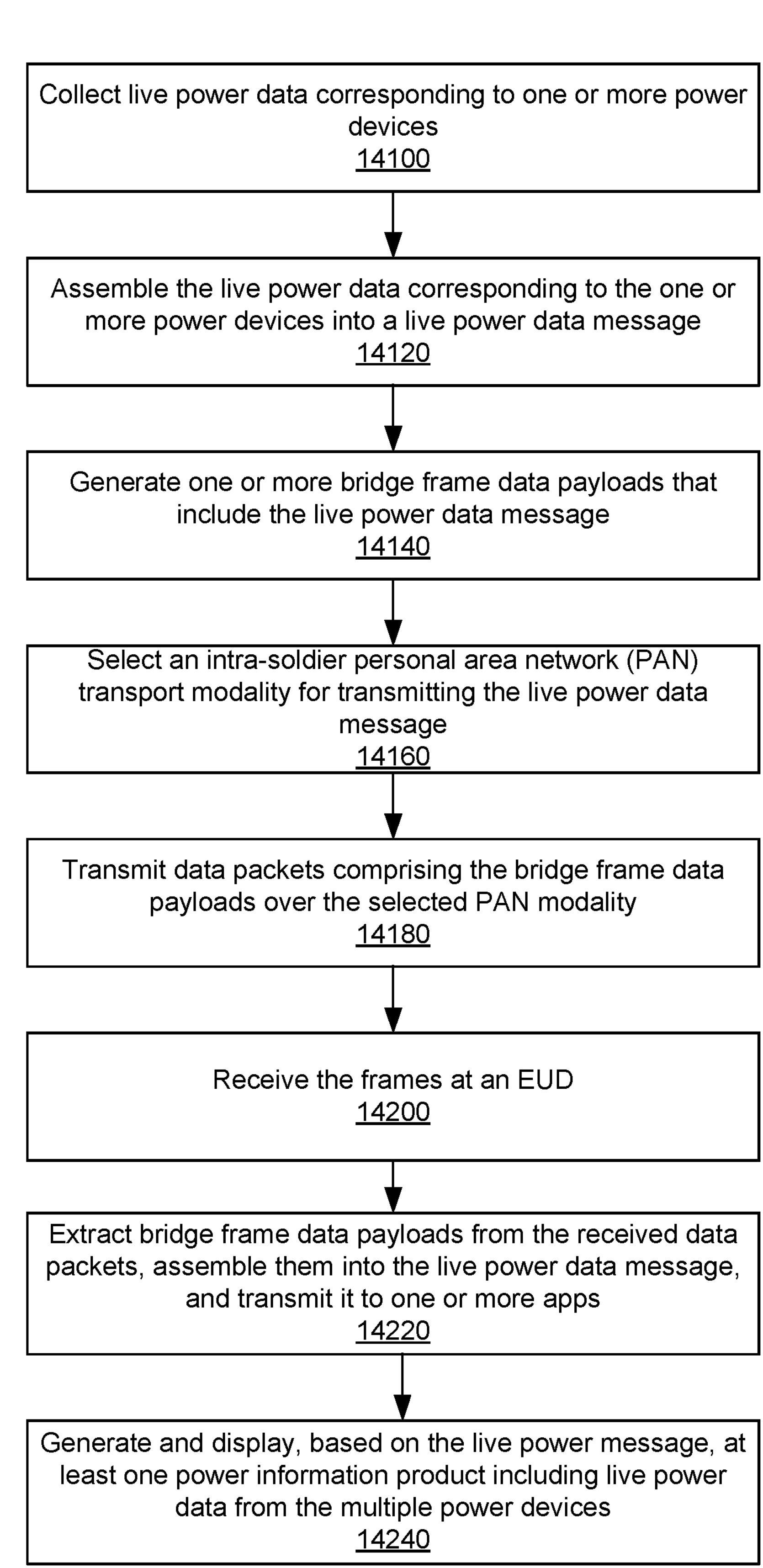

FIG. 14 is a process flow describing a fourth method of operation of one or more systems according to the technology disclosed herein.

Figure 15:
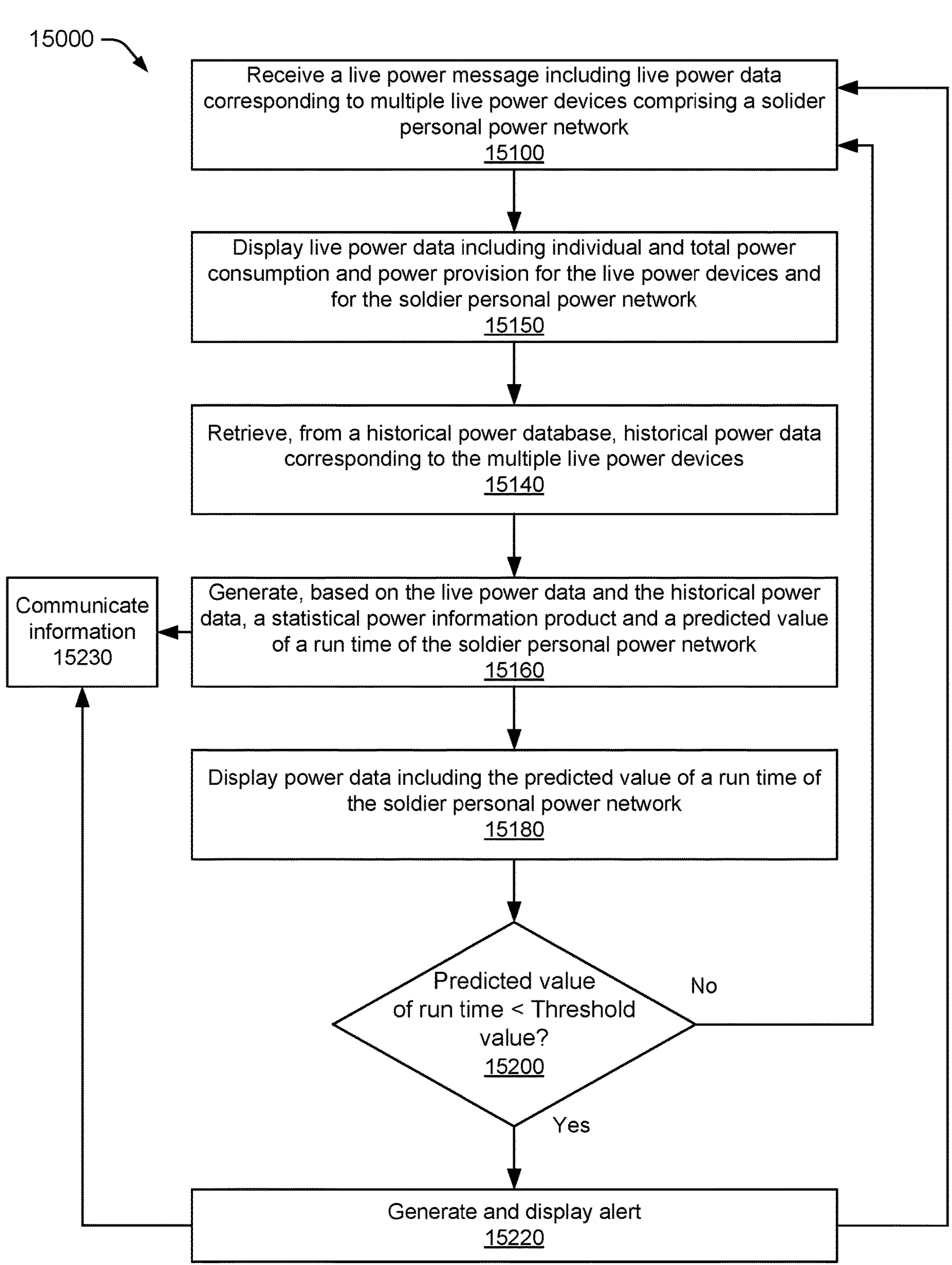

FIG. 15 is a process flow describing a fifth method of operation of one or more systems according to the technology disclosed herein.

Figures 16A, 16B, 16C:
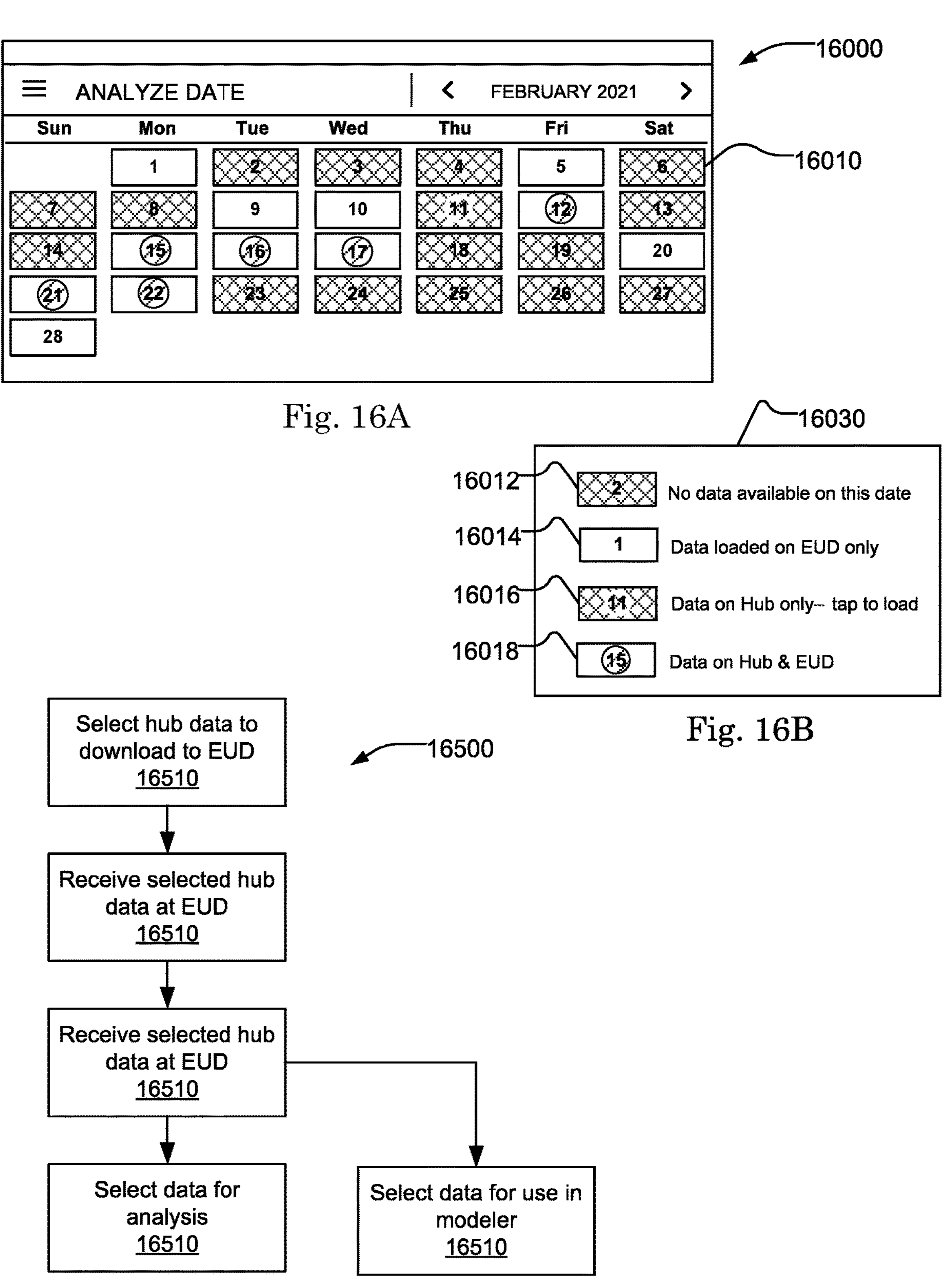

FIG. 16A depicts an exemplary user interface (UI) layout for managing power data according to the technology disclosed herein.

FIG. 16B depicts information correspond to the UI layout of FIG. 16A.

FIG. 16C is a process flow for managing power data according to the technology disclosed herein.

Figure 17:
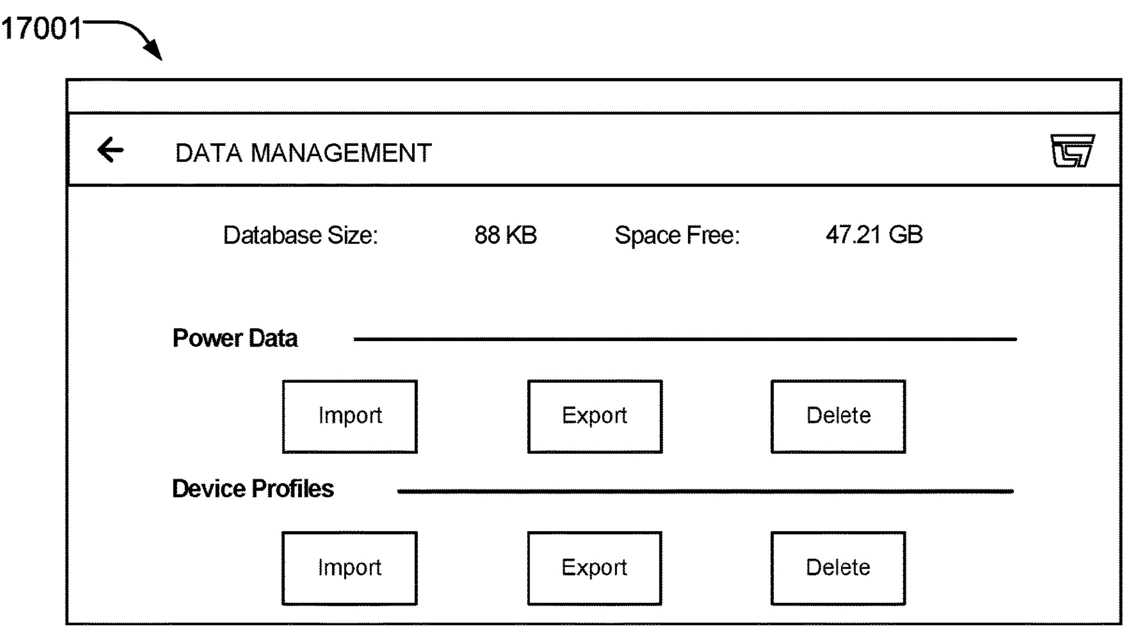

FIG. 17 depicts an exemplary user interface (UI) layout for managing power data according to the technology disclosed herein.

Figure 18:
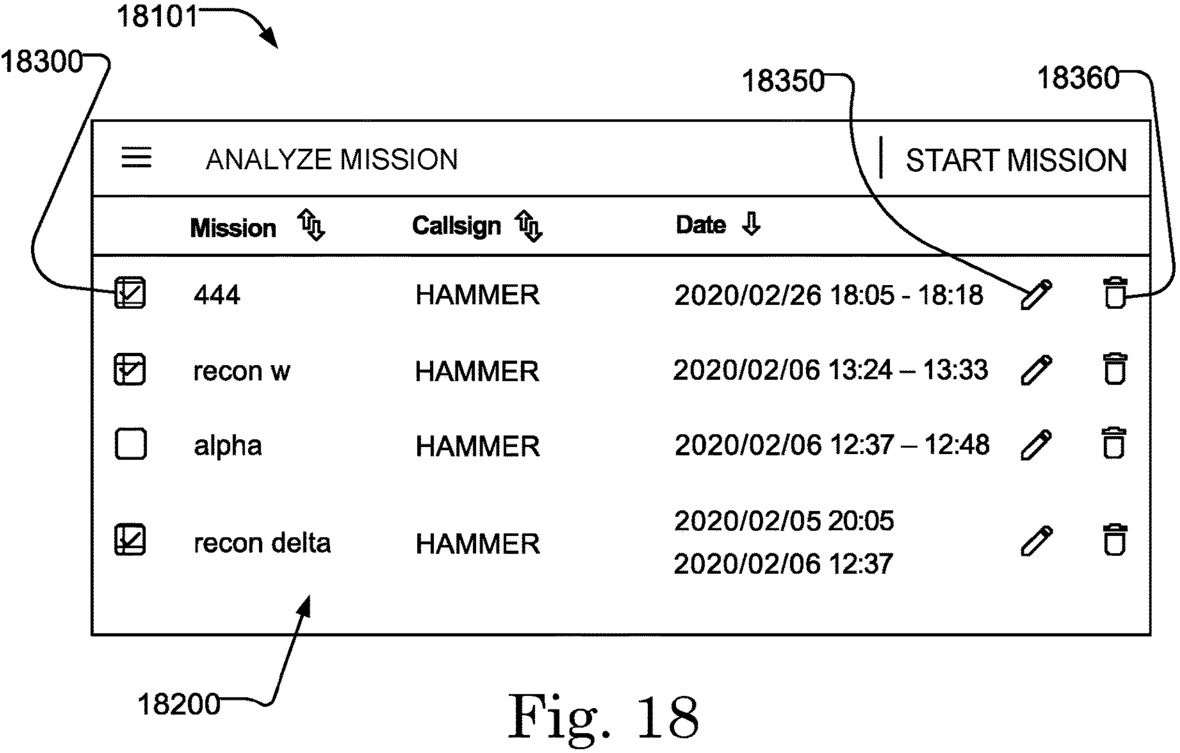

FIG. 18 depicts an exemplary user interface (UI) layout for displaying and analyzing power data according to the technology disclosed herein.

Figure 19:
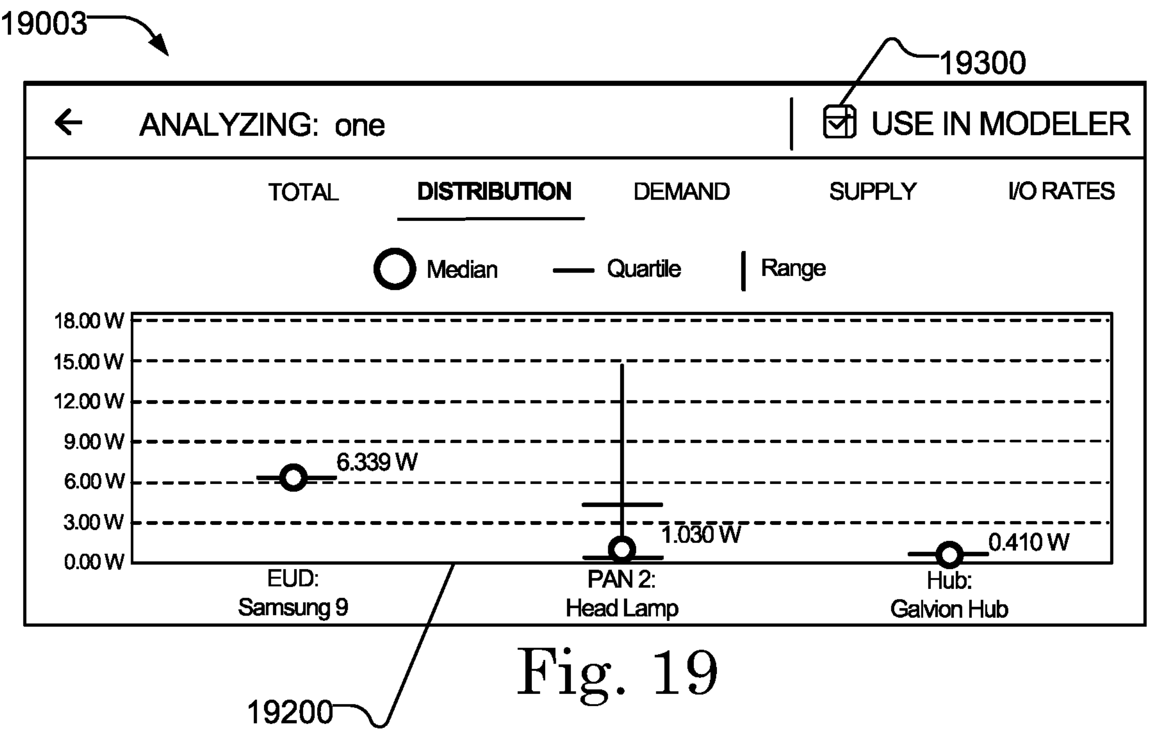

FIG. 19 depicts an exemplary user interface (UI) layout for displaying and analyzing power data according to the technology disclosed herein.

Figure 20:
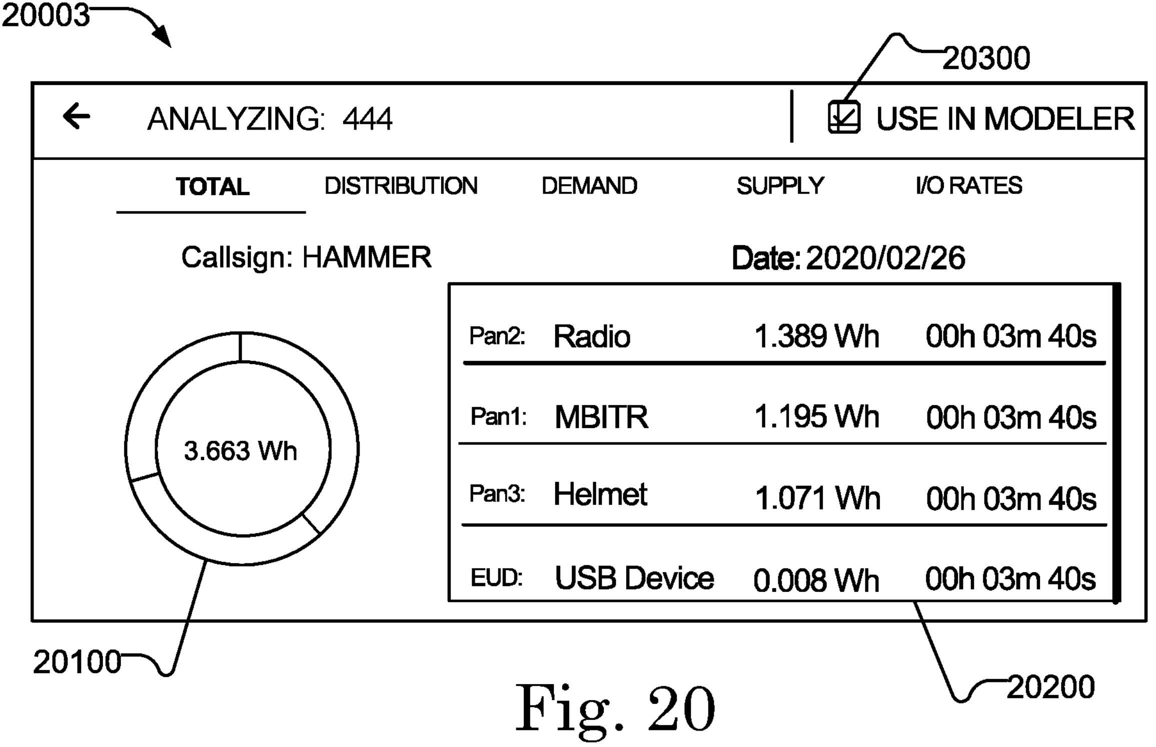

FIG. 20 depicts an exemplary user interface (UI) layout for displaying and analyzing power data according to the technology disclosed herein.

Figure 21:
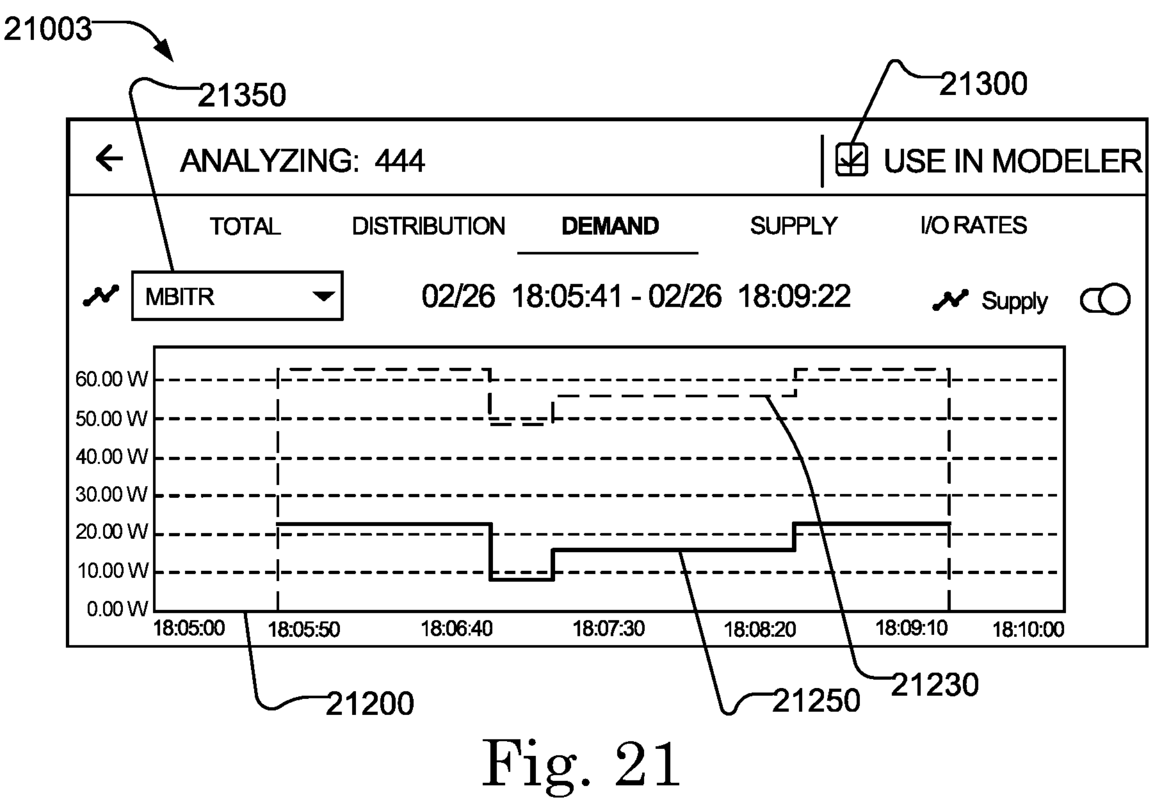

FIG. 21 depicts an exemplary user interface (UI) layout according to the technology disclosed herein for displaying and analyzing power data.

Figure 22:
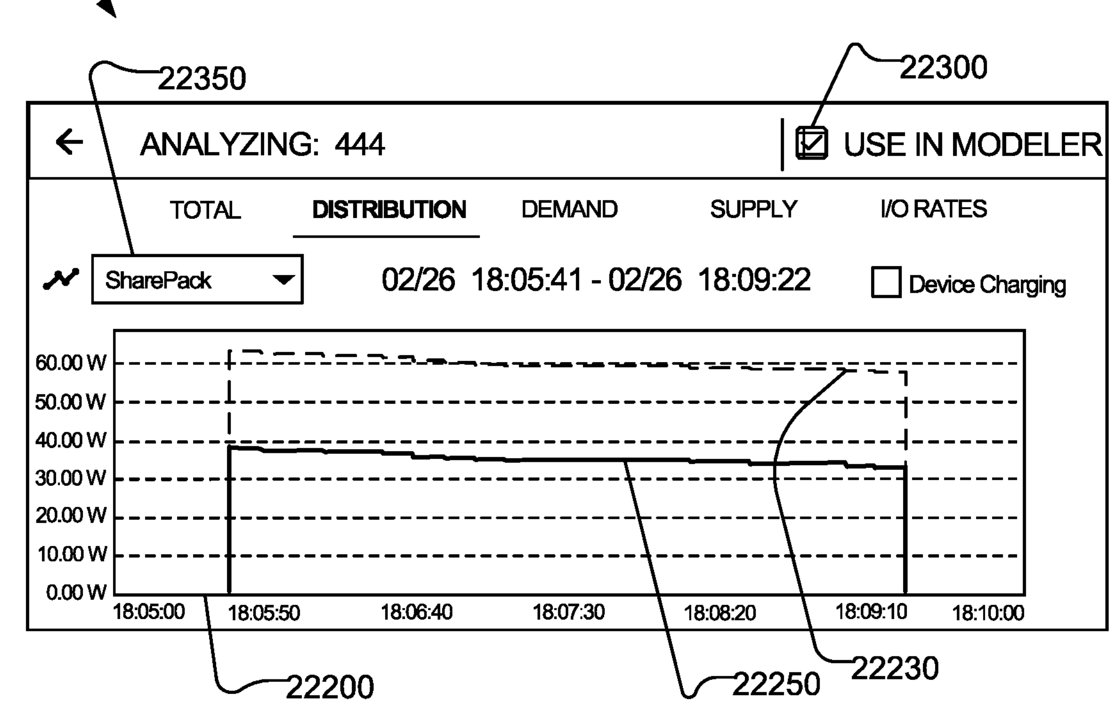

FIG. 22 depicts an exemplary user interface (UI) layout according to the technology disclosed herein for displaying and analyzing power data.

Figure 23:
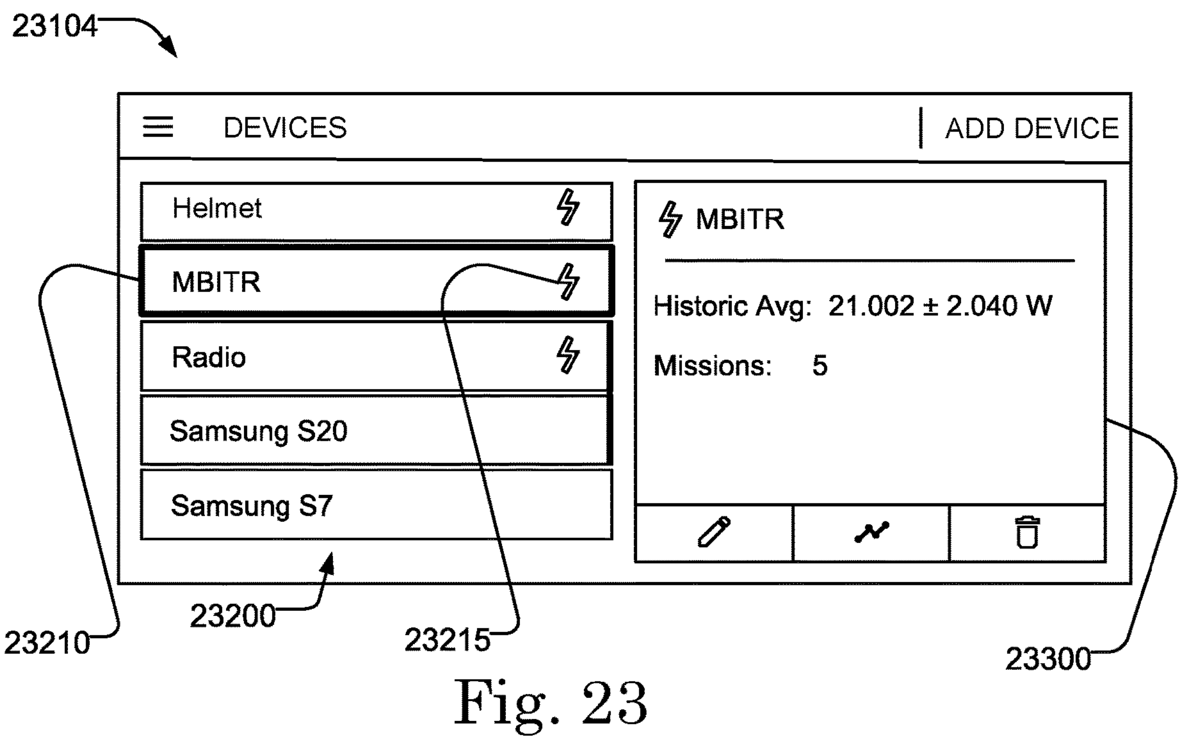

FIG. 23 depicts an exemplary user interface (UI) layout according to the technology disclosed herein for displaying historical power data corresponding to a selected power device.

Figure 24:
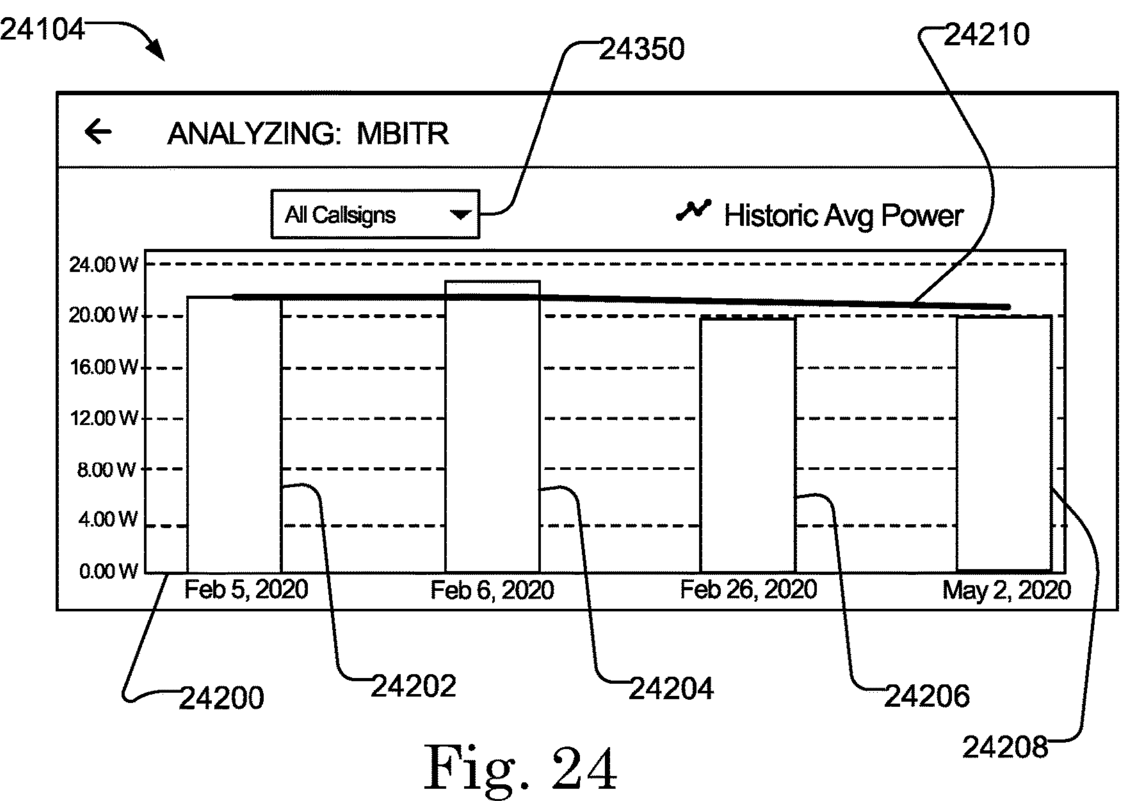

FIG. 24 depicts an exemplary user interface (UI) according to the technology disclosed herein for displaying historical power data corresponding to a selected power device across a plurality of missions.

Figures 25, 26:
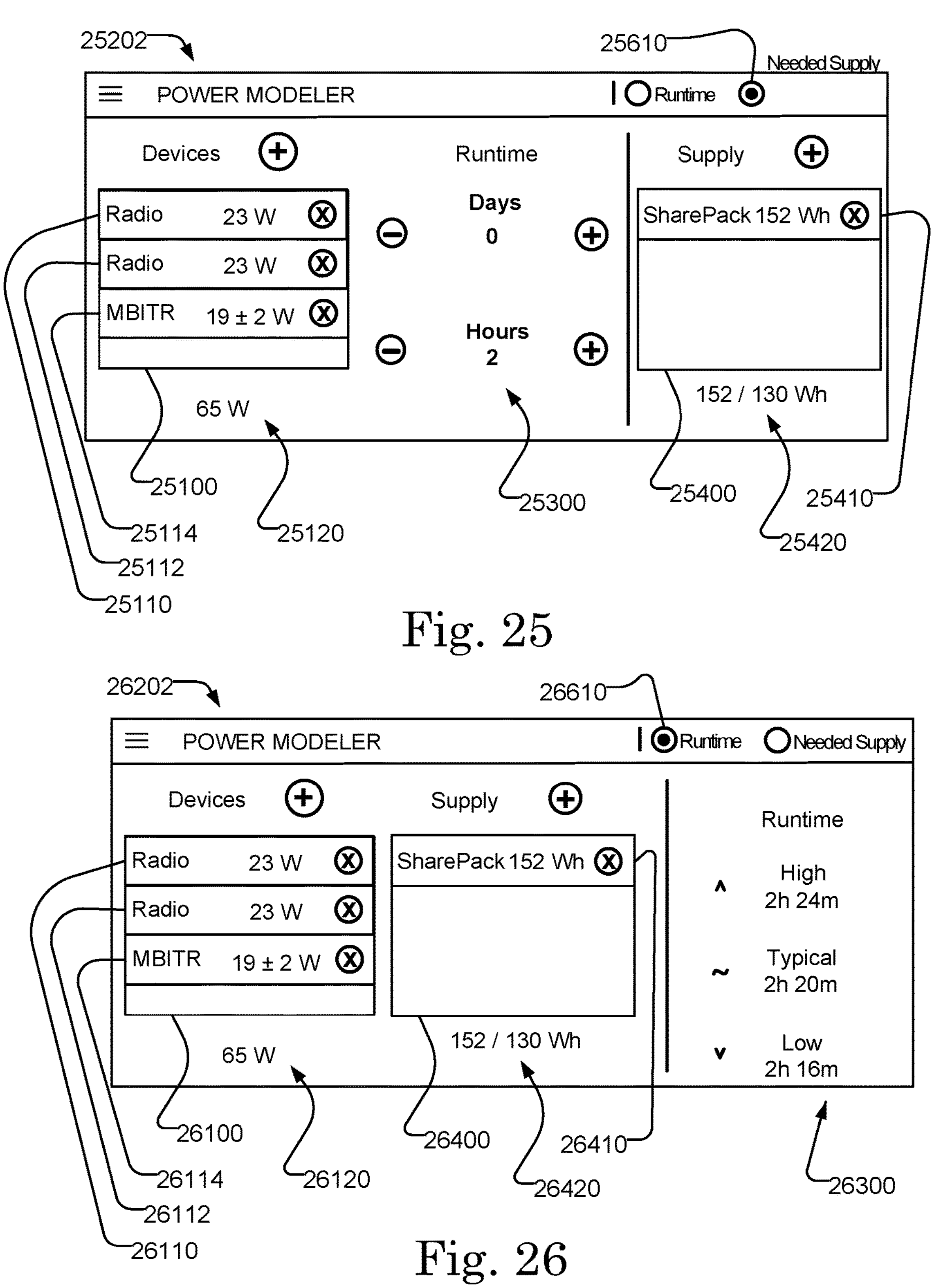

FIG. 25 depicts an exemplary user interface (UI) layout according to the technology disclosed herein for modeling and predicting a required power supply of a system according to the technology disclosed herein.

FIG. 26 depicts an exemplary user interface (UI) layout for modeling and predicting system runtime of a system according to the technology disclosed herein.

Figure 27:
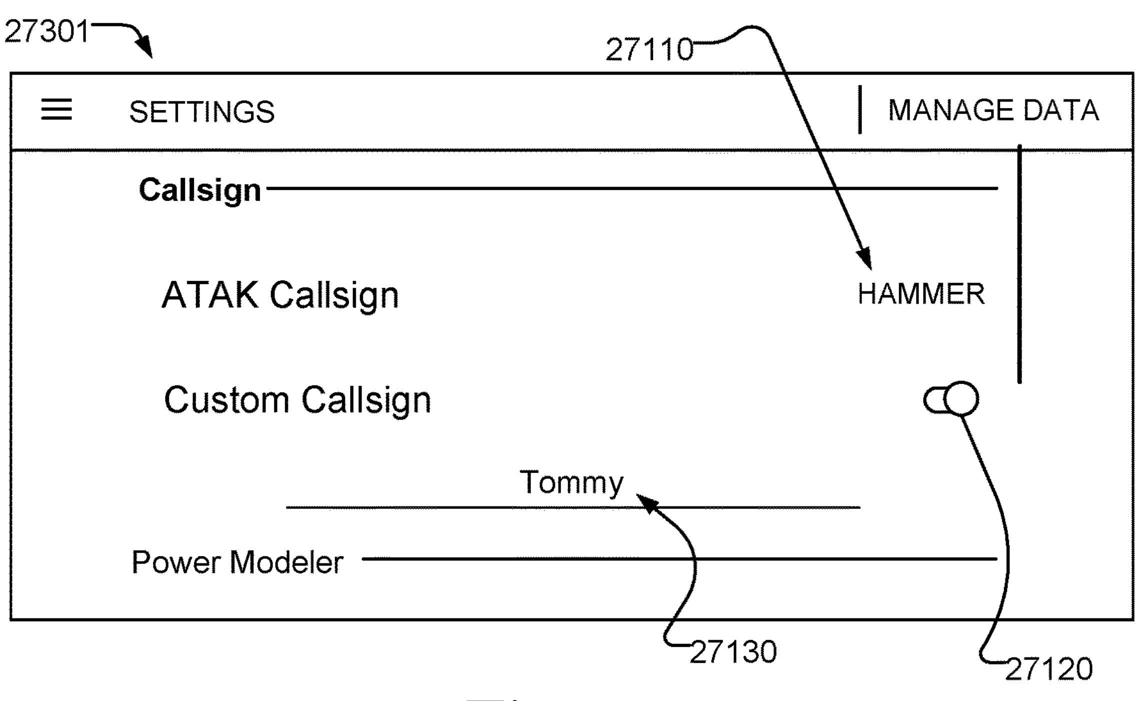

FIG. 27 depicts an exemplary user interface (UI) layout for selecting settings of a system according to the technology disclosed herein.

Figure 28:
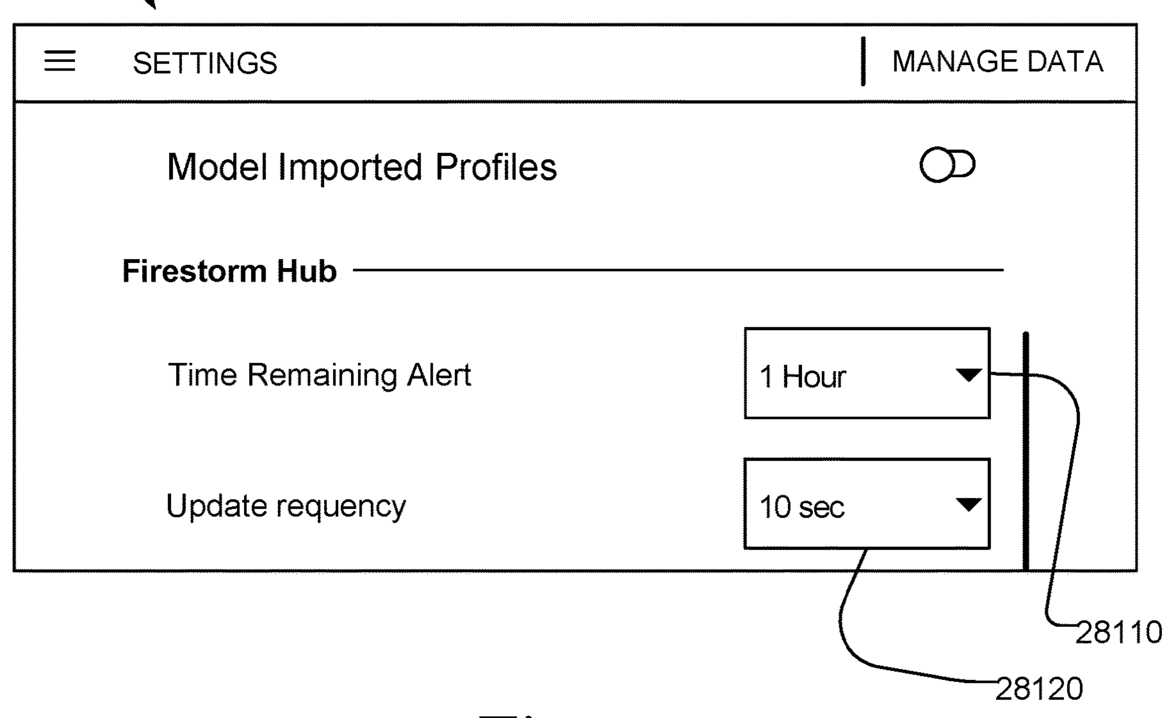

FIG. 28 depicts an exemplary user interface (UI) layout of a system according to the technology disclosed herein for selecting settings.

Figure 29:
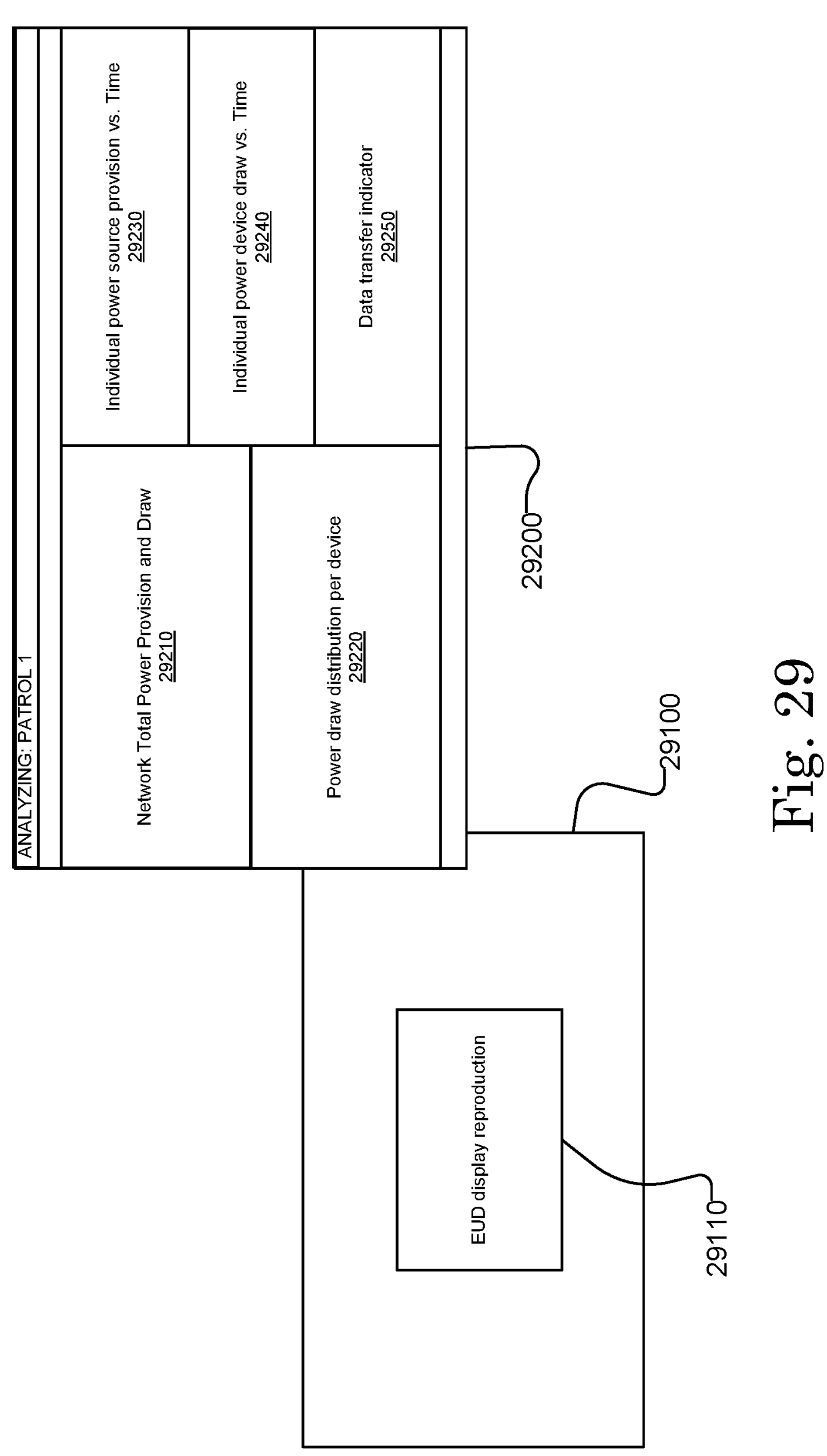

FIG. 29 depicts an exemplary user interface (UI) layout of a system according to the technology disclosed herein ported to a desktop PC monitor.

Figure 30:
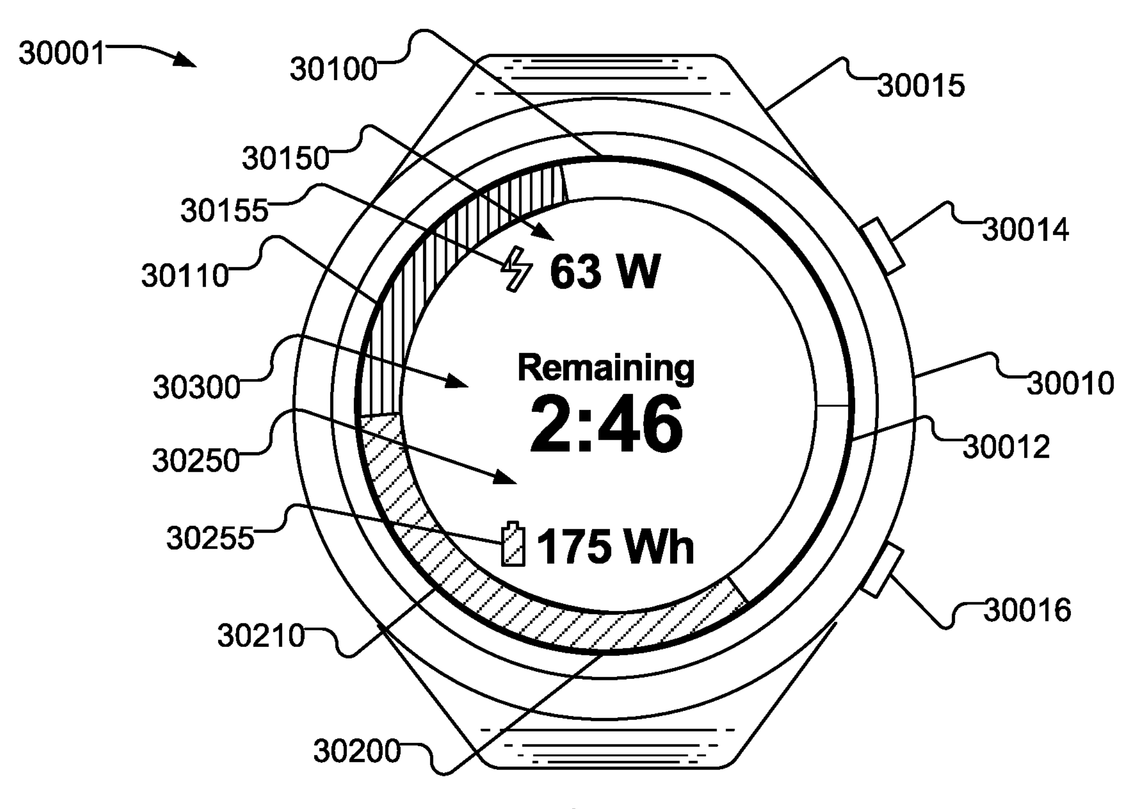

FIG. 30 depicts a first exemplary user interface (UI) layout for displaying power data on a smart watch according to the technology disclosed herein.

Figure 31:
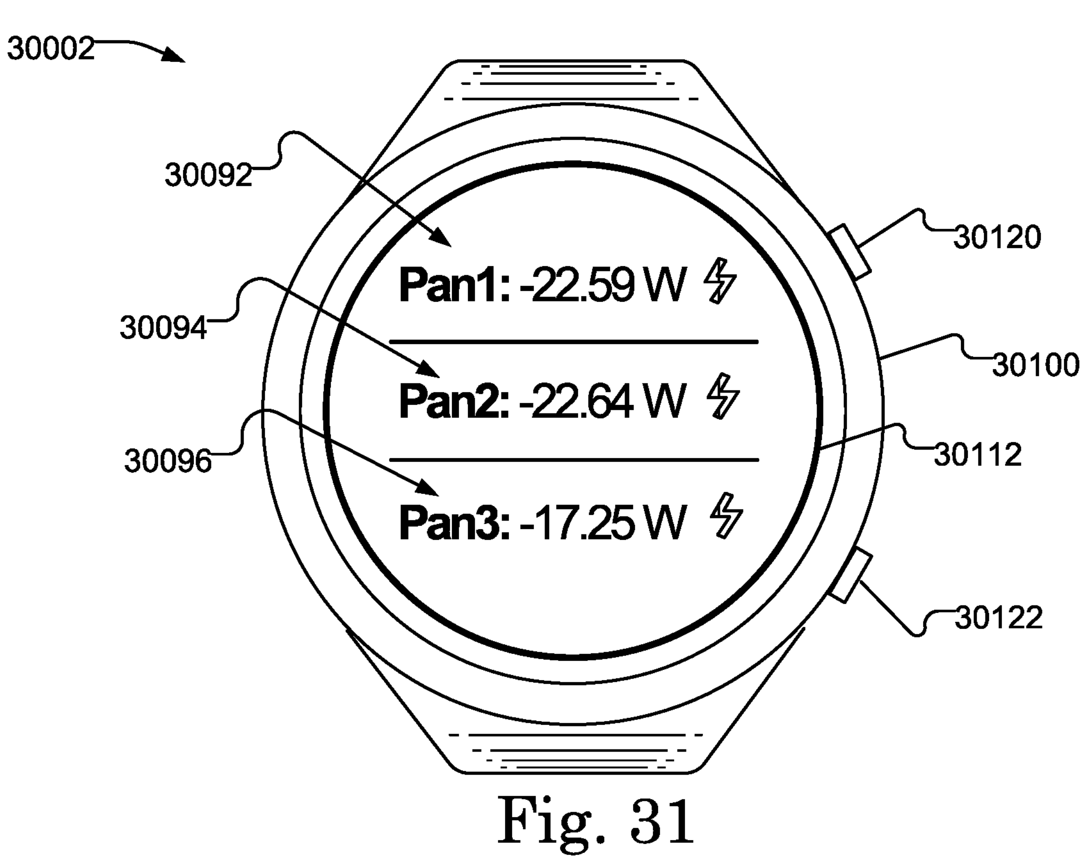

FIG. 31 depicts a first configuration of a second exemplary UI layout for displaying power data on a smart watch according to the technology disclosed herein.

Figure 32:
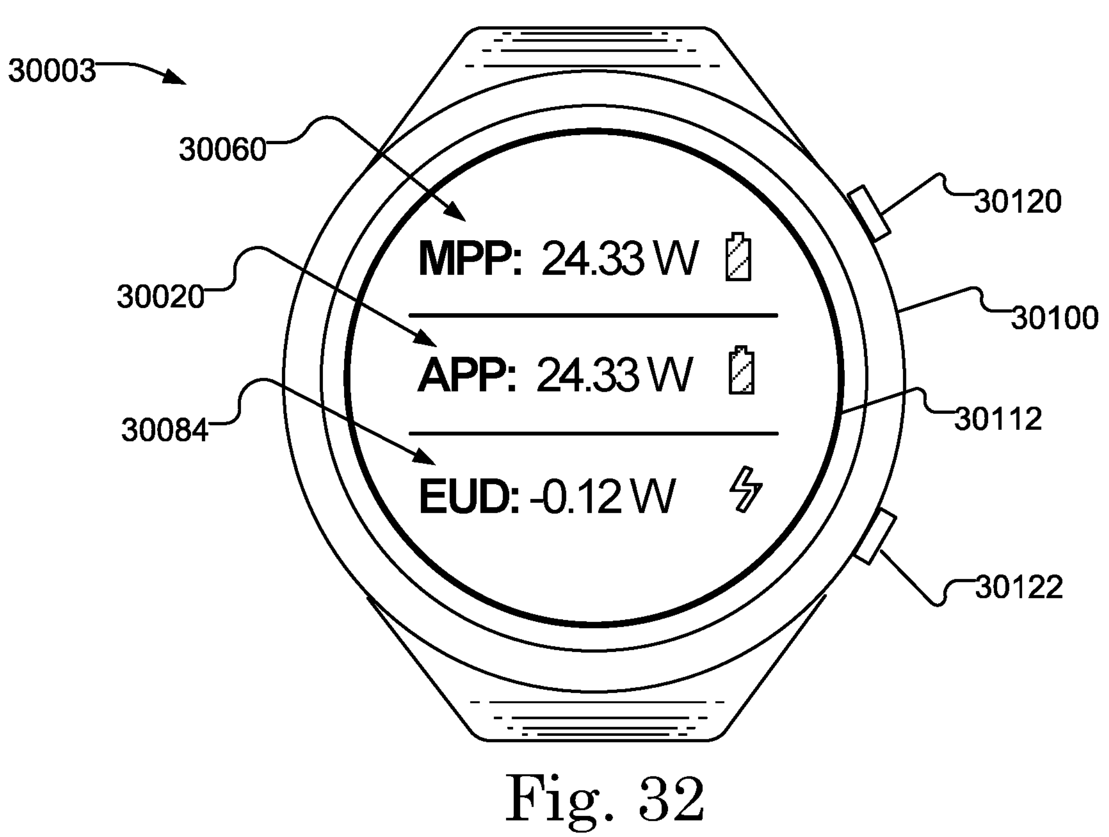

FIG. 32 depicts a second configuration of the second exemplary UI layout for displaying power data on a smart watch of FIG. 31.

Figure 33:
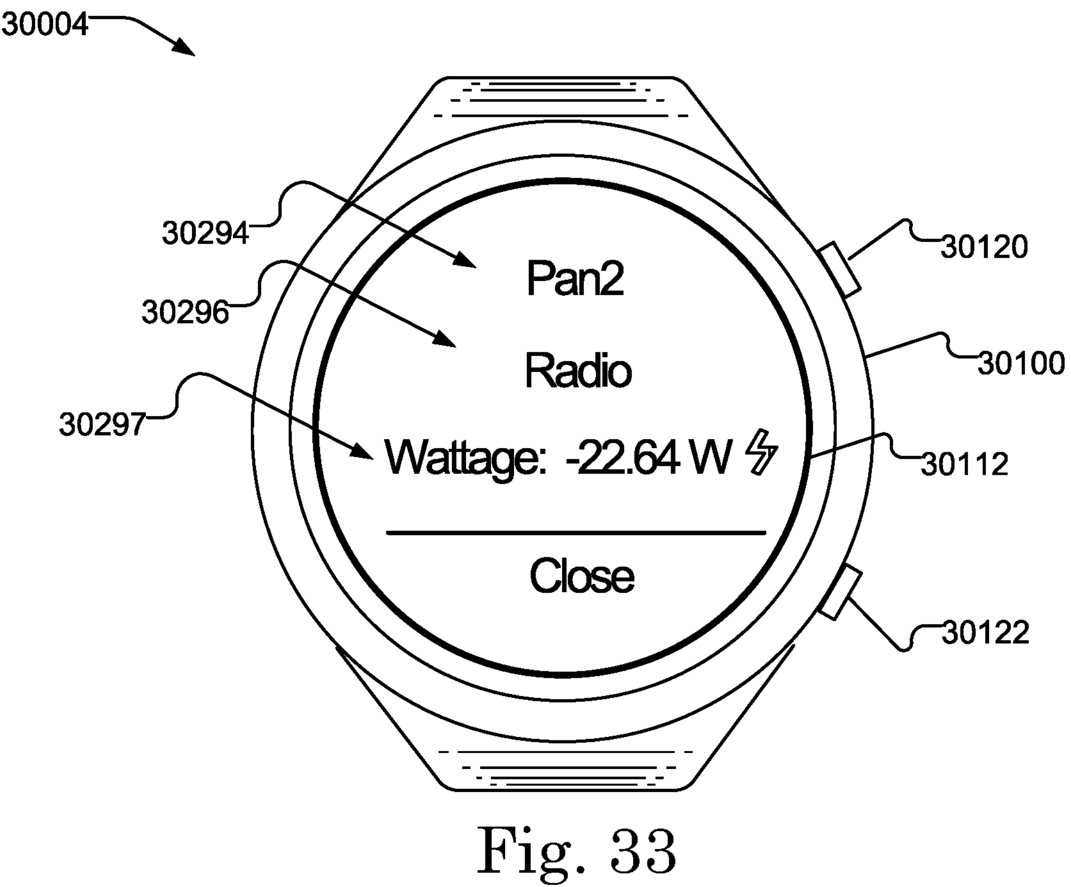

FIG. 33 depicts a third exemplary user interface (UI) layout for displaying power data on a smart watch according to the technology disclosed herein;

DESCRIPTION OF SOME EMBODIMENTS OF THE INVENTION

Detailed Description of the Invention

As used herein, the term “and/or” includes any and all combinations of one or more of the associated listed items. Further, the singular forms of the articles “a”, “an” and “the” are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence of addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

The terms "bridge service", "bridge service module" and "uniform messaging service" have been used interchangeably throughout the disclosure. The term "the bridge", "bridge system" and "uniform messaging platform" have been used interchangeably throughout the disclosure. The terms "bridge message", "middleware message format", "bridge formatted message(s)" and "uniform bridge message" have been used interchangeably throughout the disclosure. The terms "component", "device" and "end-point" have been used interchangeably throughout the disclosure.

Referring now to FIG. 1, a perspective view of a uniform messaging platform (UMP) 1001 is shown. The UMP 1001 includes a uniform messaging service (UMS) which provides seamless messaging between devices operatively connected to a network system. The UMP includes a device interface 1998, at least one processor 1071 and at least one memory 1072. The at least one memory includes a profile database 1701, a library 1703, and a uniform messaging application (UMA) 1220 stored therein. In some embodiments, the at least one memory additionally includes a multi-protocol routing application (MPRA) 1222. The device interface is communicatively coupled to at least one component (i.e., end-point) and at least one network.

The uniform messaging service ("UMS") 1116 may be used on a network system, such as, for example, any of the network systems illustrated in FIG. 2B (i.e., 2200), FIG. 3 (i.e., 3200), and FIG. 4 (i.e., 4000), to provide seamless communication between heterogeneous components connected to the network system. One or more of the components (i.e., end-points) connected to the network system may include the uniform messaging platform 1001 which provides the UMS 1116. For example, in the network system illustrated in FIG. 2B, the uniform messaging platform 1001 is only integrated in EUD 2110. In the network system illustrated in FIG. 3, the uniform messaging platform 1001 is integrated in EUD 2110 and Hub 3001. In the network system illustrated in FIG. 4, the uniform messaging platform 1001 is integrated in EUD 2110, Hub 4001, and Helmet system 4175.

Any component connected to the same network that has the uniform messaging platform 1001 integrated therein is understood to include the UMS 1116. Any component connected to the same network system that includes the UMP 1001 is a bridge-compatible device. Conversely, any component connected to the same network that does not include the UMP 1001 is a non-bridge-compatible device.

Referring now to FIG. 2A perspective view of a first hub (HUB 1) 2901 is shown. The first hub is configured for communicating power and data signals between devices operatively connected to the hub.

The first hub 2901 is a six-port hub that includes a hub enclosure 2940, three device ports (i.e., 2992, 2994, 2996), an end user device (EUD) port 2984, a main power port 2960, and an auxiliary power port 2910. It is understood that alternative embodiments of a hub can include more or fewer device ports, power ports, and EUD ports without deviating from the technology disclosed herein. In a particular alternative embodiment, a four port hub includes a main power port 2960, an EUD port 2984, and two device ports 2992, 2296. In preferred embodiments, a hub includes at least one power port, one EUD port, and one or more device ports.

The hub enclosure 2970 protects internal components, including processors and other electronics, from, for example, water, weather, and mechanical damage.

Each device port includes a power device interface 2990 for mechanically and electrically connecting with a power device. Power devices include power loads, power sources, and devices that can function either a power load or power source depending on circumstances, for example rechargeable batteries.

The device ports (i.e., 2992, 2994, 2996) are typically used for connecting power loads although in some embodiments they can be used for connecting power loads and/or sources. Each device port includes a device port cable 2950 that mechanical and electrically connects the power device interface 2990 to the hub enclosure 2970 and electrically connects the power device interface to the electronics contained within the hub enclosure. Each device port cable is connected to the hub enclosure at a hub/cable interface 2940.

Each device port is configured to provide power and data connections between the hub and a connected power device.

Each power port (i.e., 2910, 2960) includes a power supply interface (i.e., 2925, 2922) for mechanically and electrically connecting with a power supply, e.g., a power source or a rechargeable battery that is providing power. Each power port includes a power port cable (2930, 2932) that mechanical and electrically connects the power supply interface to the hub enclosure 2970 and electrically connects the power supply interface to the electronics contained within the hub enclosure. Each power port cable is connected to the hub enclosure at a hub/cable interface 2940. Each power port is configured to provide power and data connections between the hub and a connected power source.

The EUD port 2984 includes an EUD interface 2982 for mechanically and electrically connecting with an EUD. Each EUD port includes an EUD port cable 2980 that mechanical and electrically connects the EUD interface 2982 to the hub enclosure 2970 and electrically connects the EUD interface to the electronics contained within the hub enclosure. Each EUD port cable is connected to the hub enclosure at a hub/cable interface 2940. Each EUD port is configured to provide power and data connections between the hub and a connected EUD.

In some exemplary, non-limiting, embodiments, the first hub 2901 is configured to operate using a USB protocol and each of the device, EUD, and power ports are configured as USB-compatible ports. Alternatively, one or more of the main power port 2960 and auxiliary power port 2910 may be configured to interface with a non-USB power source.

In some embodiments, the hub 2901 is configured to be used to form an intra-solider personal area network (PAN), for example a USB network that includes one or more of connected power devices, power supplies, and EUD. The PAN is not limited to a USB network, for example the PAN can include a network using one or more networking protocols, including USB, Bluetooth (BT), Wi-Fi, and Intra Soldier Wireless (ISW), for example an ISW network as provided by Alereon.

The first hub 2901 is configured to perform full voltage and current monitoring of external power devices 2901, including power loads and power sources, electrically connected with one or more of the device ports and power ports. The first hub is further configured to log power characteristics of the connected power devices, for example one or more of power provided to the hub, power drawn from the first hub, and length of time that power is drawn or provided.

The first hub 2901 is configured to draw power from a main power supply, for example a 5V power supply, or to scavenge from an auxiliary power supply. The first hub is configured to provide power to power devices and to the EUD. The first hub can be configured to provide power to each connected power device and EUD at a configurable voltage and/or current amplitude that can be set based on power requirements of a connected power device or EUD. In examples, the first hub provides power having a voltage of 8V to 24V, or 8V to 17V.

Referring now to FIG. 2B, a schematic representation of an exemplary embodiment of a first intra-soldier personal area network (PAN 1) 2200 is shown. The first intra-solider PAN includes a second hub (HUB 2) 2001. The second hub (HUB 2) is substantially similar to the first hub (HUB 1) 2901 shown in FIG. 2A. The second hub is electrically connected to multiple power devices (e.g., 2101, 2103), power supplies (e.g., 2020, 2060), a helmet system 2105 and EUD 2110. Each device port (e.g., 2992, 2994, 2996), auxiliary power port (AUX PP) 2910, main power port (Main PP) 2960, and EUD port 2984 may include a cable (e.g., 2930, 2932, 2950, 2980) that is fixedly attached to the hub enclosure 2070, as illustrated in FIG. 2A. In an alternative embodiment, one or more of the ports are mounted on an exterior surface of the hub enclosure and may be connected directly to a power device, power supply, or EUD or may be connected thereto via a detachable cable.

An auxiliary power supply (AUX power supply) 2020 is connected to the auxiliary power port (AUX PP) 2910 and a main power supply 2060 is connected to the main power port (Main PP) 2960. The EUD 2110 is connected to the EUD port 2984. An exemplary EUD 2110 includes a smartphone running an Android operating system (OS), for example a Samsung Galaxy S20. The EUD can function as master of a system that includes the second hub and power devices operably connected to the first PAN. Moreover, the EUD includes the uniform messaging platform (UMP) 1001.

A power device, and more specifically in some embodiments a power load, is connected to each device port. Exemplary power devices include a first IP radio, for example a Multiband Inter/Intra Team Radio (MBITR) (2101) connected to the first device port 2992, a smart scope 2103 (connected to the second device port 2994), and a helmet 2105 comprising one or more power devices, for example a communication system, strobe, and/or one or more sensors, connected to the third device port 2996. In alternative configurations, one or more different power devices can be connected to one or more of the device ports including, for example, a gesture control system, for example a Pison system produced by Pison, Boston, MA, targeting sights, or a GPS system.

The second hub 2001 includes a processor 2071 and associated memory 2072. The second hub includes a power and data router 2075 that is electrically connected with each port and that is controllable by the processor 2071 to exchange power and communication signals with and between the ports. In some embodiments, the power and data router 2075 includes a USB hub. Double-headed arrows represent communication and power exchange pathways.

A scavenger converter 2074 is disposed between the auxiliary power port 2910 and the power and data router 2075. The scavenger converter is a DC to DC power converter that can be controlled by the processor 2071 to convert a voltage of a power signal received from an auxiliary power supply 2020 to a voltage that is compatible with the power and data router. Embodiments can include an AC to DC power converter for scavenging power from an AC auxiliary power supply.

In an exemplary embodiment, the auxiliary power port 2910 is configured to receive power up to 50V and up 5A and can handle power up to 60 W. Internal thermal protection is associated with the auxiliary power port to prevent overloading. The processor 2071 implements a math based detection scheme to identify a type of a power source connected to the auxiliary power source, for example to determine whether the source is a solar blanket, and AC adapter, or a generator. In an exemplary embodiment, a stable power source connected to the auxiliary power port is ramped up until voltage collapse, following which the last stable is used as the current point to extract a highest sustainable power level from the power source.

The second hub 2001 includes a universal serial bus interface (USB IF) 2057 for routing messages over a USB transmission medium (e.g., cables and ports), a ultra-wideband interface (UWB IF) 2059 for routing messages over a ultra-wideband transmission medium (e.g., radio waves) and a Bluetooth interface (BLE IF) 2067 for routing messages over a Bluetooth transmission medium (e.g., radio waves).

Referring now to FIG. 3 a schematic diagram of a second intra-soldier personal area network (PAN 2) 3200 is shown. The second intra-soldier PAN 3200 includes an EUD 2110, a third hub (HUB 3) 3001, and multiple power devices (Power Device 1 through n) (i.e., 3101, 3103, 3105, 310*n*). In embodiments, and referring to FIGS. 2A and 2B, the third hub 3001 is substantially similar to the first hub 2901 and to the second hub 2001 and shares characteristics thereof.

The hub and EUD together implement a novel middleware bridge (i.e., both components include a UMP 1001), which is operable to standardize data communicated between the two devices and to standardize transport of the data, both of which are useful for quickly integrating the middleware across multiple devices.

The third hub 3001 includes a hub processor 2071 that is communicatively coupled to the memory 2072. The memory includes a hub power log 3307, which includes a file system for storing power-related information.

The third hub 3001 includes multiple device ports (Device ports 1 through n) (i.e., 3092, 3094, 3096, 309*n*), each of which is communicatively connected to the hub processor 2071. The set of device ports can include one or more ports for connecting a power load, a power source, or a rechargeable battery, as similarly shown in FIG. 2A and FIG. 2B. In an exemplary embodiment, the device ports of the third hub include three or more ports for connecting power loads (e.g., 3101, 3103, 3105 and 310*n*), at least one port (e.g., 2960) for connecting a main power supply (e.g., 2060), and at least one port (e.g., 2910) for connecting an auxiliary power supply (e.g., 2020), wherein the at least one port for connecting an auxiliary power supply is electrically connected to a scavenging power converter. The third hub includes an EUD port 2984 that is communicatively connected to the hub processor 2071. Each device port, power port, and EUD port is configured for exchange of power and data signals between the hub and a connected power source, power device, or EUD.

Multiple power devices (power devices 1 through n) are each connected to a device port. Each power device is electrically and communicatively coupled to a device port and can either provide power to the third hub or receive power from the third hub. Each power device can also communicate via the device port to which it is connected, power data to the hub processor and exchange communication signals with the hub processor.

The EUD 2110 is electrically and communicatively coupled to the EUD port 2984 and can exchange power and communications with the third hub over the connection.

Together, the third hub 3001, EUD 2110, and the power devices (i.e., 3101, 3103, 3105, and 310*n*) comprise components (i.e., end-points) of the PAN 3200. The EUD can function as master of a system that includes the third hub and power devices operably connected to the second PAN 3200. The components comprising the PAN can communicate and exchange power signals using one or more networking protocols. In a particular embodiment, the PAN uses a USB protocol for power and communication exchange. The PAN can use one or more additional or alternative communication protocols (i.e., transport protocols), for example BT or ISW (intra-soldier) network (e.g., UWB). In some embodiments, the hub can receive and/or provide non-USB signals including power signals to and from devices that do not communicate power information to the hub.

The EUD 2110 includes an EUD processor 2114 and associated memory 3118. The EUD processor is communicatively connected to the memory and at least one port or network interface (not shown) for communication over the PAN. The EUD 2110 includes a UMP 1001 and operates a power application (Power App) 3304.

The power application 3304 includes a display module (DISPLAY) 2187 configured to generate UI information to be displayed on the EUD display screen. The power application includes an analysis module (Analysis) 2188 configured to generate power statistics data, and a modeler module (Modeler) 2189 configured to use one or more models or algorithms to make predictions regarding power data.

The memory 3118 of the EUD 2110 includes a historical power database (Historical Power DB) 3703 and an EUD power log 3705. The EUD power log 3705 is configured to store power data received by the EUD from the third hub 3001. The historical power database 3703 is configured to store historical power data corresponding to a plurality of power devices, including power devices that may be operative connected with the third hub. The historical power data can include power data that was collected from power devices, or power data corresponding to power devices, on previous missions, i.e. power data that was collected in the field under real use conditions, or power data that was collected from power devices under test conditions. The historical power data can include metadata such as, for example, temperature, location, and time of day corresponding to collection of the power data. In some embodiments, the historical power data includes data collected and stored on a per-device basis. The historical power data can include power data pooled by device type. The historical power database is typically provisioned with historical power data prior to deployment of the EUD 2110 on a mission that includes the generation and collection of live power data. The historical power database can be augmented with newly collected live power data either during a mission or after a mission is completed.

In an embodiment, each power device (i.e., 3101, 3103, 3105 and 310*n*) communicates raw power data messages 3300 to the hub processor 2071. Exemplary raw power data include power that the power device (e.g., a load or rechargeable battery) is consuming, power that the power device (e.g., a source or power supply) is providing. For example, each power device provides a stream of data including instantaneous power consumption or power supplied by the power device to the hub processor. Exemplary raw power messages can further include data reported by a smart battery, e.g., state of charge (SoC) and state of health (SoH). The raw power messages can further include ancillary data or metadata such as a device identified and data that may be relevant for power device performance, for example temperature. Raw power data messages include an identifier of a device sending the message, for example a USB ID, hardware identifier, serial number, provisioned device ID, or the like.

In an embodiment, the hub processor 2071 probes each device port (i.e., 3092, 3094, 3096 and 309*n*) and, in response, receives raw power data 3300 from each power device that is operably connected to the corresponding device port. The hub processor can be configured to retrieve raw power data messages at a default time interval or at an interval set by a user. For example, the hub processor can be configured to probe each device port at intervals of 1 second, 5 seconds, 30 seconds, 1 minute, 5 minutes, or at another desired interval. In addition or alternatively, the hub processor can be configured to determine power characteristics of power devices by monitoring voltage, current, and/or power signals provides by one or more power sensors (not shown) in communication with the hub processor. In this manner, the hub processor can determine power characteristics of power devices independently of communications received from the power devices, for example of non-USB power devices.

The hub processor 2071 writes power data corresponding to each power device to the hub power log 3307. The hub processor may tag the power data with information including an identity of the power device, a mission ID, a callsign of a user of the third hub, and time information. The hub processor may also write additional information to the hub power log, including for example a temperature associated with power data, a date, time of day, battery state of health, battery state of charge, or any other information including information communicated to the hub processor by one or more of the power devices.

The hub processor 2071 and EUD 2110 include the uniform messaging platform 1001 to communicate live power messages. The hub processor of the third hub operates the UMP to generate live power data messages. The live power data messages 3500 include uniform bridge messages with power data corresponding to one or more of the power devices and a bridge header. The power data included in the live power data messages are generated by the hub processor based on raw power data received from the power devices.

An exemplary live power data message 3500 includes live power data corresponding to multiple power devices. In an embodiment, the hub processor 2071 uses the UMP 1001 to generate live power messages based upon raw power data messages received from power devices by combining data from multiple raw power messages into one or more live power messages, each including data from multiple power devices. In addition, or alternatively, the hub processor generates live power data messages based on raw power data that the hub processor has saved to the hub power log 3307.

In embodiments, the hub processor 2071 generates and communicates live power data messages 3500 that include power data corresponding to each power device connected to a device port. In this manner, the hub processor combines multiple streams of power data, each stream corresponding to a different power device, into a single stream of live power message data that includes power data from each power device connected to the third hub.

In some embodiments, the third hub 3001 uses USB for exchange of power signals between power devices and uses USB or another communication protocol for communicating live power data messages. In a preferred embodiment, the third hub 3001 preferentially uses USB for communication live power data messages but can use ISW if USB is unavailable and can use BT if both USB and ISW are unavailable. The hub processor can generate and communicate live power data messages at configurable intervals, for example at an interval corresponding to an interval at which the hub processor probes the device ports.

The EUD processor 2114 receives live power data messages from the third hub 3001 and operates the EUD bridge application (i.e., UMP 1001) to decode the received live power data messages, for example by removing bridge headers from live power data payloads and assembling the data payloads into messages that can be broadcast to applications running on the EUD. The EUD processor 2114 extracts power data corresponding to each of the multiple power devices from the live power data messages 3500. The EUD processor can communicate the power data to the power app 3304 and can store power data in the EUD power log 3705.

The power app display module 2187 is configured to generate display data that includes live power data corresponding to power devices operatively connected to the third hub 3001. The analysis module 2188 of the power app 3304 is configured to generate power statistics, for example average and peak power consumption and provision.

In an exemplary embodiment the power app 3304 displays an average power drawn by power loads connected to the third hub, a peak total power drawn by the power loads, and a bar chart indicating live power draw of each of the power loads. In additional embodiments, the power app is configured to display average and peak power supplied by one or more power sources and power provided by each power source.

The power app 3304 can communicate with the EUD memory 3118 to access the historical power database 3703. In a particular embodiment, the power app retrieves, from the historical power database, historical power data corresponding to each of the power devices connected to the third hub and/or historical power data corresponding to power devices from which the power app has received power data. The power app may perform automatic filtering of power data, for example, to filter power data with values that are outside of expected bounds. In some embodiments, the historical power data is filtered by relevance. For example, if a mission occurs during winter, the power app can select historical power data with associated temperature data that is similar to temperature during the mission, which may be selectable based on co-stored temperature data. In other embodiments, the historical power database 3703 can be selectively provisioned with power data corresponding to conditions of a particular mission and power data can be filtered, for example to remove out-of-bounds values, prior to being saved to the historical power database.

The modeler module 2189 of the power app 3304 operates one or more predictive algorithms using live power data from one or more power devices and historical power data corresponding to the one or more power devices to generate predictions. In an exemplary embodiment, the modeler generates a prediction of remaining run (i.e., remaining powered time) based on live power data including power remaining from a power source (e.g., state of charge or a battery) and power drawn by power loads; and historical power data including historical power consumption and power provision data corresponding to connected power devices.

In embodiments, the power app 3304 can display a predicted remaining run time and update the displayed predicted time as new live power data is received from the third hub. In embodiments, the power app can generate one or more alerts based on one or more of live power data, historical power data, and predictions. For example, the power app can display an alert when a predicted remaining run time falls below a threshold value.

Referring now to FIG. 4, a schematic representation of a first network system (System 1) (4000) is shown. The first network system includes an intra-soldier personal area network (PAN) 4200 and an inter-soldier Wi-Fi network 4595. The PAN includes a fourth hub (HUB 4) 4001, and EUD 2110, and multiple power devices (Power Devices 1 through N) (i.e., 4101, 4103, 4105).

The components of the PAN are communicatively coupled to each other over at least one intra-solider communication network, for example one or more of a USB network, an ISW network, and a BT network. Components of the PAN can also be communicatively coupled with external, to the PAN, devices, services, etc. over a LAN, for example over an inter-soldier Wi-Fi network.

The inter-soldier Wi-Fi network is configured for communication between the PAN, components of which are worn or carried by a first soldier, and components comprising one or more other PANs, each associated with another soldier, and other Wi-Fi enabled devices. The inter-soldier Wi-Fi network includes Wi-Fi device 1 and Wi-Fi device 2, which can include a hub comprising another PAN or any other Wi-Fi-enabled device. Arrows indicate communication of messages, including for example live power data messages and more generally any communication message, between components of the system.

In embodiments, the fourth hub 4001 is substantially similar to the first, second, and third hubs illustrated in Figured 1 through 3. The fourth hub (HUB 4) includes a UMP 1001, a hub processor (host processor) 2071, an associated memory 2072, a USB hub 4205, a Wi-Fi radio 4206, and an ISW radio 4203. The USB hub 4205 is configured to relay communication and power signals to, from, and between the power devices and the EUD. In embodiments, the fourth hub includes, in addition or alternatively to the USB hub, Wi-Fi radio, and ISW radio, one or more devices or modules for communication using another protocol, for example BT. The fourth hub includes multiple device ports and at least one EUD port (not shown).

The power devices (4101, 4103 and 4105) can include one or more power loads, power sources, or rechargeable batteries. Example power loads include, but are not limited to, a MBITR, a helmet, and another power device. Example power sources include, but are not limited to, a main power supply and an auxiliary power supply.

The EUD 2110 includes an EUD processor 2114 and an associated memory 2118, a Wi-Fi radio 4119 and one or more ports or network interfaces (not shown) for communication over the PAN 4200. The EUD processor operates a bridge service (UMS 1116) and multiple applications (App A, App B). Referring to FIG. 3, an exemplary application includes a power app 3304. Additional exemplary applications can include an ATAK application, a communication application, for example an application that converts audio to text, and one or more applications for interfacing and interacting with one or more power devices.

Referring now to FIG. 4, an example uniform bridge message flow is shown. The example bridge message flow uses the UMP 1001. The bridge message flow begins at the circle labeled "Start" and is indicated by arrows connecting various components, applications, and modules of the PAN and inter-soldier Wi-Fi network. The UMP 1001 includes loosely coupled integration between devices, including power device and the EUD, and applications and functions as a multi-protocol message router to route messages between devices and between applications and services.

A first application (App A) operating on the EUD generates an application message (Message). The application message can be a message having a particular format, for example MQTT message format, or a message for any transport protocol that the application is capable of using, for example Android OS broadcast, USB, ISW, BT, or Wi-Fi.

The UMP 1001 operating on the EUD processor generates a bridge message that includes the application message as a bridge message payload. The bridge service module (i.e., UMS 1116) inserts the applications message as-is into a payload section of a bridge message and adds, to the bridge message, a header section that includes information that indicates how the middleware should route the bridge message. The bridge service module may split the application message into bridge message payloads of multiple frames to make a larger application message compatible with size restrictions associated with a particular transport protocol used for communication of the bridge message or messages. In this case, the bridge message payloads are reassembled into the original application message on the receiving side.

The EUD bridge service (i.e., UMS 1116) communicates, via the USB hub, the middleware formatted bridge message to a host bridge service module operating on the host processor. The EUD 2110 can select a particular transport protocol for sending uniform bridge messages. In an example, the EUD bridge service generates a plurality of bridge frames containing the application message and the bridge frames are broadcast from the EUD in USB data packets. In an example, EUD can send the bridge frames across ISW, BT, or Wi-Fi protocols. In a particular example, the EUD hosts a USB device and a BT-connected device concurrently. The middleware ensures that all connected devices receive messages over the highest priority connection between the EUD and each of the devices. In a preferred embodiment, the EUD preferentially sends the middleware formatted bridge messages over USB. If USB is not available the EUD sends the messages over a soldier wireless network such as an ISW network, and if neither USB nor soldier wireless are available, EUD sends them over BT. In a similar manner, a bridge service operating on another device, for example on the hub or on a power device, can send bridge frames across a protocol selected from one or multiple available protocols.

The host bridge service module receives middleware formatted bridge messages from the EUD bridge service and broadcasts the middleware formatted bridge messages to other devices comprising the PAN, for example to each of power devices 1 through N and to the EUD. The host processor can send the middleware formatted bridge messages over an available intra-solider communication network, for example of USB, ISW, or BT (in example descending order of preference).

Referring now to FIG. 2, in some embodiments a hub (e.g., HUB 2) a hub processor may not act as a USB host or alternatively, a hub may not include a processor. In these embodiments, a host bridge service module (i.e., UMS 1116) may be installed on one or more devices connected to the hub, for example on an Android OS EUD connected to the hub. The software selects one of the devices that includes a bridge service module to act as host.

Referring once again to FIG. 4, if a power device or EUD 2110 that receives a middleware-formatted bridge message includes a bridge service (i.e., UMS 1116), the device or EUD bridge service decodes the bridge message, i.e., removes the bridge header and extracts the data payload that includes an application message, or a portion thereof. In other words, the EUD bridge service receives, from the hub, one or more bridge messages frames according to the technology disclosed herein. The EUD bridge application extracts an application message from one or more bridge messages frames and reassembles the application message if it was received as multiple portions in multiple frames. The application message is reassembled from the frames, even if frames are not received in order or interspersed with frames from other messages. The application message can then be passed to one or more applications on the EUD. For example, the EUD receives a bridge message frame (i.e., uniform bridge message) from the host processor 2071 and operates the EUD bridge service to extract, from the frame, an application message that can communicated to one or applications operating on the EUD. In the example illustrated in FIG. 4, Application B, operating on the EUD, receives the message from the EUD bridge service and processes information contained therein. In this manner, applications interact with the EUD bridge service to receive data that was encoded in bridge messages.

In some embodiments, an EUD 2110 includes a hub API 4117, which it can use to communicate to the hub to set various system properties, including but not limited to, system recording period, system date, system time, system license, system calibration parameters. The EUD 2110 can also use the hub API to communicate to the hub to request and receive various data, including but not limited to, system recording period, system date, system time, system license, names of the full set of hub stored datalogs by date and time, or the full content of a specific datalog. The EUD can also use the hub API to communicate to the hub to request the hub to delete a specific datalog or to request the hub to delete all datalogs.

If the host processor 2071 receives one or more bridge messages that include, in a bridge header field, an indication that the messages should be transmitted over Wi-Fi, the host bridge service generates Wi-Fi packets that include the bridge message payload content and transmits the Wi-Fi packets to Wi-Fi devices (Wi-Fi device 1, Wi-Fi device 2) over the inter-soldier Wi-Fi network. In exemplary embodiments, only the host processor is configured to send messages out of the PAN, e.g., over Wi-Fi or over another LAN or WAN. In examples, the host processor can send messages an external, relative to the PAN, device, for example a Wi-Fi device, which is part of an intra-squad, intra-platoon, or intra company network. Advantageously, bridge messages that include power data can be communicated from one or more PANs to one or more external devices. The power data from one or more PANs can analyzed on an external device, either on a per-PAN basis or as data aggregated from the multiple PANs, and in some examples combined with data from a source external to a PAN, for example from a weather forecast data source. An example analysis of this type includes detecting an impending low power state within a group of soldiers, for example within a squad. In addition, a hub can receive message data from an external device, for example historical power data to seed a local data store comprising historical power data with aggregated historical power data.

In some embodiments, another device connected to the PAN 4200, for example the EUD, includes a Wi-Fi radio 4119 and can send Wi-Fi messages out of the PAN, for example to Wi-Fi device 2 (e.g., a device connected to 4595). Referring now to FIG. 2, this is useful in the case where a hub (e.g., HUB 2) 2001 does not include a Wi-Fi radio. In an example wherein multiple Wi-Fi enabled devices are connected to a PAN, a single Wi-Fi enabled device is selected for communication, via Wi-Fi, with devices outside of the PAN. In an example, multiple bridge service module instances communicate to select the one Wi-Fi enabled device that acts as host between the PAN and a LAN. This is advantageous to prevent duplicate messaging if multiple Wi-Fi enabled devices on the PAN were to each communicate messages to the LAN.

Referring now to FIG. 5 is a schematic representation of a second network system (system 2) (5000) is shown. The second network system includes an intra-soldier PAN 5200, an inter-soldier Wi-Fi network 5601, and a MQTT broker 5605. MQTT is a server-based middleware used to integrate the PAN with TCP-IP networks, for example across a battlefield. The MQTT broker provides integration with a wide area network WAN for exchange of MQTT messages. The PAN 5200 includes a host processor 2071, a UMP 1001 and a USB hub 4205 controlled by the host processor. The EUD 2110 is in communication with the host processor 2071 via the USB hub 4205.

An application (App C) operating on the EUD 2110 generates a MQTT message 5118. The EUD bridge service (UMS 1116) generates one or more bridge messages 5115 with the MQTT message as bridge message payload and with added bridge headers. Bridge-specific information, for example a message target and indication of payload type, are included in the headers of the bridge-formatted messages. Bridge message payloads are generic, for example holding one or more MQTT messages as shown. The EUD bridge service communicates the bridge formatted message(s) to the host processor 2071 via the USB hub. In an alternative implementation, the EUD can communicate the bridge-formatted message(s) to the host processor over a different PAN communication network, for example over ISW or BT.

The Host processor receives the bridge-formatted messages from the EUD. The host bridge service removes the bridge header(s) and sends the MQTT message over inter-soldier Wi-Fi to the MQTT broker.

The host processor can receive an MQTT message 5119 from the MQTT broker 5605. When this happens, the host bridge service (i.e., UMS 1116) generates one or more bridge-formatted messages 5113 that include the received MQTT message as bridge message payload(s) and with added bridge headers. The host processor transmits the bridge-formatted message(s) to the EUD 2110. The EUD bridge service removes the bridge header(s) from the bridge formatted message(s) and provides the received MQTT message payload 5117 to the application (App C).

A method implemented by a system similar to the second system (system 2) 5000 can be used to encapsulate message payloads with native formats other than MQTT in bridge-formatted messages, communicate the bridge-formatted messages through the PAN, remove bridge headers from the message payloads, and transmit the message payloads in native format over one or more communication networks or provide message payloads in native format to one or more applications (e.g. App C).

Referring now to FIG. 6, a diagram including exemplary, non-limiting, details of operations carried out by components implementing exemplary inventive middleware according to embodiments of the technology disclosed herein is shown. FIG. 6 illustrates operations carried out on a device such as an EUD 2110 or power device or on a hub or host processor, with reference to FIGS. 1 through 4.

The UMP 1001 is designed to isolate messaging APIs (e.g. a Bridge API) from hardware and to isolate the messaging API from message transport protocols. Novel aspects of the disclosed UMP 1001 include, but are not limited to, rules for handling data packets, routing of data packets, and device queues. A particular embodiment of the technology is designed specifically for Android OS and for meeting the needs of a multi-protocol soldier PAN.

A consumer application includes a bridge library 1703 with a bridge API (e.g., 6704 and 6705) and a broadcast listener module. The consumer application represents an application operating on a host or hub processor, an application operating on a power device, or an application running on an EUD, for example and referring to FIG. 4 and FIG. 5, applications (App A, App B, and App C).

The bridge service is operable to generate bridge frames that include a message generated by the consumer application and a bridge header. The bridge service is further operable to process the bridge frames for transport routing, and transmit the bridge frames over a selected transport protocol, for example one or more of USB, ISW Wi-Fi, or BT.

The bridge service is also operable to receive packets or other data structures that include bridge frames over a transport protocol (e.g. USB, ISW, Wi-Fi, or BT), extract the bridge frames from the received packets or other data structures, assemble data payloads from the frames into a message, and broadcast the message to one or more applications, for example using Android OS broadcast.

Bridge headers include information that may be used by the bridge service for processing bridge messages. Exemplary information in a bridge header includes sending device ID, and optionally a target device ID. The middleware operates using a Publish/Subscribe model wherein messages are broadcast to all connected devices but can support Request/Response messaging based on information included in the header, e.g., target device ID. In an embodiment, when a device sends a targeted message, the bridge sets up a temporary listener service to listen for a reply from the intended target device and to receive the full response before sending the response to the requester.

The bridge service includes a number of rules including, for example: rules for how to handle packets based on information in headers; rules for decoding and assembling data from packets; rules for processing targeted packets; and rules for routing packets based on type of device that is processing the packets. The rules can include different routing rules for each transport type. In some embodiments, the rules include rules for filtering data, for example based on data content of packets, and rules for routing data to particular devices, for example based on data content of packets.

If the bridge service is operating on a host processor or if the bridge service is operating on a device (e.g., an EUD or power device) and there are no other devices connected to a PAN comprising the device, bridge frames may be added to an incoming frame queue on the device. If the bridge services is operating on a host processor, bridge frames extracted from incoming messages (e.g., from USB, Alereon, Wi-Fi, or BT messages) may be added to a device queue to be broadcast from the host processor over one or more of USB, Alereon, Wi-Fi, and BT.

Turning to FIG. 7, the steps described in flow diagram 7000 describe exemplary functions performed by the UMS 1116. The UMS 1116 initially discovers any component(s) (this includes services offered by the component(s)) connected to the network system on which the UMS is operating, at step 7100. The UMS may use a discovery protocol, such as, for example, service discovery protocol (SDP), simple service discovery protocol (SSDP), universal plug n play (UPnP), service location protocol (SLP), universal discovery description and integration (UDDI), secure persuasive discovery protocol (SPDP), etc.

The discovery protocol allows the UMS 1116 to obtain configuration and profile data for the discovered component (Step 7102). For example, using a discovery protocol, the UMS may send an inquiry to a discovered component on the network requesting whether the component is enabled for UMS. The configuration and profile data for the discovered component(s) may include device identification information, one or more transport protocols used by the component, data routing rules, location/port number, data syntax/format, whether the component is bridge compliant or non-bridge-compliant, data routing rules, etc.

At steps 7104-7106, the UWS 1116 creates a device profile for the component including the configuration and profile data and stores the device profile in the profile database. In addition to the profile database, the uniform messaging platform includes a library 2703 which has a collection of APIs used by the UMS for converting messages received on the network.

In a heterogeneous network system, (e.g., the network systems illustrated in FIGS. 2-4), the devices connected to the network system may operate in different computing environments, and thereby may have different operating systems, programs, processors, transport protocols, transmission mediums, messaging protocols, etc. Thus, when a message is created by a device on the network system, the message is created in a format native to the device (i.e., using the specific protocols and resources that govern the device). Accordingly, a native source-format message is a message formatted consistent with the computing environment of the source device (i.e., end-point), and a native destination-format message is a message formatted consistent with the computing environment of the destination device (i.e., end-point).

The UMS 1116 disclosed herein allows UMS-enabled devices (i.e., devices integrated with the uniform messaging platform) to communicate with one another using a uniform bridge message. The format of the uniform bridge message is different from the native format of any source or destination. The advantages in using the uniform bridge message include providing a straight-forward and efficient means for messaging, reducing single point bottleneck and minimizes latency. Since, conversion to a uniform bridge message is straight forward, it reduces the processing time necessary to perform messaging between two UMS-enabled devices. Each UMS-enabled device is able to encode and decode uniform bridge messages.

When a received message is intended for a UMS-enabled device (bridge-compliant device), the UMS 1116 converts the message into a uniform bridge message by inserting the message as-is into a payload section of the uniform bridge message and adding a header section that includes routing information. The UMS 1116 is able to use the received message as-is unless the size of the message exceeds the size restrictions associated with a particular transport protocol for communication of the uniform bridge message(s). In this instance, the UMS 1116 may split the large message into multiple uniform bridge message payloads having the same header information for transmission to a destination UMS-enabled device. A destination UMS-enabled device is able to decode the uniform bridge message(s) and perform further processing.

A uniform bridge message cannot be encoded or decoded by a device that is not UMS-enabled. Thus, a uniform bridge message is not generated for a device that is not UMS-enabled. To that end, when a received message is intended for a device that is not UMS-enabled (i.e., non-bridge-compliant), the received message will be in a format native to the source device. Hence, the UMS 1116 will not be able to use the message as-is but will instead have to convert the message into the format native to destination, which inherently requires more processing than generating a uniform bridge message. The UMS 1116 uses the information in the profile database and the library to convert the message into the format native to the destination.

Turning to FIG. 8, the processes performed by the uniform messaging application (UMA) 1220 in the UMS 1116 are described in flow diagram 8000. The UMA 1220 waits to receive a message from an end-point connected to the network system. At step 8002, the UMA 1220 receives a message from a source (i.e., a source end-point) for transmission to a destination (i.e., a destination end-point). At step 8004, the UMA 1220 determines the destination of the message from information included in the header of the message. At step 8006, the UMA retrieves and examines the profile information for the destination from the profile database. Using the information retrieved from the profile database, the UMA 1220 is able to determine whether the destination is a bridge-compliant device (i.e., step 8008) and is able to identify one or more transport protocols used by the destination device (i.e., step 8009).

At step 8010, the UMA 1220 converts the message into a universal bridge format, if the UMA 1220 determines that the destination is bridge compliant. If the UMA 1220 determines that the destination is not bridge compliant, at step 8012, the UMA 1220 converts the message into a native destination format. At step 8014, the converted message and the one or more transport protocols are provided to the multi-protocol routing application (MPRA) 1221 in the UMS 1116.

Turning to FIG. 9, the processes performed by the multi-protocol routing application (MPRA) 1221 in the UMS 1116 are described in flow diagram 9000. At step 9010, the MRPA 1221 receives one or more transport protocols (e.g., ultra-wideband (UWB), Bluetooth, USB, Wi-Fi, serial data) identified by the UMA 1220. If the MRPA 1221 only receives one transport protocol (step 9012), then at step 9016, the MRPA 1221 selects the interface that conforms to the transport protocol. If the MRPA receives more than one transport protocol for the destination (i.e., step 9012), then at step 9014, the MRPA identifies an interface (e.g., UWB interface, SMBus, TCP/IP, USB, Bluetooth) for each transport protocol. At step 9018, the MRPA determines the availability of each identified interface. If only one interface is available (step 9020), then at step 9023 the MRPA selects the available interface for transmitting the converted message to the destination. If more than one of the interfaces is available (step 9020), then at step 9022 the MRPA selects the highest priority interface for transmitting the converted message to the destination. The highest priority interface may be selected based on preferred interface type, bandwidth, or other factors. At step 9024, the MRPA outputs (i.e., routes) the converted message to the destination using the selected interface. In some exemplary embodiments, the MRPA 1221 uses different routing rules for each transport type to transmit messages to one or more destinations.

In some exemplary embodiments, the UMS 1116 may receive multiple native format messages simultaneously from multiple end-points connected to the network. In this instance, the UMS 1116 may convert the multiple native format messages collectively into one or more uniform bridge messages by combining the native format messages into one or more uniform bridge messages, with each uniform bridge message including data from each received native format message. Thereafter, the one or more uniform bridge messages are transmitted to a bridge compatible device.

Referring now to FIGS. 10A through 13, exemplary improved live power user interface (UI) layouts 10010, 12010 according to the technology disclosed herein are shown. Embodiments (10001, 10002, 10003, and 10004) of first exemplary live power UI layout 10010 corresponding to a six port hub is shown in FIG. 10A through 11. These UI embodiments may correspond, for example, to a six port hub such as Hub 2001 (see FIG. 2B). Embodiments (12001, 12002, and 12003) of a UI layout corresponding to a second live power UI layout 12010 for a four port hub is shown in FIG. 12A through 12C. A live voltage UI layout 11000 for a power port of a six port hub is shown in FIG. 11. A port detail UI layout 13000 for a battery port of a four port hub is show in FIG. 13.

The live power UI layouts 10010, 12010 are advantageous over known systems in that they provide improved, intuitively understandable, display of power characteristics of individual power sources and loads, system power and system draw, predictions, and alerts. The UI layouts are generated, referring to FIGS. 2A and 2B, by a power application (e.g. Power App 3304) operating on an EUD, e.g. EUD 2110, and are displayed on a display screen, e.g. 2112, of the EUD.

The UI layouts 10010, 12010 enable a user to monitor live power data on the EUD display, including power drawn from the hub and power supplied to the hub per port. This is useful in a number of ways. For example, a user can determine the actual power being consumed by each power device and, in response, can change one or more power device settings, for example radio power, to reduce power consumption. It is noted that information, including any of the disclosed UI layouts, e.g. 10010, 12010, are described herein in relation to a display of an EUD, which in the context of a military power and data system may include, for example, a Samsung S20 Tactical Edition smartphone. It is anticipated by the inventors, and would apparent to one skilled in the art, that the disclosed UI layouts and suitably modified or scaled version of the layouts, as well information contained therein, may be displayed on multiple types of devices that each comprising a means for displaying information to a user. Non-limiting examples of display devices on which the information may be displayed include a heads-up-display (HUD), a smart watch, and a tablet computing device. Exemplary smart watch layouts are disclosed herein in relation to FIGS. 30-33.

Each of the illustrated live power UI layouts includes 10010, 12010 an individual power display for each port of a hub that is in communication with the EUD and for each power device that is connected to the hub. The power information shown on the live power UI layouts may be generated by the power application 3304 as previously described in relation to FIG. 3. The live power can be updated at a default interval or at an interval configured by a user, for example live power data can be refreshed at an interval between 1 second and 5 minutes, for example every 5 seconds.

In an exemplary embodiment, a user can select a faster sampling interval for a particular port, for example an increased rate of sampling and display of live voltage data for a power port to which a solar blanket is connected. However the update interval, i.e. how often power data is recorded to a data store, for the particular port will not change, i.e. power data corresponding to the particular port will be stored at the same interval as other ports.

Referring to FIG. 10A through 10D, exemplary configurations 10001, 10002, 10003, and 10004 of the first live power UI layout 10010 are shown. The first live power UI layout includes, across the bottom of the layout, six power display tabs, each representing a single port of the six port hub. In this example, individual power display tabs for each port of the six port hub include: main power port (MPP) 10060; auxiliary power port (APP) 10020, EUD port (EUD) 10084, device port 1 (PAN 1) 10092, device port 2 (PAN 2) 10094, and device port 3 (PAN 3) 10096. Referring now to FIGS. 2A, 2B, and 10A through 10D, power display tabs of embodiments 10001, 10002, 10003, and 10004 of the first UI layout 10010 can correspond to device ports of power hubs 2000 and 2001 and can include display of information corresponding to one or more power devices that are connected to a corresponding hub device port. For example, MMP tab 10060 can correspond to MPP port 2960, APP tab 10020 can correspond to APP port 2920, EUD tab 10080 can correspond to EUD port 2984, PAN 1 tab 10092 can correspond to PAN1 port, or device port 1, 2992, PAN 2 tab 10094 can correspond to PAN2 port, or device port 2, 2994, and PAN3 tab 10096 can correspond to PAN3 port, or device port 3, 2996.

More or fewer power displays tabs can be shown on live power UI embodiments, depending on the number of ports that are included on a particular hub. For example, referring to FIG. 12A through 21C, exemplary configurations 12001, 12002, and 12003 of the second live power UI layout are shown. In exemplary configurations of the second live power UI layout, individual power display tabs for each port include: battery power port (BATT) 12111, EUD port (EUD) 12084, device port 1 (PAN1) 12092, and device port 2 (PAN2) 12094.

If no power device is connected to a particular port, a power display tab representing to port is shown grayed out and in a lowered position, for example tab (APP) 10020 as shown in FIG. 10A and tabs (BATT) 12111, (EUD) 12084, (PAN1) 12092, and (PAN2) 12094 as shown in FIG. 12A.

If a power device is connected to a port, the corresponding individual power display tab is illustrated in a raised or "popped up" configuration and includes display of live power consumption or provision associated with the power device and an identifier of the power device, for example, referring now to FIGS. 2A, 2B, 10A and 10B: MPP tab 10060 indicates that a SoloPack battery is connected to the main power port 2960 and is providing 24.24 W of power; EUD tab 10084 indicates that a USB is device connected to the EUD port 2984 and is drawing 0.12 W of power; PAN 1 tab 10092 indicates that a MBTIR is connected to the first device port 2992 and is drawing 22.66 W; PAN 2 table 100094 indicates that a second radio is connected to the second device port 2994 and is drawing 22.66 W; and PAN 3 port 10096 indicates that a helmet system is connected to the third device port 2996 and is drawing 1.41 W.

A lightning bolt shaped icon indicates, e.g. 10085, associated with a port tab, e.g. with EUD tab 10084, indicates that a power device connected to a corresponding device port, e.g. to EUD port 2984, is drawing power from a hub represented by a corresponding UI layout. A green battery shaped icon, e.g. 10065, associated with a port tab, e.g. with MPP tab 10060, indicates that a power source connected to a corresponding power port, e.g. 2960, is providing power to a hub representing by a corresponding UI layout. A yellow battery shaped icon that includes a lightning bolt symbol, e.g. 10067, associated with a port tab, e.g. with MPP port 10060 (see FIG. 10C), indicates that a rechargeable power supply, e.g. a conformal battery, is connected to a corresponding power port, e.g. to MPP port 2960, and is drawing power from a hub to recharge the rechargeable power supply. A green lightning bolt shaped icon, e.g. 10020, indicates that an auxiliary power source, for example an AC power source, is connected to the auxiliary power port, e.g. to APP 2920, and is providing power to a hub corresponding to the UI layout.

A live power UI layout, e.g. 10001, 10002, 10003, 10004, 12001, 12002, 12003, also includes a display or total system demand 10100, 12100 and a display of system supply 10200, 12200. System demand, e.g. 10100 can include a current, live, value 10110, 12110 and a peak value 10115 of power requested or consumed by all connected power loads, including power devices and the EUD represented by tabs 10084, 10092, 10094, 10096, 12084, 12092, and 12094. The system demand display 10100, 12100 includes a curved bar plot indicating the current, live, demand of connected power devices. System supply includes 10200, 12200 a current, live, value of remaining energy (expressed in watt-hours Wh) and maximum energy available (i.e. a total energy capacity) corresponding to all connected power sources and a curved bar plot 10200, 12200 indicating live energy available 10210, 12210 as a function of maximum energy available. In an exemplary embodiment, a hub, e.g. 1001, 2001, communicates with a power supply that includes a smart battery, e.g. main power supply 2010 comprising a Galvion SharePack battery, via SMBus to determine actual capacity based on battery health and the UI, displays the actual battery capacity.

As shown in FIG. 10A, a first exemplary configuration 10001 of the first live power UI layout 10010 can include a Remaining Run value 10300, i.e. a predicted remaining time that sufficient power to meet demand will be available based on current system demand 10110, system energy supply 10210, and historical power data regarding power performance of the connected power supplies and power devices.

As shown in FIG. 10B, a second exemplary configuration 10002 of the first live power UI layout 10010 can include an alert 10400 which is displayed if a predicted live value of remaining run time falls below a pre-configured threshold value.

Referring now to FIGS. 12B and 10C, a third exemplary configuration 10003 of the first live power UI layout 10010 is displayed when a source of charging power, e.g., an auxiliary power supply 2010 comprising an AC power adapter, is connected to the auxiliary power port 2920. APP tab 10020 indicates that the AC adapter is connected to the APP port 2920 and indicates and amount of power that is provided by the AC adapter. An icon 10025 associated with APP tab 10020 may include a specific color when power is being supplied to the APP port 2920. In an embodiment the icon 10025 is colored green when a power source is connected to the APP port. It is noted that in FIGS. 10A and 10B, a battery icon 10065 associated with MPP tab 10060 may also be colored green when a power supply is attached to a corresponding MPP port 2960 and is suppling power. Referring once again to FIG. 10C, a battery icon 10067 that includes a lightning bolt symbol may be displayed at MPP tab 10060 when a rechargeable power source, for example a conformal battery, is attached to corresponding MPP port 2960 and is being charge by power provided by a hub, e.g. by hub 2001 (see FIG. 2B). Referring to FIG. 10A, one or more of power device ports, e.g. 10084, 10092, 10094, and 10096, may each include a lightning-bolt shaped live power icon, e.g. 10085, when a power device is drawing power from a corresponding hub device port, e.g. from EUD port 2984 (see FIG. 2B). In embodiments, the icon 10085 is colored blue.

Referring now to FIGS. 2B and 10D, as shown in FIG. 10D, an embodiment of an EUD 10500 includes the fourth exemplary configuration 10004 of the first live power UI layout 10010 shown on a display screen 10550 of the EUD. The fourth exemplary configuration 10004 of the first live power UI layout 10010 includes MPP tab 10060 and APP tab 10020 both popped up, indicating that a separate power source is connected to each of corresponding power ports 2960 and 2920. For example, a main power supply 2060 comprising a Galvion SharePack battery is connected to Main PP port 2960 and is identified in MPP tab 10060 while an auxiliary power supply 2010 comprising a Galvion Solo Pack battery is connected to AUX PP 2920 and is identified in APP tab 10010. As illustrated in FIG. 10D, the fourth exemplary configuration 10004 of the first power UI layout 10010 is shown displayed on a display screen 10550 of an exemplary EUD 10500. Exemplary embodiments of EUD 10500 include a Samsung device, for example a Samsung S20 tactical edition smartphone or a Samsung S9 smartphone.

Referring now to FIG. 10E, multiple views of the EUD 10500 with display screen 10550 of FIG. 10D are shown. The exemplary embodiment of EUD 10500 is shown as a Samsung S9 smartphone although it is noted that one skilled in the art would recognize that one or more different smartphone or similar devices can be substituted for the Samsung S9 without departing from the disclosed technology. 10501 is a front view of the EUD 10050 with an illustrative embodiment of the first power layout 10010 displayed on the screen 10550. FIG. 10D further includes a top rear view 10502, left side view 10503, right side view 10504, top view 10505, and bottom view 10506 of the EUD 10500. It is noted that any of the first power UI layout 10010, second power UI layout 10020, power port pop-up window 11010, and port detail UI layout 13010 each may similarly be displayed on a display screen 10550 of the EUD 10500.

Referring now to FIG. 11 a single port live power port pop-up window 11010 that can be opened by a user to display power load voltage 11100 at a selected port, e.g. at port 10060, is shown. The user can open the single port live pop-up window 11010 by tapping a power display tab, for example the MPP power display tab 10060. In the illustrated example, voltage 11150 of a power signal provided by a power source connected to the main power port is shown. The single port power port pop-up window 11010 can show live power characteristics for the selected power port updated at a faster rate than the power data is saved to a data store, for example once every 100 ms. This is useful when a user desires to understand power characteristics of a particular power device on a more granular level. An exemplary implementation includes configuring a single live power UI layout 11010 to display live power corresponding to a power port, e.g. 2960 (see FIG. 2B) to which a solar blanket is attached. The user can observe changes in displayed voltage 11150 while positioning and repositioning the solar blanket to enable selection of a position of the solar blanket to receive a maximum amount of power from the solar blanket.

As shown in FIG. 12A, a first exemplary configuration 12001 of the second live power UI layout 12010 is shown. In this first configuration 12001, no power devices are connected to power ports of a four port power hub represented by the power layout 12010. All four power display tabs 12111, 12084, 12092, and 12094 are shown in a down position and grayed out.

The second exemplary configuration 12002 of the second live power UI layout 12010 shown in FIG. 9B includes the BATT power display tab 12111 popped up, with an indication that a Galvion SharePack battery has been connected to a corresponding BATT power port (not shown). The BATT power display tab 12111 includes a display of live power provided by the battery to the hub. The EUD power display tab 12084 is also popped up, indicating that an EUD, in the illustrated example an EUD identified as Samsung S9, has been connected to an EUD port of a corresponding 4-port hub (not shown). The EUD power display tab 12084 includes a display of live power being drawn from the hub by the EUD. The System Supply bar graph 12200 has been updated to indicate an amount of energy available from the connected battery and a system demand value 12110 has been updated to reflect a power demand of the connected EUD. A value or Remaining Run 10300 has been updated to indicate an estimated runtime of the system generated by a power application based on characteristics of the connected battery and EUD.

The third exemplary configuration 12003 of the second live power UI layout 12010 shown in FIG. 12C includes the second power device port power display (PAN2) 12094 popped up with information displayed indicating that a head lamp has been attached to a corresponding hub (not shown) and that the head has a live power draw of 6.60 W. The displayed Remaining Time estimated value 12300 has been updated to reflect the addition of the head lamp power draw to the hub.

As shown in FIG. 13, a port detail UI layout 13010 corresponding to the battery port (BATT) 12111 of the four port hub represented by the second live power UI layout 12010 is shown. Referring to FIGS. 12C and 13, the port detail UI layout 13010 can be accessed by a user by tapping the BATT power display tab 12111 on the second live power UI layout 12010. The port detail UI layout 13010 includes multiple data values 13200 corresponding to a battery connected to the BATT port including: amount of the time the battery has been connected to the hub, live voltage, current, and power supplied by the battery, peak voltage and current values, temperature of the battery, health of the battery (i.e. a value representing battery state of health), and energy (in Wh) available from the battery. The port detail UI layout 13010 also includes a voltmeter and corresponding bar graph 13100 which displays an instantaneous voltage value 13150 corresponding to the BATT power display tab 12111. Referring to FIGS. 11 and 13, the voltmeter 13100 portion of the port detail UI layout 13010 is similar to the voltmeter 11100 of the power port pop-up window 11010. In some embodiments, the power port pop-up window 11010 may be replaced by a port detail UI layout similar to 13010 or the port detail UI layout 13010 may be replaced by a power port pop-up window similar to 11010.

In some embodiments, UI elements representing power demand and elements representing power supply may be shaded using different colors. For example, in an embodiment power demand display elements including a system demand bar graph 10100, 12100, text displaying individual and aggregated system demand values, and symbols representing live system demand (e.g. lightning bolt symbols 10085) included blue coloring. In embodiments, power supply display elements, including a system supply bar graph 10200, 12200, text displaying individual and aggregated system supply values, and symbols representing live system supply (e.g. a battery symbol 10065 corresponding to a discharging battery or lightning bolt 10025 corresponding to an AC power supply) include green coloring. In embodiments, UI display elements representing a battery being charged, for example referring to FIG. 12C battery symbol 10067 and power value text corresponding to a conformal battery being charged, include a yellow color. In embodiments, values representing remaining run 10300 may be shaded yellow and, referring to FIG. 10B, may be indicated with different color, for example orange, when an alert 10400 is displayed. Referring to FIG. 11 and FIG. 13, a voltmeter bar graph display 11100, 13100 may include orange coloring in embodiment.

Referring now to FIG. 14, a first exemplary power tracking method 14000 for generating, transmitting, receiving, and using information contained in live power data messages according to embodiments is shown. The first method 14000 includes generating and exchanging live power data messages, similar to those discussed in relation to FIG. 3. As described herein, the first method 14000 is carried out using a hub processor of a smart hub, for example hub processor 2071 of hub 3001 shown in FIG. 3 or host processor 2071 of hub 4001 shown in FIG. 4. It is recognized that the method 14000 may be carried out by any processing device that is capable of receiving live power data from one or more power devices, for example by the EUD 2110 connected to a non-smart hub 2001 as shown in FIG. 2B or by a compute module, for example a helmet compute module 4179 as shown in FIG. 4.

At step 14100 a hub processor collects live power data from one or more power devices, each of which is connected to a device port of the hub. The hub processor may probe a device port corresponding to each power device to obtain the power data, for example, and referring to FIG. 2B, power ports 2920 and 2960, device ports 2992, 2994, and 2996, and EUD port 2984. In a particular embodiment, each power device, e.g. power supplies 2010, 2060 and power loads 2101, 2103, 2105, and 2110, is a USB power device and the hub processor receives, from each USB power device, a data stream including live power data. In other embodiments, power devices may include power-only devices in which case the hub processor determines live power data based on measurements, as previously discussed. In still other embodiments, one or more power devices may communicate power data to the hub processor over a network protocol other than USB, for example over ISW or SMBus. The hub processor collects data at a fast rate determined by the system.

In some embodiments, one or more power devices each include a memory and are configured to store power readings for a period of time specified by the system, or overridden by a user, and to periodically aggregate live power data to generate an average and peak values over the period of time. The power devices may provide the average and peak power for the period when polled by the hub. In other embodiments, the hub receives non-aggregated data from, or corresponding to, one or more power devices at and generates average and peak power values.

The hub processor stores aggregated live power data to a datalog storage, for example to a database or storage file system, e.g. to hub power log 3307 (see FIG. 3), by date on the hub for later retrieval. The hub processor may store addition information corresponding the live power data, for example a device type or device ID corresponding to live power data, a time of day, temperature, GPS location, or other metadata corresponding to the live power data. The hub processor may receive at least some of the metadata, for example a GPS location, from a power device that is communicatively connected to the hub, for example from a GPS system carried by a user.

At step 14120, the hub processor assembles the live power data, which can include live power data from the multiple power devices, into a live power data message. The live power message may include live power data from each of the one or more power devices.

In some embodiments, the hub processor includes a host bridge service or bridge module and generates one or more universal bridge format messages that include data payload with the live power data, as previously discussed in relation to methods 7000, 8000, and 9000 (see FIGS. 7, 8, and 9). In these embodiments, at step 14140, the hub processor, using a uniform messaging platform, e.g. UMP 1001 (see, for example, FIG. 3), generates one or more uniform bridge format messages that includes the live power data. In alternative embodiments, the hub processor communicates the live power data without including the power data in uniform bridge format messages. For example, the hub processor may receive a request for live power data, for example from an EUD connected to the hub, and, in response send the requested live power data.

At step 14160, if the hub includes multiple transport protocols, the hub processor selects a soldier PAN transport protocol to use for communicating the live power data message as bridge message frames. In some embodiments of hubs, only USB is available and selection between protocols is not required. The hub processor can select an available transport modality based upon one or more criteria. In an embodiment, the hub processor selects USB transport if available and falls back first to a soldier wireless network, e.g. an ISW network, and second to a BT network. The hub processor can use other criteria for selecting a transport modality, for example based on a measured or inferred speed or congestion of each of multiple networks, a user-selected preference, or a preferred network corresponding to parameters of a particular mission.

At step 14180, the hub transmits the live power message to an endpoint device, for example to an EUD 2110 connected to hub EUD port 2984 (see FIG. 3). The hub processor transmits live power message, e.g. 3500, for example uniform bridge formatted frames, over the selected transport modality.

At step 14200, an endpoint device, for example the EUD, receives the live power data message that were transmitted by the hub processor in step 14180. If the live power data includes uniform bridge formatted frames, then at step 14220, an EUD uniform messaging platform (UMP), e.g. 1001, operating on the EUD extracts the live power data payloads from the uniform bridge formatted frames received from the hub processor and assembles the payloads into the live power data message. The live power data is then transmitted to one or more applications operating on the EUD, including a power application 3304, as discussed in relation to FIG. 3. In some embodiments, the EUD UMP 1001 generates native-format messages comprising the live power data, for example SMBus formatted messages, and communicates the native format messages to the one or more applications, for example using a broadcast message protocol. In some embodiments, each of the one or more applications may subscribe to particular types of data, for example to power data, and the EUD bridge service will only communicate, to the one or more applications, data of the types that the applications subscribe to.

At step 14240, the power app generates, based on information included in the live power data message, at least one power information product that includes live power data corresponding to the multiple power devices and including in the live power message. The power information product can include, for example, power consumption and power provision per power device. The power information product can also include a statistical power information product, for example one or more statistical values generated based on the live power data, for example total power drawn by all powered devices, total power provided by one or more power sources, remaining power available from one or more power sources, peak and/or average power drawn by each of the power loads, and aggregated peak and/or average power drawn by all powered devices connected to the hub. For example, referring to FIGS. 10A through 10E, 11, 12A though 12C, and 13, the power app can generate one or more live power data layouts, for example any of live power data UI layouts 10010, 11010, 12010, and 13010. In an embodiment, the power app then causes the live power data layout to be displayed on the screen of the EUD, e.g. on display screen 10550 of EUD 10500 (see FIG. 10D, 10E) or on display 2012 of EUD 2110 (see FIG. 2B).

The first method 14000 includes generating and transmitting live power data messages, which can include power data corresponding to multiple power devices. A method substantially similar to the first method can be used for uniform bridge formatted messages that include other types of data, for example digital audio data (e.g. USB audio data) which can be received, by a hub processor, from multiple devices, each connected to a device port or otherwise in communication with a hub processor. In the example including digital audio data, an EUD or other device can receive one or more universal bridge formatted messages that each include digital audio data from multiple audio power devices and extract the audio data corresponding to each audio device from the bridge message payloads.

An example method similar to the first method 14000 can be used to transmit a datalog of historical power data from the hub to an EUD or other device. In this example method, the historical power data is too large to transmit within a single universal bridge formatted frame. The hub UMP 1001 service can generate multiple universal bridge message payloads that each include a portion of the historical power data. The hub UMP 1001 adds a bridge header to each bridge message payload to generate multiple universal bridge message frames. The universal bridge message frames are received by the EUD. At step 14220, an EUD UMP 1001 operating on the EUD extracts live power data from the multiple universal bridge message frames received from the hub processor and assembles the payloads into the datalog of historical power data.

Referring now to FIG. 15 a second exemplary power tracking method 15000 that can be implemented by embodiments of the technology described herein is shown. The second method 15000 includes generating, at an EUD, e.g. at EUD 2110 (see FIG. 3), one or more live power data layouts, for example one or more of the live power data layouts illustrated in FIGS. 10 through 13 for display on a screen, e.g. on EUD display 2112 screen (see FIG. 3). In embodiments, and referring to FIGS. 14 and 15, the second method 15000 may include an exemplary implementation of step 14240 of the first method 14000.

Referring once again to FIG. 15, at step 15100, the EUD receives a live power message that includes live power data corresponding to multiple power devices that are operatively connected to an intra-soldier PAN, for example power devices connected to a hub. For example, and referring now to FIG. 3, the EUD 2110 receives a live power message 3500 from hub 3001 that includes live power data corresponding to power devices 3101 through 310*n*. In an exemplary embodiment, the live power message is formatted as uniform bridge message and an EUD uniform messaging platform 1001 extracts the live power message from one or more bridge frames. Live power data included in the live power message is passed to a power application, for example Power App 3304.

Referring now to FIGS. 3 and 15, at step 15120, the EUD displays live power data that includes power consumed by each power load on connected to the PAN and power provided by each power sources connected to the PAN. The EUD also displays aggregated power consumed by all of the power devices connected to the PAN and aggregated power provided by all power supplies connected to the PAN. In an exemplary embodiment, an analysis module, e.g. 2189, of the power application generates live power statistics data based on live power data included in the live power data message, for example aggregated power consumed and aggregated power provided. A display module, e.g. 2187, of the power application generates one or more live power data layouts, for example a live power data layout illustrated in any of FIGS. 10A through 13, that includes the live power data corresponding to individual power devices and aggregated live power data (System Demand and System Supply).

At step 15140, the power application retrieves, from a historical power database, historical power data corresponding to each power device that is connected to the PAN. In some embodiments, a universal messaging service according to the disclosed technology performs a device discovery operation to determine an identity of each of the power devices and provides the device identity information to the power app. An example device discovery operation is described herein in relation to FIG. 7. In some embodiments, the historical power data includes data generated based on past performance of a particular power device, for example based on performance of a particular power supply that is connected to a power port of a hub. In some embodiments, historical power data include power data aggregated by device type. The power application can filter historical power data, for example by removing out-of-bounds values or by selecting historical power data corresponding to conditions expected for a particular missing, e.g. based on ambient temperature or time of day (e.g. data collected during night operations or during day operations).

At step 15160, the power application generates, based on the live power data and historical power data, a prediction of remaining run time of the power loads connected to the soldier PAN, or an amount of time remaining during which all power loads connected to the PAN can be powered by power sources connected to the PAN. In an exemplary embodiment, a modeler module of the power application uses one or more trained machine learning models or algorithms to generate a predicted run time. The power application also generates, at step 15160, one or more statistical power products, which can include, for example, one or more of an aggregated power draw of all power loads that make up the soldier PAN and an amount of power available from power sources connected to the soldier PAN. The power application may use one or more of the statistical power products to generate the prediction of remaining run time.

At step 15180, the power application displays the predicted runtime on the EUD display. For example, the display module of the power application may generate a UI similar to that depicted in FIG. 7, including predicted runtime (Remaining Run).

At step 15200, the power application compares a value of the predicted runtime to a threshold value, for example to a threshold value configured by a user, and determines whether the value of the predicted runtime is less than the threshold value. If not, the method returns to step 15100 to receive additional live power data. If the predicted runtime is less than the threshold value, the power application generates and displays an alert, for example an alert similar to the alert 10400 illustrated in FIG. 10B, and returns to step 15100 to receive additional live power data.

At step 15230, the power application optionally communicates information to one or more devices located outside of the solder PAN, for example to one or more endpoint devices. The information may include, for example, one or more of an alert generated at step 15220, a statistical power product generated at step 15160, and all or a portion of live power data collected by the power application. For example, and referring now to FIGS. 3 and 4, the power application 3304 (e.g. APP A) may communicate the information to one or more of a central command processor 4509, a TCP/IP device 4510, a satellite endpoint 4512, or an other network endpoint 4514.

Referring now to FIGS. 16A, and 17 through 28, UI layouts that can be displayed on a screen of an EUD are shown. At least some of the UIs shown in FIGS. 16A, and 17 through 28 can be interacted with by a user to select data to be imported from a hub and to select data for use in analysis and modelling are shown. During a mission, live power data is automatically recorded on a hub, as previously discussed. In some embodiments, live power data can also be recorded on a EUD. The EUD can be connected to the hub, or left connected to the hub, post-mission to load data for analysis. The system, e.g. the EUD, sets date and time on the hub to organize power logs. For example, and referring now to FIG. 3, a hub processor 2071 can store live power data, and associated metadata, in a hub power log 3307 during a mission. An EUD 2110 can also store live power data to a local power log 3705. Following a mission, a user can download, onto the EUD power log 3705, live power data that was stored by the hub processor 2071 in the hub power log 3307, thereby consolidating live power data. A user can select some or all of the power data stored in power log 3705 and/or on the hub power log 3307 for inclusion in a configuration of the historical power database 3703. In an embodiments, selected power data is used as input for an analysis module 2188 and/or modeler module 2189 which generate one or more information products based on the selected power data.

The system compares logs and data on the EUD against logs on the hub and graphically shows the differences by date. Referring to FIG. 16A, a calendar display UI 16000 includes blocks 16010, each corresponding to a day, for example to a day of a selected month. Each of the blocks 16010 includes an indicator corresponding to data stored that corresponds to the block, including whether power data has been recorded, either on the hub, on the EUD, or both. FIG. 16B shows the meanings of the indicators shown in FIG. 16A. Indicator 16012 indicates that no data is available for a corresponding day. Indicator 16014 indicates data corresponding to a day is only stored on the EUD. Indicator 16016 indicates that data corresponding to a day is only stored on the hub. Indicator 16018 indicates that data corresponding to a data is stored both on the hub and the EUD. A user can interact with the calendar display UI 16000 to download any data stored on the hub that is not already stored on the EUD, and thereby concatenated EUD and hub power data, for example in the EUD power log 3705.

A user can select data stored on the hub for import to the EUD. For example, the user can tap on a date that is marked with an indication that data from that date is stored on the hub only to cause the data to be downloaded to the EUD.

Data downloaded to the EUD can be used for analysis and modelling, for example, and referring to FIG. 3, by loading the data into a historical power database. Data included in the historical data database can be used by an application, for example by a power app, for making predictions. The data in the historical database can also be shown on a user interface displayed on the EUD screen.

FIG. 16C shown an illustrative, exemplary, method 16500 for downloading concatenating power data and selecting data for use in one or more of analysis and modelling. At step 16510, a user selects data that is on hub for download to the EUD, for example data corresponding to one or more days marked with indicator 16016 on the calendar display 16000. The selected data is prepared and sent by the hub, in some embodiments as one or more uniform bridge formatted messages, and is received by the EUD at step 16520. Referring to FIGS. 3 and 16C, at step 16530, the EUD processor 2114 combines the power data received from the hub with power data already stored on the EUD, if any, thereby generating concatenated power data which it stores in the EUD power log 3705. At step 16540, a user can select some or all of the power data for using in one or more analysis tasks, for example for use as input to analysis module 2188. At step 61550, a user can select some or all of the power data for use in one or more modeling tasks, for example for input for the modeler module 2189. Data selected at steps 61540 or 61550 may be added to the historical power database 3703. For example, a user may select, at step 16550, data to be used as historical power data when the modeler module 2189 generates a predicted run time before or during a mission. The selected data is moved or copied into the historical database 3703 for retrieval and use by the modeler module 2189.

The user can decide which data to import from the hub, which data to delete or retain, and which data to use for making predictions. For example, a user can select only known good data, according to one or more criteria, and can delete data that is not good. For example, a user can only import and retain data from dates on which actual missions occurred, as opposed to dates on which equipment was tested or used for some purpose other than one a mission. A user can also choose to export power data, for example to forward power data corresponding to a user's own PAN to a central location, e.g. to a squad leader, where it can be combined with power data from other users, for example power data from each squad member's PAN. In addition, the user can decide what devices profiles should be imported, exported, or deleted. FIG. 17 shows a data management UI layout 17001 that includes interfaces that a user can interact with to import, export, or delete power data and/or device profiles from one or more of the hub and EUD data stores.

Referring now to FIG. 18 a UI layout 18101 that a user can interact with to select data from particular missions to be included in analysis and modelling, for example to be included in a database of historical power data, is shown. A user is presented with a list of missions, which can be sorted by mission name, call sign, and/or date. A user can interact with a selection icon 18300 to select a particular mission for inclusion in an analysis or modelling task. The user can interact with an edit icon 18350 to edit data associated with a mission, for example a mission name or callsign, or to add information corresponding to the mission, for example a type of mission or one or more conditions corresponding to the mission. The user can interact with a delete icon 18360 to delete information corresponding to a mission.

The novel technology described herein simplified power analysis and enables a deeper understanding by automatically integrating power data with charts. The novel technology enables a user to analyze detailed power usage over time per port and device type and detailed power supply usage and charging over time.

Referring now to FIG. 19, an exemplary UI layout 19003 for showing detailed power consumption data is shown. The UI layout 19003 includes plot 19200 that shows power consumption corresponding to each of multiple power devices (Samsung 9, head lamp, and Galvion Hub). The power consumption includes mean, range, and quartile. The UI 19003 layout displays, as horizontal lines, first and third quartiles of power consumed by each power device as well as power draw maximum and minimum values, as vertical lines, for any power devices that fluctuated measurably in power draw over the mission, for example for the head lamp. The UI layout 19003 includes a checkbox 19300 that a user can interact with to indicate whether the displayed data should be included in data used by a modeler component of a power app, for example whether the data should be included in a historical power data database.

Referring now to FIG. 20, an exemplary UI layout 20003 for showing power consumed by power devices during a particular mission is shown. The UI layout includes power consumption data corresponding to a particular mission (444) and to a particular soldier who participated in the mission, identified by callsign Hammer. The UI layout includes a checkbox 20300 for selecting, by a user, whether the displayed data should be included in data used by a modeler component of a power app, for example whether the data should be included in a historical power data database. The UI layout includes a table 20200 that in includes display of, for each device port (Pan1, Pan2, and Pan3) and for the EUD port (EUD) what device (Radio, MBITR, Helmet, and USB Device) was operatively connected to the port during the mission. The table 20200 includes an amount of power consumed by each device as well as an amount of time that the device drew power during the mission. The UI 20003 layout includes a circular bar graph 20100 with an individually shaded segment indicating power usage of each power device as a portion of total power consumed.

Referring now to FIG. 21 a UI layout 21003 for showing power consumed by a particular power device (e.g. MBITR), as indicated in selection box 21350, over the course of a mission (mission 444) is shown. FIG. 21, includes a power draw plot 21200 that illustrates power drawn from a hub over time. A user can interact with selection box 21350 to select a device for which power data should be displayed in the UI layout 21003. A solid line 21250 indicates power consumed by the selected power device, i.e. by the MBITR, over the course of a mission (444) and a dashed line 21230 indicates total power consumed by all power devices that were connected to the hub with the MBITR during the mission. The UI layout 21003 is advantageous in that it can show how a particular power device affects network power usage and how changes in the power device usage affect changes in network power usage.

Referring now to FIG. 22 a UI layout 22003 for showing power provided by a particular power source (SharePack) shown in selection box 22350 over the course of the mission is shown. A user can interact with the selection box 22350 to select a power device for which power data should be displayed one the UI layout 22003. The UI layout 22003 includes a power supply plot 21200 that indicates power supplied to a hub over time. The solid line 22250 indicates power provided by the SharePack over time and the dashed line 22230 indicate total power capacity over the course of the mission.

The UI layouts 21003 and 22003 depicted in FIG. 21 and FIG. 22 allow a user to select, by interacting with selection icons 21300 and 22300 whether the data corresponding to individual power devices should be used by a modeler, e.g. by modeler module 2189 of power app 3304 (see FIG. 3), to make predictions.

Referring now to FIG. 23 a UI layout 23104 for selecting and displaying historical power data corresponding to a particular power device is shown. The UI layout 23104 includes a table 23200 of indicator boxes 23210, each corresponding to a power device that is currently connected to a hub represented by UI layout 23104 and other known power devices. An indicator box 23210 includes a lightning bolt icon 23215 when a power device represented by the indicator box is connected. A system according to the technology described herein detects when a particular power device is connected to a particular device port of a hub represented by UI layout 23104, by device ID, and displays a lightning bolt shaped icon 21215 next to the name of the connected device. When a user selects one of the displayed devices, for example by clicking on a corresponding indicator box 23210, the system, e.g. EUD 2110, displays, in display window 23300, historical power data, e.g. an average historical power consumed by the power device, with standard deviation, as well as the number of missions from which data was included to generate the average. The UI layout 12104 allows a user to enter a custom device name for any of the displayed devices included in table 23200.

Referring now to FIG. 24 a UI layout 24104 for displaying power usage data of a selected device, e.g. by MBITR, over a number of missions is shown. The UI layout 24104 includes a plot 24200 that shows power consumed by the power device on each of multiple missions 24202, 24204, 24206, and 24208 and a line 24210 indicating historical average power. The UI layout 24104 includes a pulldown menu 24350 for filtering data by callsign. A user, e.g. a team leader, can load data from multiple users and select whether to display data for all callsigns of for particular users.

In additional embodiments, not shown, a user can select data for analysis and use by a modeler, e.g. by modeler module 2189 of power app 3304 (see FIG. 3), based on additional or alternative criteria. For example, in an embodiment historical power data is stored with tags including temperature during a mission and a user can filter data for use in a modeler based on temperature. This is useful when temperature can affect power consumption or power capacity in that the user can cause the modeler to use only power data gathered when a temperature was similar to temperature expected during a planned mission. Similarly, a user can filter data by time of day (e.g. night vs. daylight), or by one or more other criteria that may be relevant to predicting power consumption or power provision of particular power devices.

Referring now to FIG. 25 and FIG. 26, UI layouts 25202 and 26202, respectively, that include example modeler outputs 25400 and 26300, e.g. outputs generated by modeler module 2189 of power app 3304 (see FIG. 3), are shown. The modeler outputs can be generated by the modeler module using, as inputs, personal power usage data collected over time and selected for inclusion in a historical power data database. The personal power usage data includes data corresponding to a soldier's own equipment or imported from other known good data. The system, for example a power application, creates power profiles of devices based on a user's real usage. The power profiles are used to predict future power needs.

FIG. 25 depicts a UI layout 25202 for generating and displaying predicted power required for a mission and suggested power supply to power the mission. A user enters, in device selection interface 25100, information regarding power devices to be used on a particular mission, for example power loads (e.g. a first radio 25110, a second radio 25112, and MBITR 25114). The user enters, in runtime selection interface 25300, length, in time, of the mission. Referring to FIGS. 3 and 25, the modeler module 2189, which in some embodiments is a component of a power app 3304, retrieves, from the historical power data base 3703, historical power data corresponding to each of the selected power devices and historical power data corresponding to one or more available power supplies. The modeler module 2189 generates an estimated power draw 25120 corresponding to the selected power devices 25110, 25112, and 25114. The modeler module 2189 generates, based on the historical power device data and length of the mission, an estimated value of total power capacity needed from one or more power supplies to complete the mission. The modeler displays, in a suggested power supply window 25400, at least one suggested power supply 25410 for the mission. The modeler displays, at 25420 the power capacity of the selected power supply and the estimated required total power capacity to complete the mission.

FIG. 26 depicts a UI layout 25202 for generating and displaying an estimated powered run time based on a set of power loads and power sources selected for a particular mission. A user enters, in power device selection interface 26100 selected power loads (e.g. a first radio 26110, a second radio 26112, and MBITR 26114). The user enters, in power supply selection interface 26400 one or more selected power supplies (e.g. a SharePack 26410). In some embodiments, the power supply selection window is populated, either automatically or by a user, with the one or more power supplies suggested by the modeler. Referring to FIGS. 3 and 26, the modeler module 2189, retrieves, from the historical power data base 3703, historical power data corresponding to each of the selected power devices and power supplies. Modeler module 2189 displays the historical power data corresponding to each selected power source and power load, for example average power consumed by each power load, with standard deviation, in the power device selection interface 26100 and power capacity of the selected power supply in the power supply selection interface 26400. The modeler module 2189 generates, based on the historical power data, an estimated runtime of a power network that includes the selected power loads and selected power source in a runtime display interface 26300. The modeler module 2189 can display a typical estimated runtime, based on average values of power data, and high and low estimated runtimes, for example based on average values and standard deviations of the power data. A user can build a power plan by power loads and power supply used by the system. In this manner, a user can build out a mission and know how much power will be needed. It is noted that, in the preceding description, when the modeler module 2189 is recited as displaying information, the display of information may include interaction of the modeler module with the display module 2187. For example, the modeler module 2189 may communicate information, for example power data, to be displayed on an EUD display device 2012 to the display module 2187, and the display module 2187 may generate one or more instructions for the display device which cause the display device 2012 to present a UI layout that includes the information.

Referring now to FIG. 27 and FIG. 28, UI layouts 27301 and 28301 for selecting, by a user, one or more settings are shown. Using the UI 27301 depicted in FIG. 27, the user can be identified by an ATAK callsign or by a custom callsign, for example a custom callsign entered by the user. For example, the user may be identified by an ATAK callsign 27110 and can enter a custom callsign 27130 to be used in place of the ATAK callsign by interacting with selection icon 27120 and entering the custom callsign 27130. The user can use the UI 28301 depicted in FIG. 28 to allow power data corresponding to imported devices, e.g. power data corresponding to one or more other users, to be used by the modeler, e.g. by modeler module 2189 (see FIG. 3). A user may set a low power alert threshold (e.g. a threshold value for time remaining) by interacting with a time remaining alert interface 28110, and may set a frequency for live data transfer from a hub to an EUD by interacting with the update frequency interface 28120.

As shown in FIG. 29, UI layout 29110 according to the technology herein can be shown on a display device 29100 or 29200 of a non-EUD device, for example a laptop or desktop computer display or a tablet display. One or more UI layouts 29110 that are typically displayed on a EUD screen can be ported to a PC for display one a larger monitor 29100 using, for example, Samsung DeX. In addition, analysis data can be shown on a larger display 19200, for example power provision and power draw 29210, power draw per device 29220, individual power source provision 29230, individual power device draw 29340, and data transfer indicators 29250. In this manner, information corresponding to multiple UI layouts, e.g. to two or more of the UI layouts depicted in FIGS. 19 through 24, can be displayed together on one screen, which may facilitate analysis and understanding of characteristics of one or more power networks.

Referring now to FIGS. 30 through 33, exemplary improved live power user interface (UI) layouts 30001, 30002, 30003, and 30004 for display on a watch face, for example on the face of a smart watch, according to the technology disclosed herein are shown. A smart watch 30010 includes a watch band 30015 for wearing the watch and function buttons 30014, 30016 for interacting with and controlling operation of the watch 30010. The watch 30010 includes a display screen 30012 for presenting information to a user.

FIG. 30 depicts a first watch live power UI layout 30001 displayed on the display screen 30012 of the smart watch 30010. The first watch live power UI layout 30001 includes a curved power demand bar graph 30100 including a representation system power demand 30110 displayed near a perimeter of a first, e.g. top, half of the display screen. The UI layout 30001 includes a power provision curved bar graph 30100 including a representation of available system power supply 30210 displayed near a perimeter of a second, e.g. bottom, half of the display screen.

The first watch live power UI 30001 layout. In some embodiments, the system demand bar graph 30100 and a corresponding power demand indicator 30150 and a system demand symbol 30155 include blue shading while the system supply bar graph 30200 and corresponding power supply indicator 30250 and a system supply symbol 30255 include green shading. As shown, the smart watch display includes a selected portion of the information that may be displayed on an EUD UI layout, for example on UI layout 1004 shown in FIG. 10D.

As shown in FIG. 31 through FIG. 32, a user can select one or more second watch live power UI layouts 30002, 30003 respectively, to be shown on the smart watch display 30012. A user can select, for example by interacting with one or more of the function buttons 30014, 3000016, one of the first 30002 and second 30003 configurations of the second watch live power UI layout. The first configuration 30002 includes a Pan1 display region 30092, a Pan2 display region 30094, and a Pan 3 display region 30096, each of which display power consumption data for a corresponding device port, e.g., referring to FIGS. 2B and 3, for ports 2992, 2994, and 2996, respectively. Referring to FIGS. 2B, 3, and 32, the second configuration 30003 of the second UI layout includes a MPP display region 30060, an APP display region 30020, and an EUD display region 30084, each of which display power provision and consumption data for a corresponding power or EUD port, e.g., referring to FIGS. 2B and 3, for ports 2920, 2960, and 2984, respectively.

Referring now to FIG. 33, a user can select a watch live power port detail UI layout 30004 that includes details corresponding to a selected port, for example details of a power device connected to a PAN2 port of a hub. The port detail UI layout 30004 may include a port name indicator 30294 (e.g., Pan2), a connected power device ID indicator 30296 (e.g., Radio), and live (i.e. near real time) power demand indicator 30297 that display power demand (e.g. −22.64 W) of the connected power device.

The first and second watch live power UI layouts 30001, 30002, and 30004 and the watch live power port detail UI layout 30004 advantageously allow a user to view system demand, supply, and remaining run time, and details corresponding to individual ports in an easy to comprehend format without needing to operate the EUD.

It will also be recognized by those skilled in the art that, while the subject technology has been described above in terms of preferred embodiments, it is not limited thereto. Various features and aspects of the above-described subject technology may be used individually or jointly. For example, any claim may depend from any other claim and the claims may be combined in any combination, in part or in whole. Further, although the subject technology has been described in the context of its implementation in a particular environment, and for particular applications (e.g. for sharing live power data generated by multiple power devices in a solider power network), those skilled in the art will recognize that its usefulness is not limited thereto and that the present technology can be beneficially utilized in any number of environments and implementations where it is desirable to share live data from multiple devices over a communication link that is known to be usable to share live data from only a single device. Accordingly, the claims set forth below should be construed in view of the full breadth and spirit of the subject technology as disclosed herein.

What is claimed is:

1. A system for managing information corresponding to one or more power devices that are components of a power network, the system comprising:

at least one communication network;

a user device connected to the at least one communication network;

a hub for standardizing messages and for routing messages and power between the one or more power devices and the user device, the hub comprising a hub processor, hub memory, and a power and data router;

wherein the one or more power devices are connected to the at least one communication network;

wherein the user device comprises a display device, a user device processor, and a user device memory having stored thereon a user device power application including a plurality of machine executable instructions that, when executed by the user device processor, cause the user device processor to:

receive, from the hub, one or more uniform bridge format messages, each of the one or more uniform bridge format messages comprising live power data comprising one or more of:

a value of instantaneous power drawn from the hub by one or more power loads comprising the one or more power devices; and an amount of power available from one or more power sources comprising the one or more power devices;

retrieve, from a historical power data store, historical power data corresponding to each of the one or more power devices;

determine, based at least upon the value of instantaneous power drawn from the hub by the one or more power loads, the amount of power available from the one or more power sources, and the historical power data, a remaining run time of the one or more power loads, wherein the determined remaining run time is refined based on the historical power data to improve estimation accuracy over time;

display, on the display device of the user device, a user interface (UI) layout comprising an indication of the determined remaining run time of the one or more power loads; and based on the determined remaining run time, generate an alert, thereby enabling a user to adjust one or more operational parameters of the hub or of at least one of the power devices to manage available power, including selectively reducing power to one or more non-critical loads or prioritizing charging of the one or more power sources, wherein the hub processor is configured to aggregate a plurality of device power data messages, received from the one or more power devices and comprising the live power data, into a single uniform bridge format message comprising a uniform bridge header and a payload comprising the live power data, thereby reducing communication latency and network traffic on the at least one communication network.

2. The system of claim 1 wherein the hub includes a uniform messaging service comprising:

a device interface that is communicatively coupled to the hub and the at least one communication network;

the hub processor;

the hub memory having stored thereon a hub uniform messaging application including a plurality of machine executable instructions that, when executed by the hub processor, cause the hub processor to:

receive two or more device power data messages from the one or more power devices, the device power data messages each comprising live power data corresponding to the power device from which it was received;

generate, based upon the two or more device power data messages, a live power data message formatted as a uniform bridge format message, the live power data message comprising a uniform bridge header and data payload, the data payload comprising the two or more device power data messages; and output the live power data message, formatted as a uniform bridge format message, to the at least one communication network for transmission to the user device.

3. The system of claim 2, wherein the user device includes a user device uniform messaging application stored in the user device memory, the user device uniform messaging application including one or more machine executable instructions that when executed by the user device processor, cause the user device processor to:

receive the live power data message, formatted as a uniform bridge format message;

generate, based on the live power data message formatted as a uniform bridge format message, the two or more device power data messages; and provide the two or more device power data messages to the power application.

4. The system of claim 1, wherein the user device power application further comprises machine executable instructions that, when executed by the user device processor, further cause the user device processor to generate, based on the live power data, at least one statistical power information product; and wherein the UI layout further comprises the at least one statistical power information product.

5. The system of claim 4, wherein the at least one statistical power information product comprises a value of a sum of the instantaneous power drawn from the hub by each of the one or more power loads.

6. The system of claim 4, wherein the at least one statistical power information product includes a value of an amount of total power available from the one or more power sources.

7. The system of claim 4, wherein the user device power application further includes machine executable instructions that, when executed by the user device processor, further cause the user device processor to communicate the statistical power information product to an endpoint device that is connected to a second network, the second network being separate from the power network.

8. The system of claim 1, wherein the user device power application further includes machine executable instructions that, when executed by the user device processor, further cause the user device processor to:

compare a value of the prediction of the remaining run time of the one or more power loads to a threshold value and, based on the comparison, generate an alert; and include the alert on the UI layout.

9. The system of claim 8, wherein the user device power application further includes machine executable instructions that, when executed by the user device processor, further cause the user device processor to communicate the alert to an endpoint device that is connected to a second network, the second network being different from the power network.

10. The system of claim 1, wherein the user device power application further includes machine executable instructions that, when executed by the user device processor, further cause the user device processor to:

determine an identity of each of the one or more power devices; and retrieve, from the historical power data store, historical power data corresponding to the identity of each of the one or more power devices, wherein the historical power data comprises live power data generated by the one or more power devices during a previous mission.

11. The system of claim 1, wherein the user device memory includes a user device live power data store stored thereon, and wherein the user device power application further includes machine executable instructions that, when executed by the user device processor, further cause the user device processor to store the live power data in the user device live power data store.

12. The system of claim 11, wherein the hub memory includes a hub power data store having stored therein at least a portion of the live power data.

13. The system of claim 12, wherein the user device power application further includes machine executable instructions that, when executed by the user device processor, further cause the user device processor to request live power data from the hub power data store, store live power data received from the hub in the user device live power data store, and select at least a portion of the live data stored in the user device live data store for inclusion in the historical power data store.

14. The system of claim 13, wherein the live power data stored in the user device live power data store includes associated mission metadata, and wherein the selected portion of the live power data is selected for inclusion in the historical power data store based on a comparison of the associated mission metadata with one or more characteristics of a planned mission.

15. The system of claim 11, wherein the historical power data store includes a selected portion of the live power data stored in the user device live data power store.

16. The system of claim 1, wherein the user device comprises an end user device (EUD) or a smart watch and wherein the one or more power loads comprises the user device.

17. A power monitoring hub comprising:

a housing including a plurality of hub ports, each hub port configured to connect to a power device;

a hub processor disposed within the housing and coupled to the plurality of hub ports;

a plurality of power monitoring circuits each associated with a respective one of the hub ports, each power monitoring circuit configured to measure voltage and current corresponding to a connected power device; and a hub memory coupled to the hub processor;

wherein the hub processor is configured to:

(a) obtain, from the plurality of power monitoring circuits and from at least one power message received from a power device operatively connected to a device port, real-time voltage and current data corresponding to each hub port;

(b) compute peak and average power values based on the voltage and current data over a configurable time interval;

(c) store the voltage, current, and power data in the hub memory as power log data; and (d) generate one or more live power messages, including the power log data as a data payload, each live power message formatted as a uniform bridge format message comprising a bridge header and the data payload, and (e) aggregate power data from multiple power devices connected to the plurality of hub ports into a single stream of live power messages for transmission to an external user device.

18. The power monitoring hub of claim 17, wherein the hub processor automatically detects connection or disconnection of a power device at a hub port and updates monitoring operations accordingly.

19. The power monitoring hub of claim 18, wherein the hub processor is further configured to:

communicate, via an SMBus protocol, with a battery connected to one of the hub ports to obtain battery data including at least one of a state of charge, a state of health, or a temperature of the battery, and to combine the battery data with the aggregated power log data.

20. The power monitoring hub of claim 19, wherein the hub processor automatically detects an SMBus-compatible battery connected to a hub port and retrieves the battery data at each configurable time interval.

* * * * *